(12) United States Patent
Grimes et al.

(10) Patent No.: US 12,077,372 B2
(45) Date of Patent: Sep. 3, 2024

(54) PROPPANT SUPPLY SYSTEM

(71) Applicant: NATIONAL OILWELL VARCO, L.P., Houston, TX (US)

(72) Inventors: Sandor Weaver Grimes, Bryan, TX (US); Travis Adair Anderson, Seguin, TX (US); Clayton Thomas Martin, Bryan, TX (US); Tiffany Louis Matthews, Bryan, TX (US); Scott Allen Toler, College Station, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 409 days.

(21) Appl. No.: 17/250,838

(22) PCT Filed: Sep. 13, 2019

(86) PCT No.: PCT/US2019/051158
§ 371 (c)(1),
(2) Date: Mar. 10, 2021

(87) PCT Pub. No.: WO2020/056360
PCT Pub. Date: Mar. 19, 2020

(65) Prior Publication Data
US 2021/0354910 A1    Nov. 18, 2021

Related U.S. Application Data

(60) Provisional application No. 62/731,435, filed on Sep. 14, 2018.

(51) Int. Cl.
*B65D 88/30* (2006.01)
*B65D 88/32* (2006.01)
(Continued)

(52) U.S. Cl.
CPC ............. *B65D 88/30* (2013.01); *B65D 88/32* (2013.01); *B65G 3/04* (2013.01); *B60P 1/16* (2013.01); *B65G 65/40* (2013.01)

(58) Field of Classification Search
CPC ................................ B65D 88/30; B65G 65/40
See application file for complete search history.

(56) References Cited

U.S. PATENT DOCUMENTS

| RE19,132 E | 4/1934 | McGuirk et al. |
| 2,862,731 A | 12/1958 | Hedden et al. |

(Continued)

FOREIGN PATENT DOCUMENTS

| CA | 2605260 C | 6/2011 |
| CN | 109025944 A | 12/2018 |

(Continued)

OTHER PUBLICATIONS

U.S. Appl. No. 16/214,930, filed Dec. 10, 2018, Articulating Flow Line Connector.

(Continued)

*Primary Examiner* — Jonathan Snelting
(74) *Attorney, Agent, or Firm* — Schwegman Lundberg & Woessner, P.A.

(57) ABSTRACT

A mobile proppant delivery system may include a system for unloading proppant transport trailers, storing proppant in silos, and feeding proppant to frac operations. The system may include drive-over conveyors, swiveling distribution heads, internal silo bucket elevators, gravity feed, choke filling, and bases designed with internal conveying systems.

10 Claims, 42 Drawing Sheets

(51) Int. Cl.
*B65G 3/04* (2006.01)
*B60P 1/16* (2006.01)
*B65G 65/40* (2006.01)

(56) References Cited

U.S. PATENT DOCUMENTS

| | | | |
|---|---|---|---|
| 2,937,444 | A | 5/1960 | Kern |
| 3,458,219 | A | 7/1969 | Wesch |
| 3,572,380 | A | 3/1971 | Jackson et al. |
| 3,752,507 | A | 8/1973 | Maurer et al. |
| 3,776,578 | A | 12/1973 | Jessup et al. |
| 4,354,698 | A | 10/1982 | Linder et al. |
| 4,391,297 | A | 7/1983 | Knight |
| 4,496,176 | A | 1/1985 | Weinhold |
| 4,844,133 | A | 7/1989 | Von Meyerinck et al. |
| 5,577,775 | A | 11/1996 | Pearson et al. |
| 5,738,178 | A | 4/1998 | Williams et al. |
| 6,007,227 | A | 12/1999 | Carlson |
| 7,007,753 | B2 | 3/2006 | Robichaux et al. |
| 7,654,583 | B2 | 2/2010 | Kvamme et al. |
| 8,083,083 | B1 * | 12/2011 | Mohns .............. B65D 88/30 220/636 |
| 8,590,556 | B2 | 11/2013 | Kendrick |
| 9,499,335 | B2 * | 11/2016 | McIver .............. B60P 1/6427 |
| 9,499,348 | B2 * | 11/2016 | Teichrob .............. B62D 7/06 |
| 9,752,389 | B2 * | 9/2017 | Pham .............. E21B 15/00 |
| 2004/0094898 | A1 | 5/2004 | Zheng |
| 2009/0041588 | A1 | 2/2009 | Hunter et al. |
| 2010/0310384 | A1 | 12/2010 | Stephenson et al. |
| 2010/0320699 | A1 | 12/2010 | Takeda et al. |
| 2012/0060929 | A1 | 3/2012 | Kendrick |
| 2012/0099954 | A1 | 4/2012 | Teichrob et al. |
| 2013/0284455 | A1 | 10/2013 | Kajaria et al. |
| 2014/0023463 | A1 | 1/2014 | Oren |
| 2014/0041317 | A1 | 2/2014 | Pham et al. |
| 2014/0048158 | A1 | 2/2014 | Baca et al. |
| 2014/0290768 | A1 | 10/2014 | Randle et al. |
| 2015/0000766 | A1 | 1/2015 | Arizpe et al. |
| 2015/0336747 | A1 | 11/2015 | Teichrob et al. |
| 2016/0102537 | A1 | 4/2016 | Lopez |
| 2016/0160889 | A1 | 6/2016 | Hoffman et al. |
| 2016/0170403 | A1 | 6/2016 | Lopez et al. |
| 2017/0021318 | A1 * | 1/2017 | McIver .............. B65D 88/32 |
| 2017/0074074 | A1 | 3/2017 | Joseph et al. |
| 2017/0291780 | A1 | 10/2017 | Sherwood et al. |
| 2017/0334639 | A1 | 11/2017 | Hawkins et al. |
| 2018/0045331 | A1 | 2/2018 | Lopez et al. |
| 2018/0072491 | A1 * | 3/2018 | D'Agostino .............. B65B 7/16 |
| 2018/0187507 | A1 | 7/2018 | Hill et al. |
| 2018/0223640 | A1 | 8/2018 | Keihany et al. |
| 2018/0283151 | A1 | 10/2018 | Cook et al. |
| 2018/0284817 | A1 | 10/2018 | Cook et al. |
| 2018/0298731 | A1 | 10/2018 | Bishop |
| 2019/0119038 | A1 * | 4/2019 | Kornelsen .............. B65D 90/00 |
| 2019/0169971 | A1 | 6/2019 | Oehring et al. |
| 2019/0248578 | A1 | 8/2019 | Managan, II et al. |
| 2020/0182385 | A1 | 6/2020 | Westgarth et al. |
| 2020/0355321 | A1 | 11/2020 | Zerkus et al. |
| 2021/0024291 | A1 | 1/2021 | Teichrob et al. |
| 2021/0040830 | A1 | 2/2021 | Mu et al. |
| 2021/0396223 | A1 | 12/2021 | Yeung et al. |

FOREIGN PATENT DOCUMENTS

| | | |
|---|---|---|
| CN | 113167420 | 7/2021 |
| EP | 1872047 A2 | 1/2008 |
| GB | 1258305 A | 12/1971 |
| GB | 2341653 A | 3/2000 |
| WO | WO-2013095123 A1 | 6/2013 |
| WO | 2017039692 A1 | 3/2017 |
| WO | WO-2018074995 A1 | 4/2018 |
| WO | 2019112554 A1 | 6/2019 |
| WO | 2019147603 A1 | 8/2019 |
| WO | WO-2020056360 A1 | 3/2020 |
| WO | WO-2020120512 A1 | 6/2020 |
| WO | WO-2021003178 A1 | 1/2021 |
| WO | WO-2021003179 A1 | 1/2021 |
| WO | WO-2022266644 A1 | 12/2022 |

OTHER PUBLICATIONS

U.S. Appl. No. 17/247,769, filed Dec. 22, 2020, Controlling the Flow of Fluid to High Pressure Pumps.
"International Application Serial No. PCT US2022 072967, International Search Report mailed Sep. 1, 2022", 2 pgs.
"International Application Serial No. PCT US2022 072967, Written Opinion mailed Sep. 1, 2022", 6 pgs.
"U.S. Appl. No. 16/214,930, Response filed Mar. 14, 2022 to Non-Final Office Action mailed Dec. 13, 2021", 8 pgs.
"International Application Serial No. PCT/US2021/073083, International Search Report mailed Feb. 28, 2022", 6 pgs.
"International Application Serial No. PCT/US2021/073083, Written Opinion mailed Feb. 28, 2022", 6 pgs.
"U.S. Appl. No. 17/247,769, Examiner Interview Summary mailed Apr. 22, 2022".
"U.S. Appl. No. 17/247,769, Response filed Apr. 25, 2022 to Non-Final Office Action mailed Jan. 25, 2022".
"U.S. Appl. No. 16/214,930, Response filed Oct. 1, 2021 to Final Office Action mailed Aug. 2, 2021", 9 pgs.
"U.S. Appl. No. 16/214,930, Advisory Action mailed Oct. 20, 2021", 4 pgs.
"U.S. Appl. No. 16/214,930, Response filed Nov. 2, 2021 to Advisory Action mailed Oct. 20, 2021", 9 pgs.
"U.S. Appl. No. 16/214,930, Non-Final Office Action mailed Dec. 13, 2021", 15 pgs.
"International Application Serial No. PCT/US2020/040336, International Preliminary Report on Patentability mailed Jan. 13, 2022", 8 pgs.
"U.S. Appl. No. 17/247,769, Non-Final Office Action mailed Jan. 25, 2022", 10 pgs.
"U.S. Appl. No. 16/214,930, Non Final Office Action mailed Jan. 26, 2021", 16 pgs.
"U.S. Appl. No. 16/214,930, Response filed Dec. 7, 2020 to Restriction Requirement mailed Oct. 7, 2020", 6 pgs.
"U.S. Appl. No. 16/214,930, Restriction Requirement mailed Oct. 7, 2020", 10 pgs.
"International Application Serial No. PCT/EP2019/084518, International Search Report mailed Mar. 9, 2020", 5 pgs.
"International Application Serial No. PCT/EP2019/084518, Written Opinion mailed Mar. 9, 2020", 7 pgs.
"International Application Serial No. PCT/US2019/051158, International Preliminary Report on Patentability mailed Sep. 30, 2020", 4 pgs.
"International Application Serial No. PCT/US2019/051158, International Search Report mailed Jan. 6, 2020", 4 pgs.
"International Application Serial No. PCT/US2019/051158, Invitation to Pay Additional Fees mailed Oct. 28, 2019", 2 pgs.
"International Application Serial No. PCT/US2019/051158, Response filed Jul. 13, 2020 to Written Opinion mailed Jan. 6, 2020", 3 pgs.
"International Application Serial No. PCT/US2019/051158, Written Opinion mailed Jan. 6, 2020", 6 pgs.
"International Application Serial No. PCT/US2020/040336, International Search Report mailed Sep. 25, 2020", 3 pgs.
"International Application Serial No. PCT/US2020/040336, Written Opinion mailed Sep. 25, 2020", 6 pgs.
"International Application Serial No. PCT/US2020/040338, International Search Report mailed Sep. 25, 2020", 3 pgs.
"International Application Serial No. PCT/US2020/040338, Written Opinion mailed Sep. 25, 2020", 6 pgs.
"U.S. Appl. No. 16/214,930, Response filed Apr. 22, 2021 to Non Final Office Action mailed Jan. 26, 2021", 8 pgs.
"U.S. Appl. No. 16/214,930, Final Office Action mailed Aug. 2, 2021", 14 pgs.

(56) References Cited

OTHER PUBLICATIONS

"International Application Serial No. PCT US2022 072967, International Preliminary Report on Patentability mailed Dec. 21, 2023", 5 pgs.

* cited by examiner

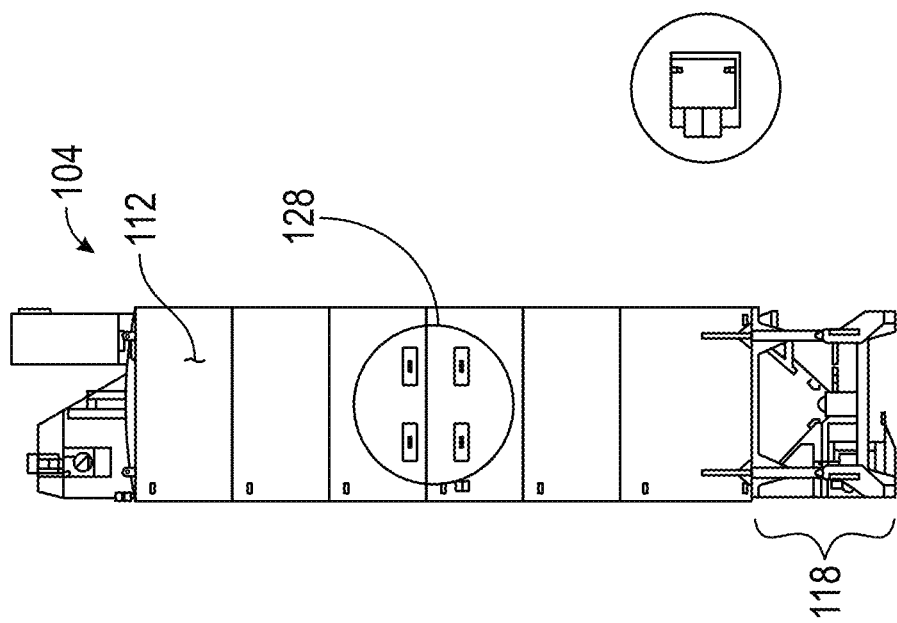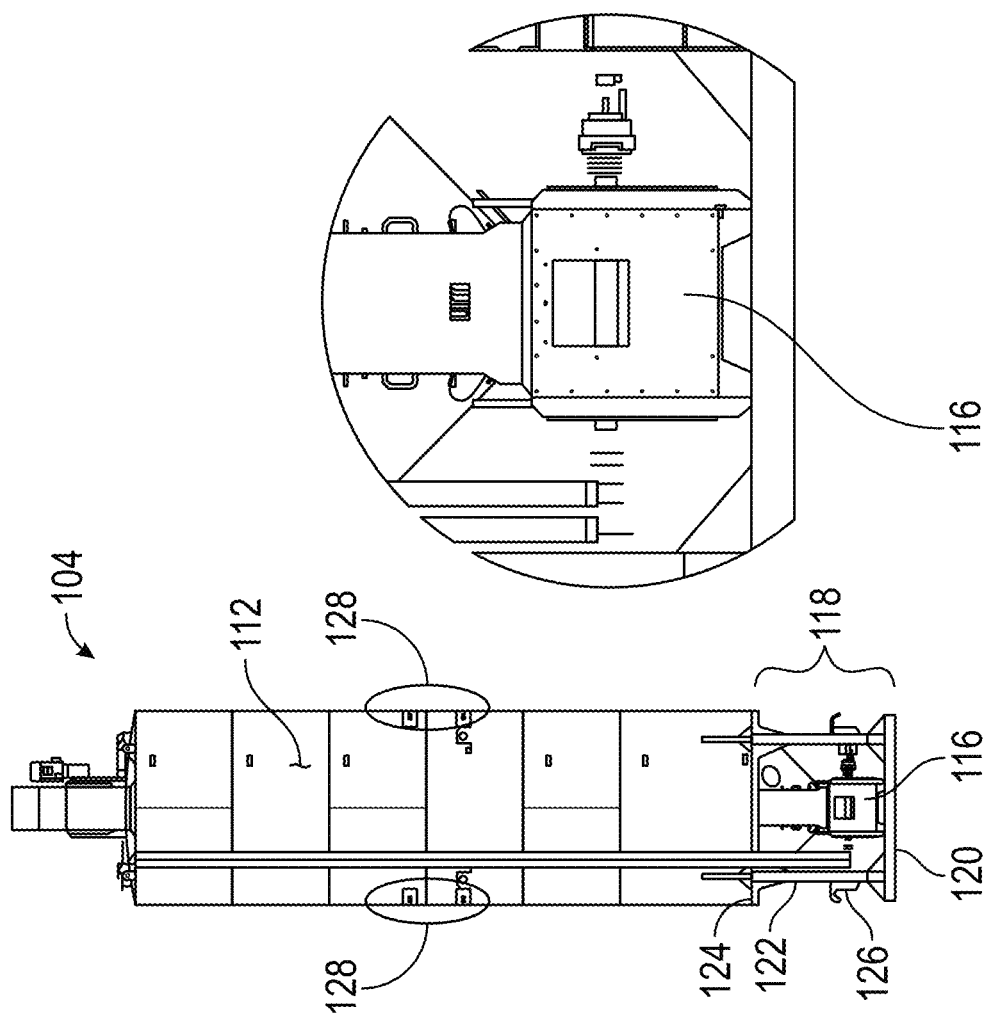

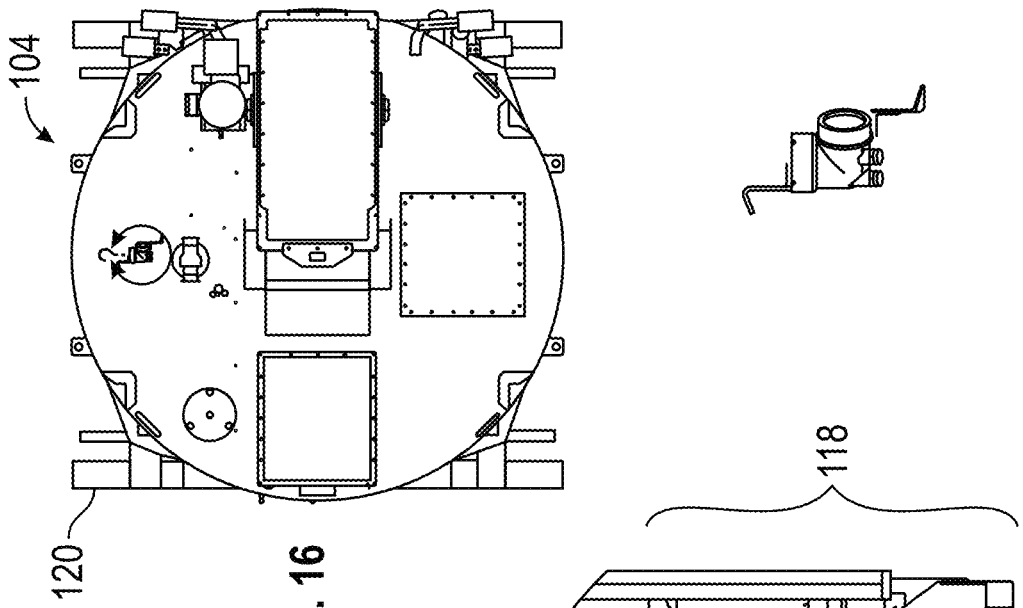
FIG. 16
FIG. 17
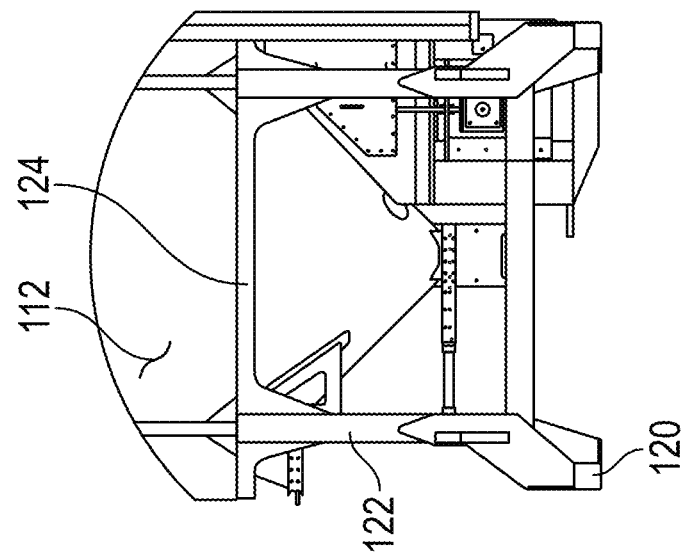
FIG. 15
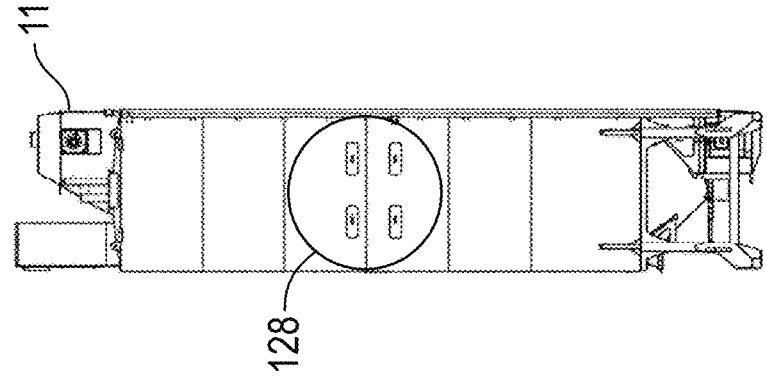
FIG. 14

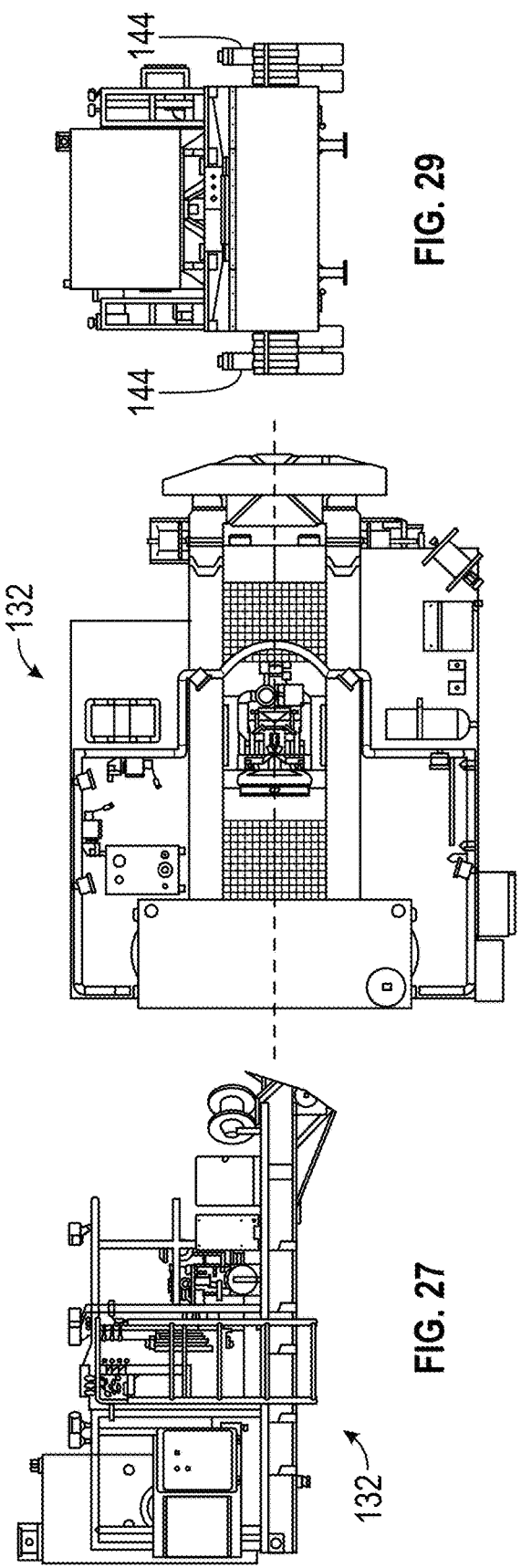
FIG. 27
FIG. 28
FIG. 29
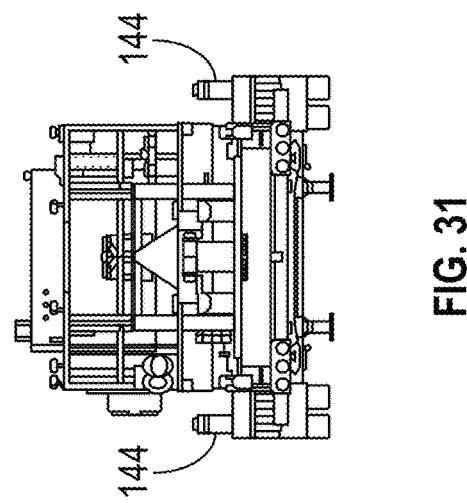
FIG. 31
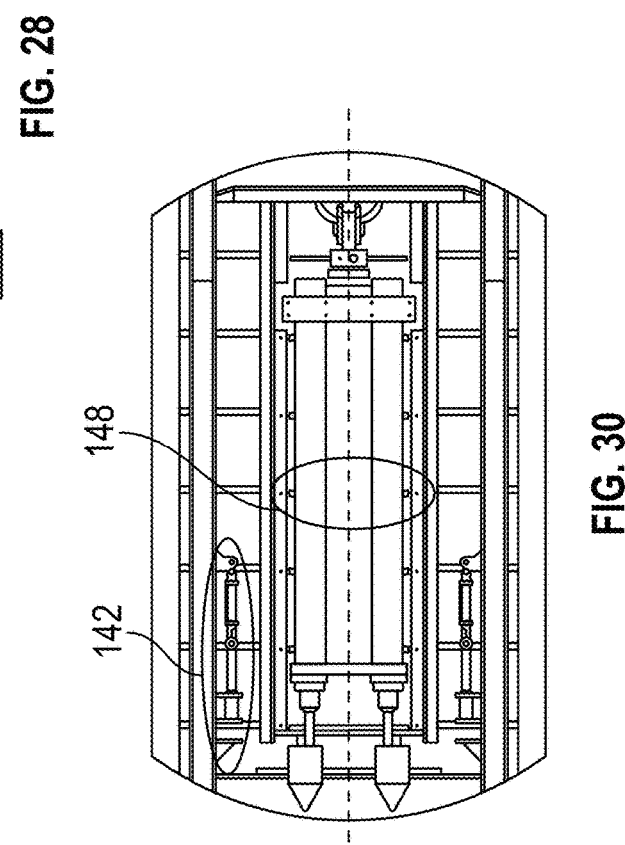
FIG. 30

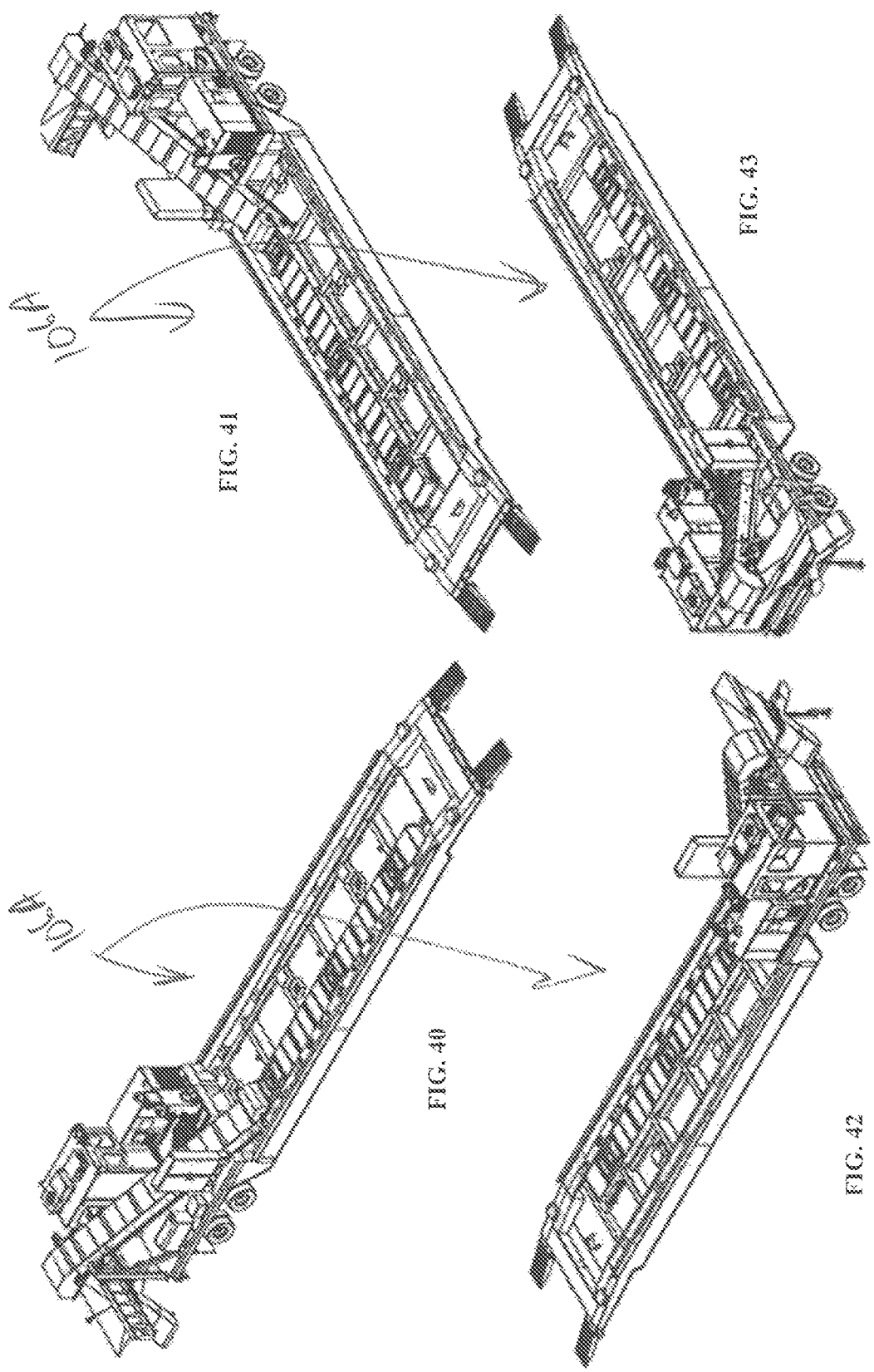

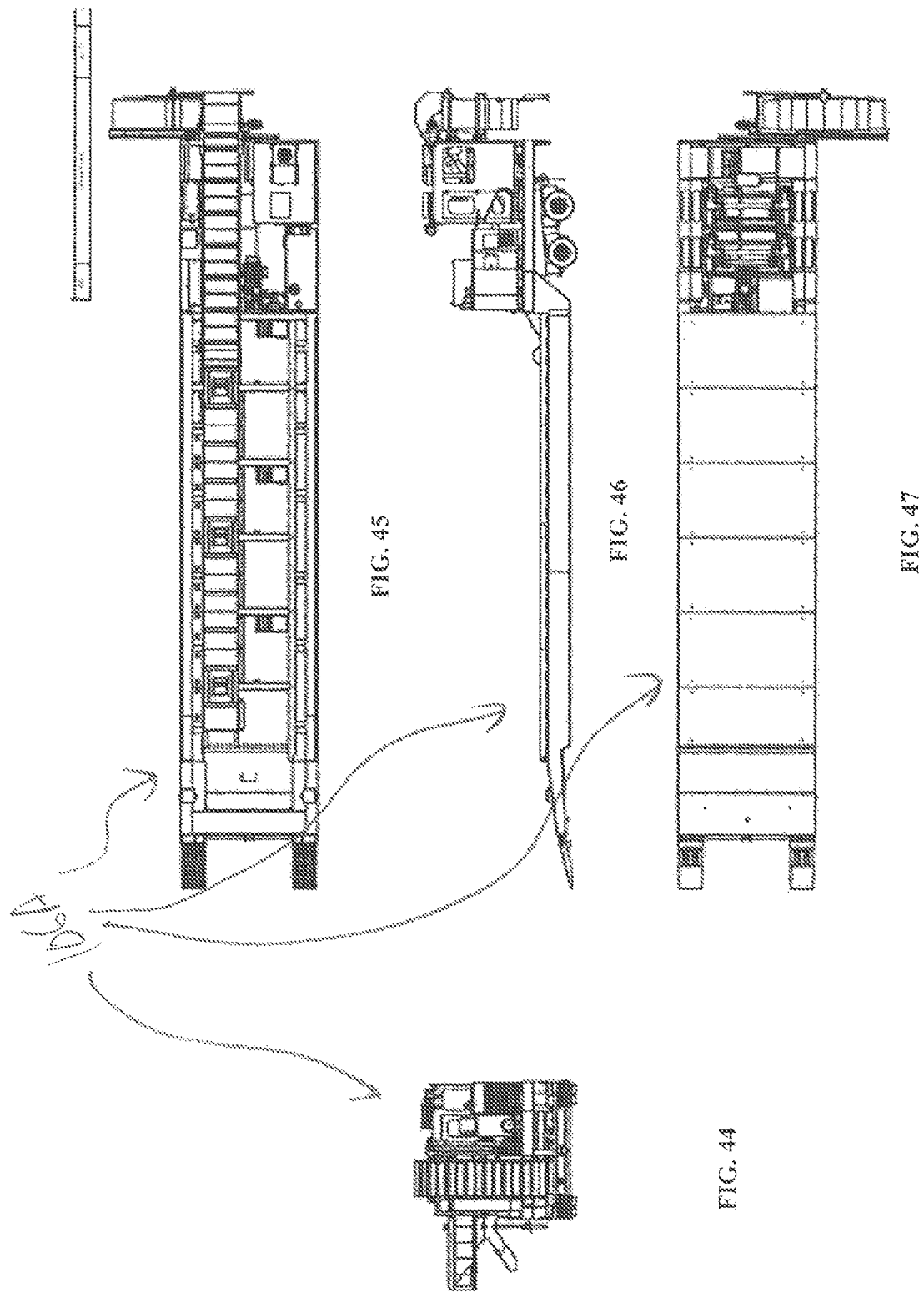

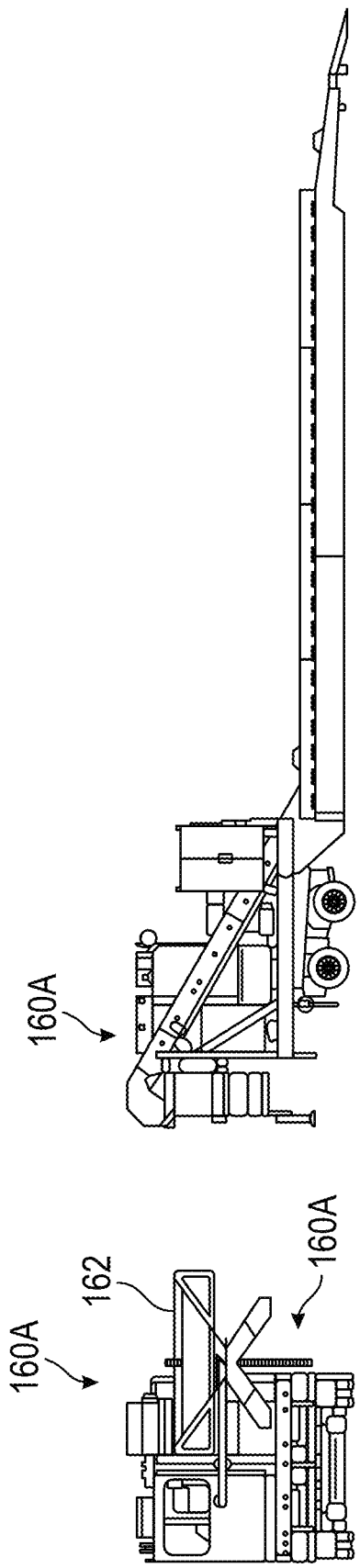

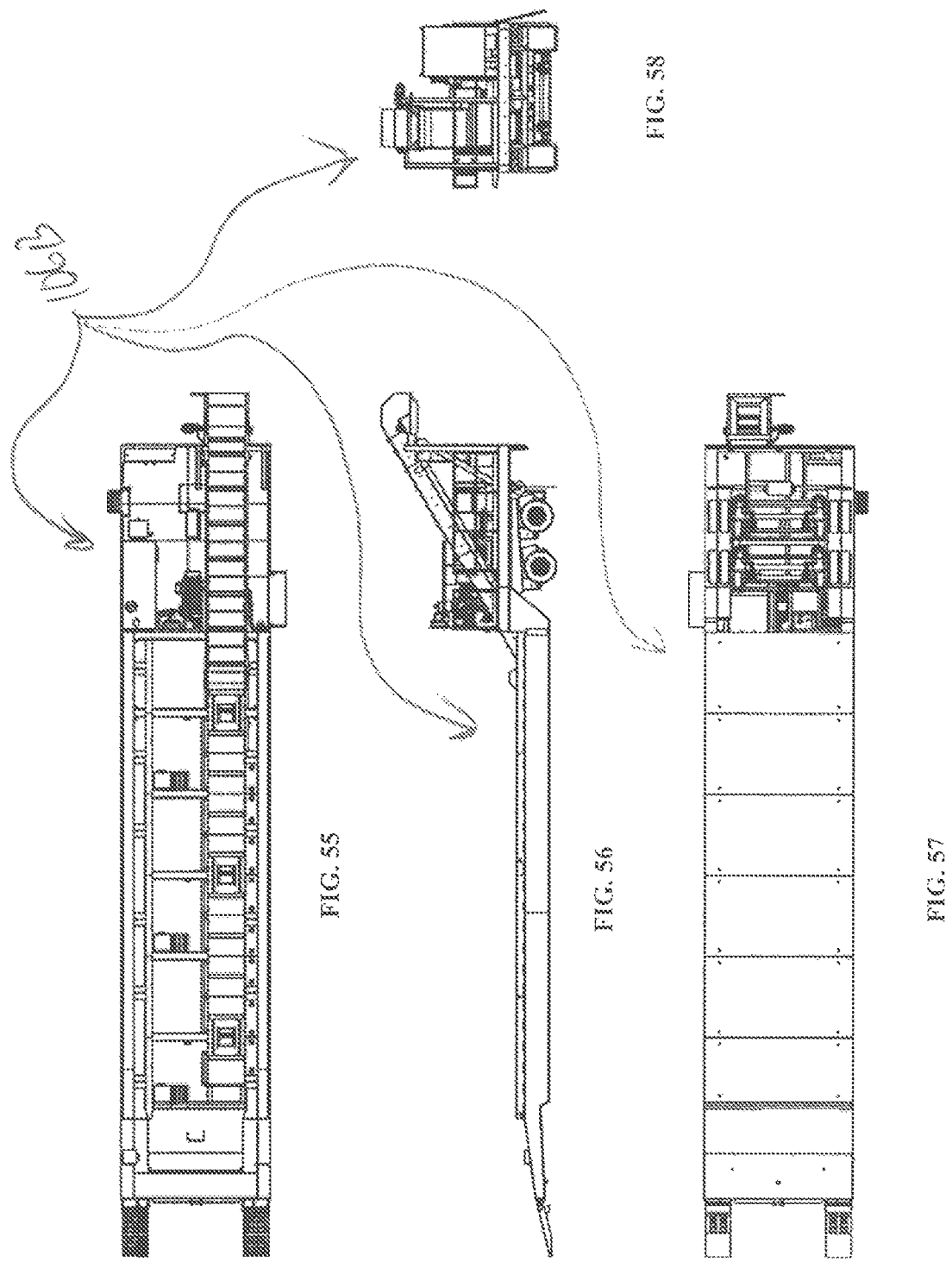

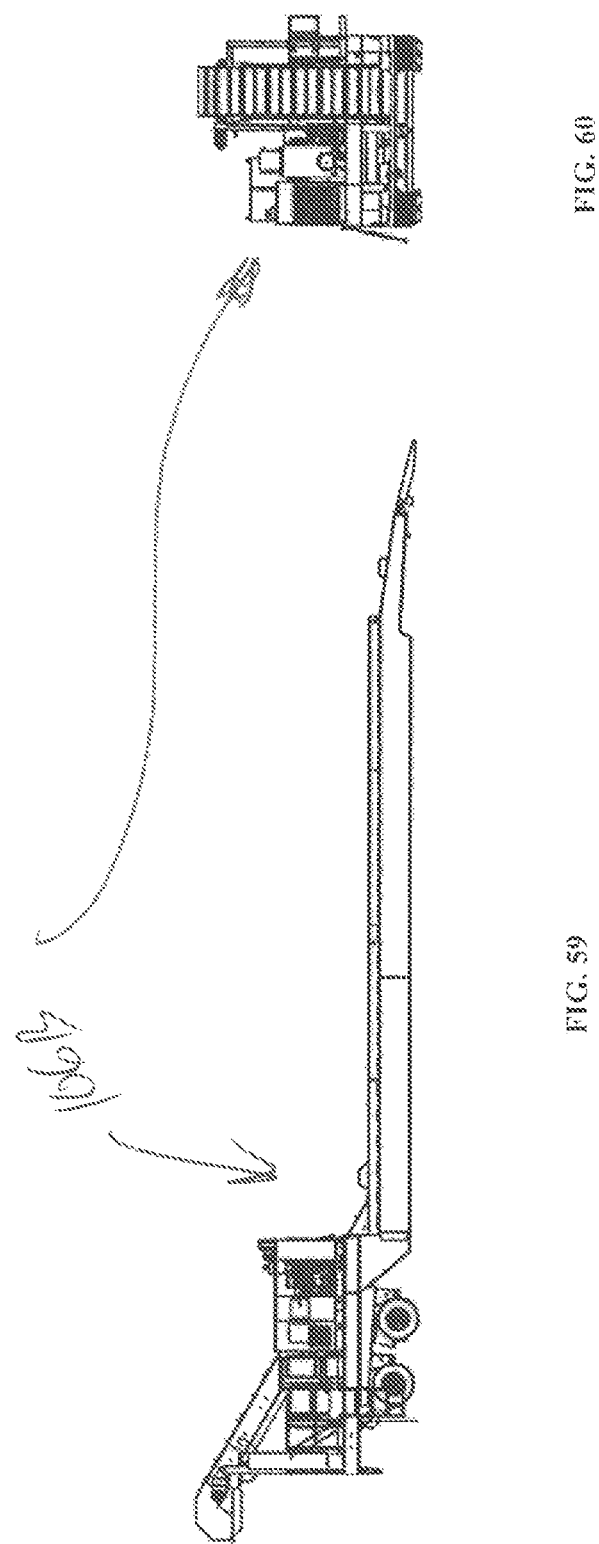

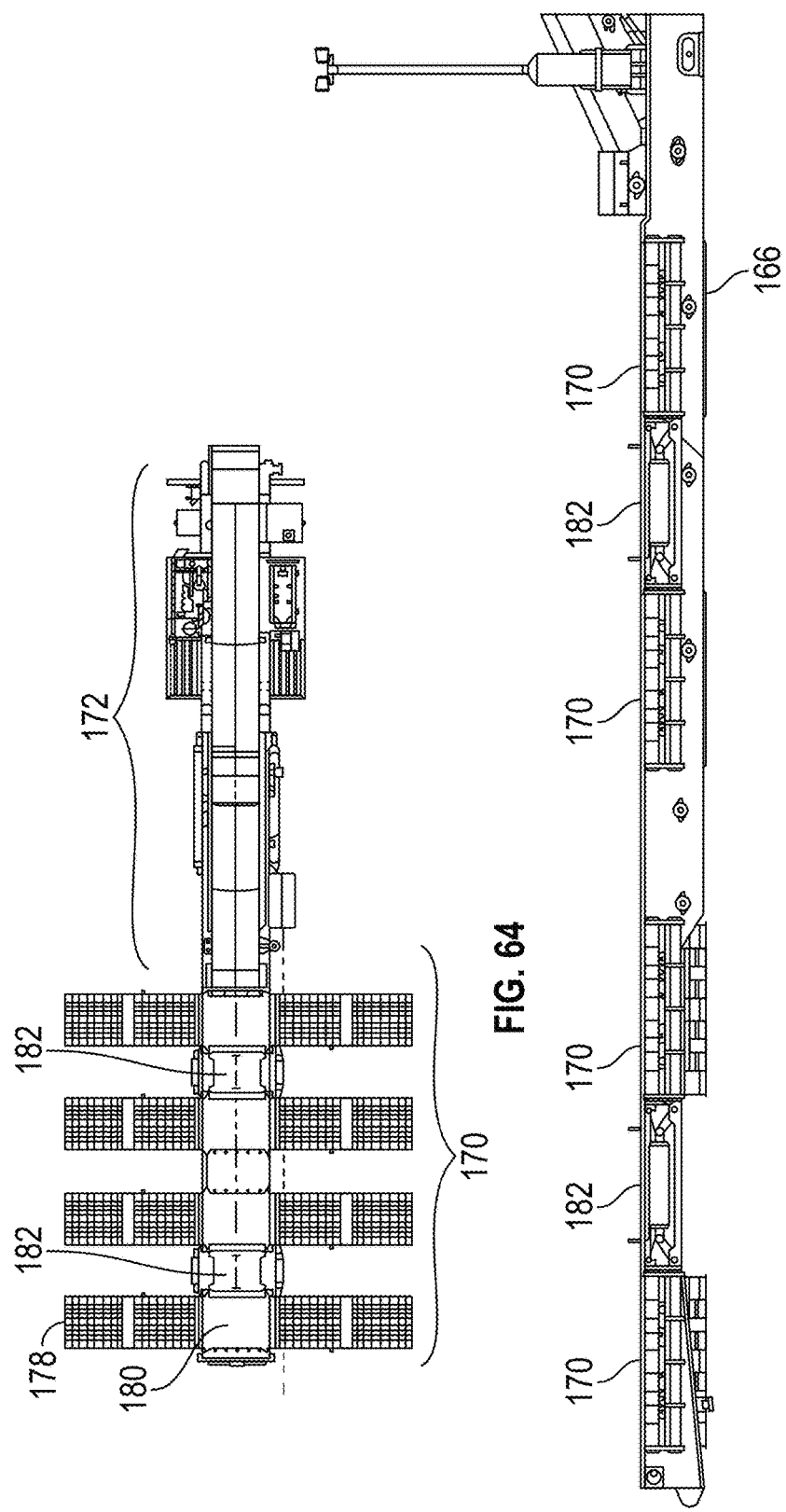
FIG. 64
FIG. 65
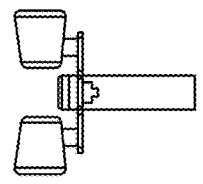
FIG. 69
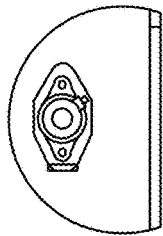
FIG. 68
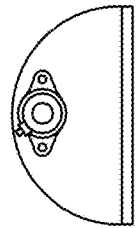
FIG. 67
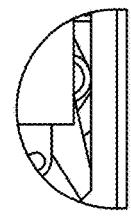
FIG. 66

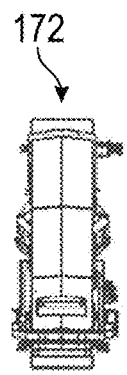
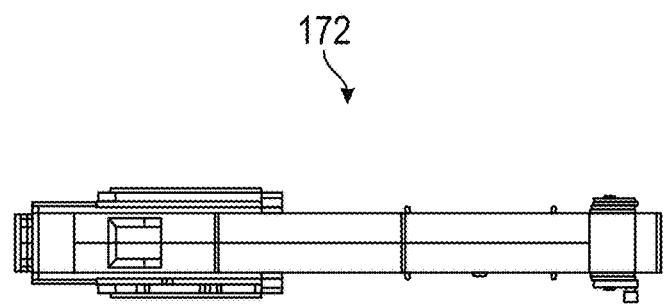
FIG. 71     FIG. 72
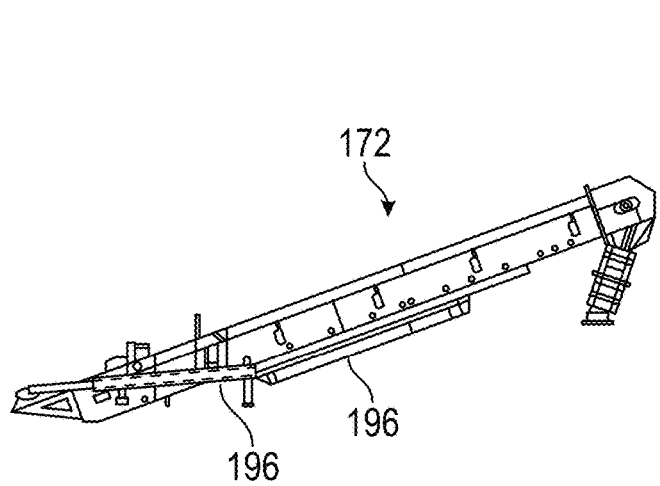
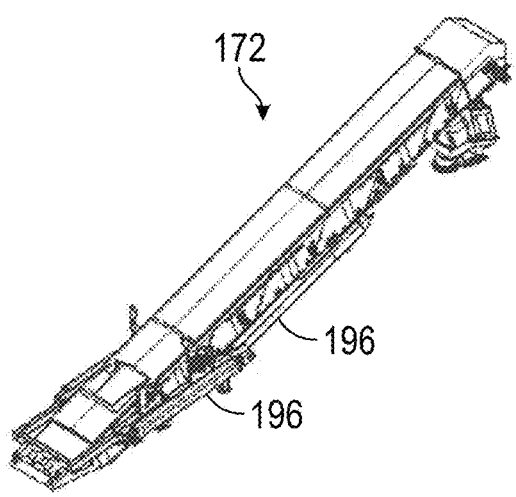
FIG. 73     FIG. 74

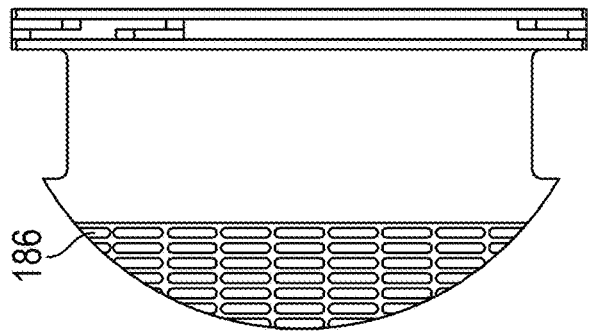
FIG. 99
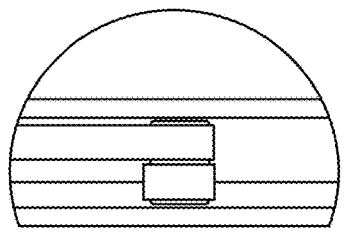
FIG. 101
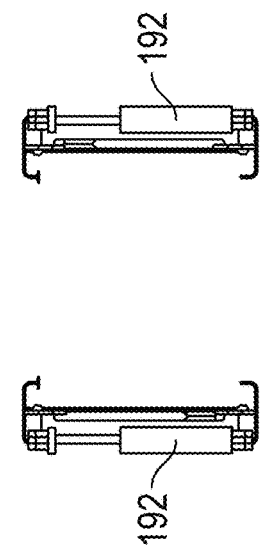
FIG. 98
FIG. 97
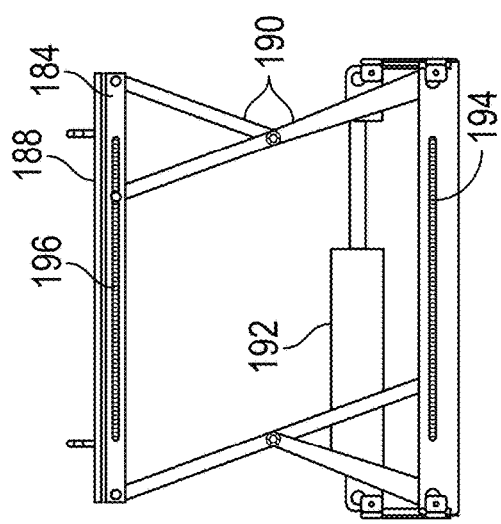
FIG. 100

- loading a silo onto a transporting trailer by:
  - arranging a rear end of a silo trailer adjacent a loading side of a silo
    - backing the trailer up to the silo
    - deploying the base engaging cylinders on the trailer to lift the rear wheels from the ground and engage the hooks on the silo with the pivot shaft on the rear end of the trailer, and lifting the adjacent silo feet
    - manipulating the rear end of the trailer side to side center or substantially center the trailer on the silo via the hydraulic sliding mechanism

- lifting lift frame of the trailer to engage the side of the silo by extending the hydraulic ram to pivot the lift frame from a generally horizontal position on the trailer to a generally vertical position adjacent the silo

- engaging the lift frame with the silo by actuating the pinning cylinders on the lift frame to engage the lugs or loops on the side of the silo

- lowering the lift frame to tip the silo downward from a generally vertical position to a substantially horizontal position on the trailer by retracting the hydraulic ram

FIG. 102A

PROPPANT SUPPLY SYSTEM

CLAIMS OF PRIORITY

This patent application is a U.S. National Stage Filing under 35 U.S.C. 371 from International Application No. PCT/US2019/051158, filed Sep. 13, 2019, which claims the benefit of priority to U.S. Provisional Patent Application No. 62/731,435, filed Sep. 14, 2018, each of which are incorporated by reference herein in their entirety.

FIELD OF THE INVENTION

The present disclosure relates to supplying proppant to hydraulic fracturing (frac, fracing, or fracking) operations at a well site. More particularly, the present disclosure relates to systems, equipment, and methods for 1) offloading proppant, which may include silica sand, from delivery vehicles, 2) transporting the proppant to storage bins, 3) placing the proppant in the bins, 4) releasing the proppant from the bins, 5) transporting the proppant to the fracturing operation, and 6) dispensing the proppant into the fracturing operation.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

During the Hydraulic Fracturing Process of Oil & Gas Wells, a slurry of Water, Additives, and Proppant are blended together in a Blender Unit and then pumped into a Well at pressures that are sufficiently high enough to fracture the formation, allowing the Proppant slurry to flood the resulting fracture cracks and fissures. After the Fracturing Process, the Water and Additives are pumped out of the well, leaving the Proppant in place in the cracks and fissures to act as a porous support structure that allows the oil and/or gas from the formation to flow into the well bore and be collected. Depending on the formation, the Fracturing Process for a well may be broken down into multiple individual "stages," with anywhere from 20 to 30+ Stages. Each Stage can utilize anywhere from 300,000 lbs to 500,000+ lbs of Proppant, so several million pounds of total proppant are required to fully complete the Fracturing Process. This can create a significant logistics challenge for transporting proppant, on-site storage of the proppant, loading the proppant to on-site storage, and delivery of the proppant to the Blender. Coupled with this problem is a drive to reduce the overall pad size "footprint" at the well site. In addition, the vast majority of the proppant utilized is high-silica sand. It is well known that respirable silica dust is a significant hazard, with permissible exposure levels established, and heavily enforced, by OSHA. In general, there are three Proppant systems for Proppant delivery and storage at Frac-Sites: FracSander Systems, Containerized Systems, and Silo Systems.

FracSander System:

FracSander systems may include a conveyor positioned under a horizontal rectangular storage bin. Generally, three to five FracSanders are utilized to provide enough on-site storage and a gathering-conveyor may be provided to combine the FracSander Conveyor outputs into one, all of which requires a very large footprint. During operation, manually controlled gates on the bottom of the FracSander bins may be used to control the proppant flow rate onto the conveyor to deliver into the Blender. In most FracSander Systems, the proppant is drop-discharged, meaning the proppant drops from height between the transfer points, causing dust to form due to the aeration and splashing of the proppant. FracSanders may be filled using pneumatic transport trailers which inherently produce significant amounts of respirable silica dust. It commonly takes 45 minutes for each transport trailer to unload, so typically several pneumatic transport trailers are utilized simultaneously, further compounding the dust problem and creating a relatively large pad footprint.

Containerized System:

Containerized Systems may include multiple individual Containers that incorporate a Discharge Gate on the bottom and a Fill Hatch on the top. Containers may be filled at the Proppant Supply Terminal, transported to the Frac Site, unloaded using a very large Forklift and stacked in a container storage area until they are ready to be used during Fracturing. The Containers are typically able to hold ~48,000 lbs of material to allow them to be legally transported to the Frac Site via specialized container trailers or flat-bed trailers. To have sufficient quantity of Proppant at the Frac Site, a large amount of area is required to store the equivalent amount of Proppant (~45 containers). Prior to beginning the Fracturing Process, the large Forklift stacks a small quantity of containers (generally 4) on top of a gathering conveyor or on a stand above the Blender. Since each stage of the Fracturing Process uses more Proppant than what can be initially setup, the Forklift must move quickly remove and replace the empty containers with filled containers. This urgency can lead to a dangerous situation.

Silo Systems:

Silo Systems are typically filled using Pneumatic Transport Trailers. As noted above, this process emits a great amount of Respirable Silica Dust. Also, due to the additional height of the Silos, the fill process is even slower than the FracSander System and typically takes upwards to 60 minutes to unload the Transport Trailer into a Silo. Just as in the FracSander System, this requires several Pneumatics to simultaneously unload, which further compounds the dust issue and increases the footprint of the system at the well pad. Silo Systems typically include a single gathering conveyor arranged between a sets of Silos, which lacks redundancy and establishes a relatively large footprint. Many current Silo Systems also utilize a drop-discharge onto a continuously moving high-rate conveyor, which creates further dust issues.

Technology advancements in drilling capabilities as well as hydraulic fracturing are creating a need for drastically more proppant required to frac a well. Due to this, proppant logistics is becoming a major player in the success of frac operations. The above-described systems have particular issues relating to dust, footprint size, and speed and are inadequate to keep up with the current proppant demand for fracturing operations.

SUMMARY

In one or more embodiments, a proppant supply system may include a base and a silo having an integrated bucket elevator arranged on the base. The proppant supply system may also include a drive-over loader configured for gravity feeding of proppant by transports and for conveying the proppant to the silo.

In one or more other embodiments, a loader for loading a silo may include a drive over portion configured for drive over of a transport and choke feeding of proppant on the transport and a drive over conveyor in the drive over portion, for carrying the proppant away from the transport. The loader may also include a rear incline conveyor for receiving the proppant from the drive over conveyor and for carrying the proppant upward to a gravity feed point.

In one or more other embodiments, a storage system for proppant may include a base and a plurality of silos configured for storing the proppant, arranged on the base, and having integrated bucket elevators. The storage system may also include a conveying system arranged on the base and below the silos for delivering the proppant to a blender.

In one or more other embodiments, a silo transport trailer may include a tongue for securing to a tractor, a plurality of axles and wheels on a rear end of the trailer, and a pivot shaft arranged on a rear end of the trailer. The trailer may also include a lift mechanism at or near the axles and wheels where the lift mechanism is configured to allow the rear of the trailer to shift side to side. The trailer may also include a tilting system for pivoting the silo to an upright position.

In one or more other embodiments, a method of supplying proppant to a frac spread may include receiving proppant with a loader from a transport via a gravity feed, conveying the proppant with the loader to a swiveling distribution head, selectively delivering the proppant to a selected silo, and receiving the proppant from the loader and bucket conveying the proppant into the silo. The method may also include feeding the proppant from the silo to a conveyor and conveying the proppant to a hopper.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 7 is a side view thereof.

FIG. 8 is a close-up view of a receiving area of the silo of FIG. 6, according to one or more embodiments.

FIG. 9 is a side view of the silo of FIG. 6, according to one or more embodiments.

FIG. 10 is a close-up view of counterbalance valves, according to one or more embodiments.

FIG. 14 is a side view of the silo of FIG. 6, according to one or more embodiments.

FIG. 15 is a close-up view of a bottom portion thereof.

FIG. 16 is a top view thereof.

FIG. 17 is a detail view of a roof feature, according to one or more embodiments.

FIG. 27 is a side view of a front portion of the silo trailer, according to one or more embodiments.

FIG. 28 is a top view thereof.

FIG. 29 is an end view of the silo trailer, according to one or more embodiments.

FIG. 30 is a close-up view of the silo trailer showing the lift frame cylinder system, according to one or more embodiments.

FIG. 31 is an end view opposite that of FIG. 29, according to one or more embodiments.

FIG. 40 is a front left perspective view of a primary base, according to one or more embodiments.

FIG. 41 is a front right perspective view thereof.

FIG. 42 is a rear right perspective view thereof.

FIG. 43 is a rear left perspective view thereof.

FIG. 44 is a front view thereof.

FIG. 45 is a top view thereof.

FIG. 46 is a right side view thereof.

FIG. 47 is a bottom view thereof.

FIG. 48 is a rear end view of the base with the blender delivery hopper in an operation position, according to one or more embodiments.

FIG. 49 is a rear end view of the base with the blender delivery hopper in a travel position, according to one or more embodiments.

FIG. 50 is a left side view thereof.

FIG. 55 is a top view thereof.

FIG. 56 is a right side view thereof.

FIG. 57 is a bottom view thereof.

FIG. 58 is a rear end view of the base, according to one or more embodiments.

FIG. 59 is a left side view thereof.

FIG. 60 is a front side view thereof.

FIG. 64 is a top view thereof.

FIG. 65 is a section view of the loader, according to one or more embodiments.

FIG. 66 is a detail view thereof, according to one or more embodiments.

FIG. 67 is a detail view thereof, according to one or more embodiments.

FIG. 68 is a detail view thereof, according to one or more embodiments.

FIG. 69 is a detail view of a light system, according to one or more embodiments.

FIG. 71 is a top view of a lower portion of a rear incline conveyor of the loader, according to one or more embodiments.

FIG. 72 is a top view of an upper portion of a rear incline conveyor of the loader, according to one or more embodiments.

FIG. 73 is a side view thereof.

FIG. 74 is a perspective view thereof.

FIG. 97 is a bottom view thereof.

FIG. 98 is a top view thereof.

FIG. 99 is a close-up partial top view thereof.

FIG. 100 is an end view thereof.

FIG. 101 is a close-up partial view thereof.

FIG. 102A is a partial diagram of a method of manipulating a silo, according to one or more embodiments.

DETAILED DESCRIPTION

The present application, in one or more embodiments, includes a mobile proppant system designed to improve available proppant capacity readily available on location to feed the frac spread, improve unload time of proppant transport trailers, increase system redundancy for reduction in nonproductive time on location, minimize the footprint on location, provide flexibility in layout based on well pad circumstances and traffic flow, and minimize dust. The system may be capable of unloading, storing, and supplying proppant to a hydraulic fracturing operation while having the ability to be mobile. This system may be designed to be set up for short periods of time, roughly 1 to 2 months, then be mobilized and moved to another location. The entire proppant handling mobile plant may be self-contained for rig up and rig down. The present system, thus, addresses several issues long since associated with current proppant supply systems and also addresses the increased proppant demand stemming from technology advancements in drilling capabilities and hydraulic fracturing.

Figure 1:
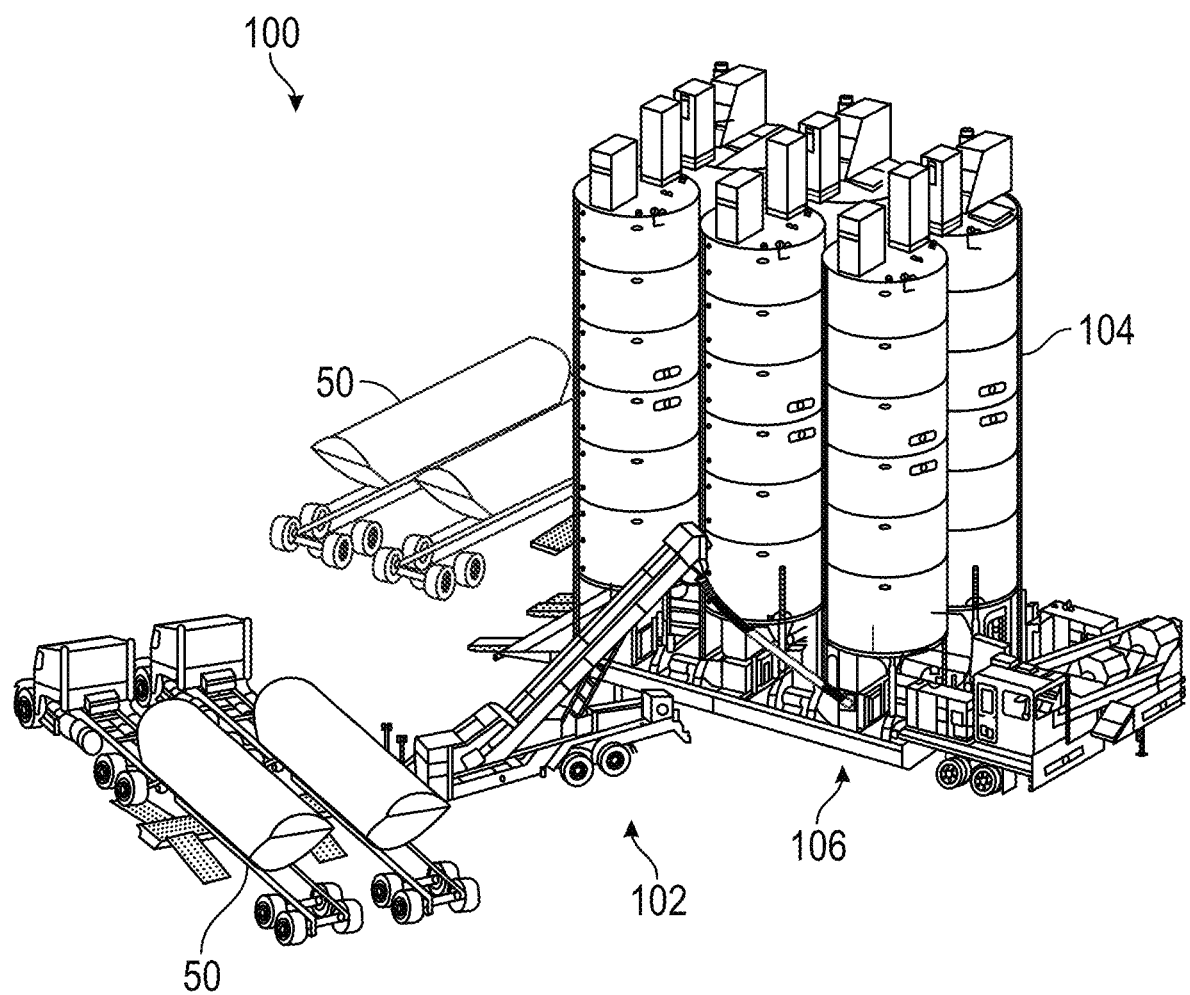
FIG. 1 is a perspective view of a proppant supply system, according to one or more embodiments.
Figure 2:
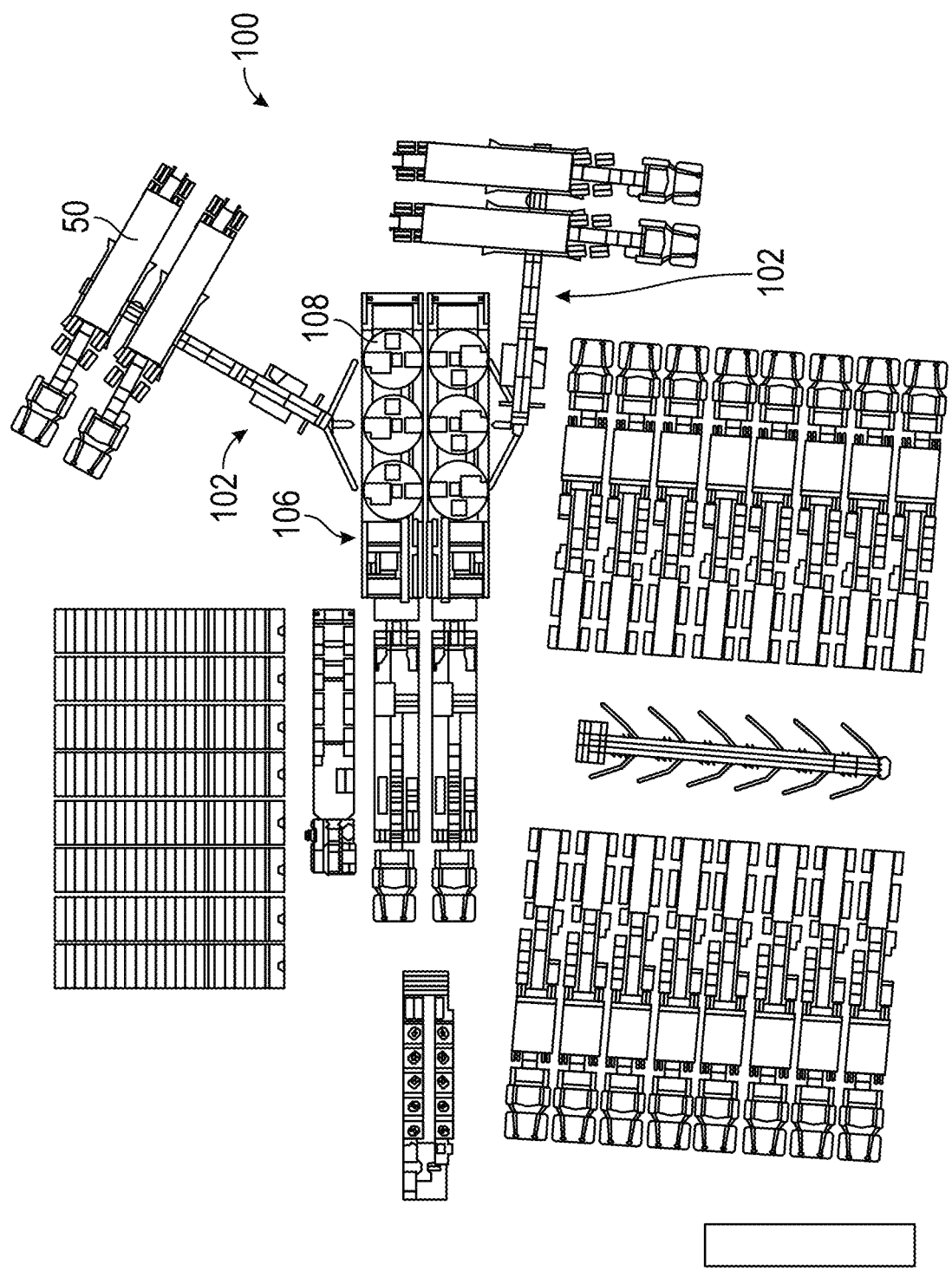
FIG. 2 is a top plan view thereof.

Referring to FIG. 1, a proppant supply system 100 may include a loader 102, a silo 104, a base 106 for the silo, and a silo transport trailer 108 (not shown in FIG. 1). The system 100 may be arranged on a well pad and may receive proppant delivery from trucks 50, store the proppant for a period of time, and deliver the proppant to a frac operation when it is needed. As shown in FIG. 1 and from above in FIG. 2, for example, the loaders 102 may be configured to pivot about a central silo filling point and, as such, the loaders 102 may have a versatile arrangement. Since the trucks 50 delivering the proppant drive over the loaders, the position of the loaders may control traffic flow around the site and the versatility of the loader location provides a great advantage over known systems and may contribute to a reduced footprint. In addition, the loader may be set up in a location where it may remain for the duration of the hydraulic fracturing process without the need for moving the loader and maintaining the continuing ability to feed any of the connected silos. Still further, the loader may be a conveying-type system and may cut down on dust generation when compared to pneumatic sand delivery systems. Further advantages of the system as a whole and particular portions of the system will become apparent with a further review of the application.

Referring now to FIGS. 3-19, a silo 104 or system of silos 104 is shown. In one or more embodiments, the silos 104 may be portable silos with integrated bucket elevators 110. The silos 104 may be configured for placement on a base 106 and may be secured to the base. The silos may allow for large amounts of proppant to be stored in a vertical fashion thereby reducing or minimizing the footprint of the storage facility on the well pad. The bucket elevator 110 may be arranged within the silo to allow for protection to the bucket elevator and to accommodate shipping restrictions and requirements, for example. That is, were a silo sized to accommodate shipping restrictions and the bucket elevator arranged outside the silo, the bucket elevator may be subject to damage and may also go beyond the dimensions suitable for shipping when the silo is arranged on its side, for example. The integration of the bucket elevator into the silo provides for redundancy because at times when the bucket elevator breaks down, alternative bucket elevators may be available to continue loading proppant into other silos.

Each silo may include a shell 112 forming a storage volume for storage of proppant. The shell 112 may include a relatively thin steel material having a thickness designed and selected to support the shell above it as well as withstand the hoop stresses induced in the material from the stored proppant material. The shell may include a top portion or roof and a bottom portion. The top portion may be slightly conical to provide for water run off and the bottom portion may have a more pronounced conical shape for funneling proppant to an exit port 114 generally centered at the bottom side of the bottom portion. The bucket elevator 110 may be arranged within the shell and, as such, within the storage volume. The bucket elevator may include a plurality of buckets, paddles, or bins arranged on a belt or chain and designed to scoop proppant from a receiving area 116 at or near the bottom of the silo and carry the proppant to the top of the silo. The bucket elevator may be separated from the storage volume by an elevator shaft and the buckets or bins of the elevator may carry the proppant within the elevator shaft to the top of the silo and dump or otherwise discharge the proppant out of and/or over the top of the elevator shaft and into the storage area.

As shown, the silo 104 may include a receiving area 116 for receiving proppant from the loader 102. The receiving area 116 may be arranged at the base of the silo and, for example, in line with the vertically extending and integrated bucket elevator. As proppant is delivered to the receiving area, the bucket elevator may lift it to a location at or near the top of the silo and dump it into the storage area of the silo. The bucket elevator may be configured to operate relatively quickly to assist in quickly unloading delivery trucks.

Figure 3:
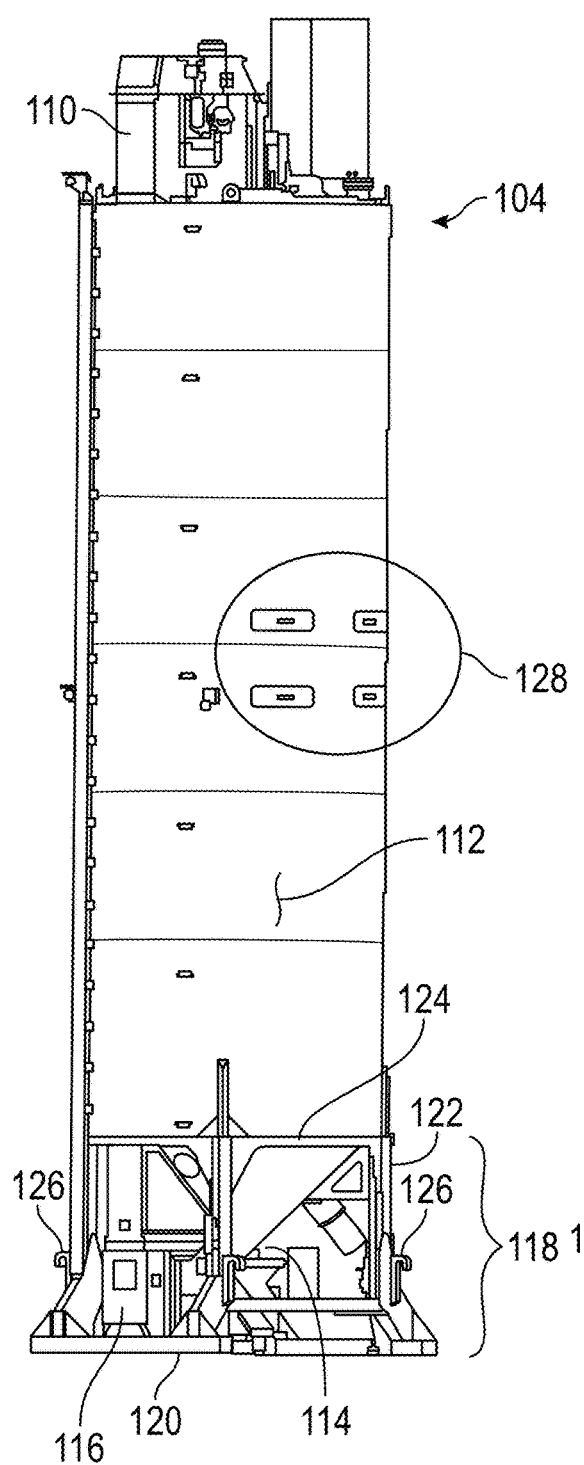
FIG. 3 is a perspective view of a receiving area side of a silo of the proppant supply system, according to one or more embodiments.

The receiving area 116 may include a connection port adapted for secured and closed connection with the loader. That is, as shown in FIG. 3 (unconnected) and in FIG. 1 (connected), the receiving area may be configured for attachment of a feed line extending down from a swivel head or other proppant flow directing device arranged at or near the top of the loader 102. The receiving area may include an opening for receiving proppant and may include an attachment mechanism on an outside surface thereof. For example, an angle may be arranged on the surface of the receiving area around the sides and bottom of the opening to form a rim slot that a feed line transition may be slid into. The transition may include a round shape for connection to a round feed line and may transition to a rectangular shape with a rectangular flange. For connecting, the flange may be arranged flush with an outside surface of the receiving area and above the opening. Sliding the transition downward may secure the transition over the opening where the flange slides along an into the rim slot. The receiving area may be in fluid communication with and/or otherwise lead to a base of the bucket elevator such that proppant delivered to the receiving area may be lifted by the bucket area to the top of the silo for dumping into the storage area of the silo.

Figure 5:
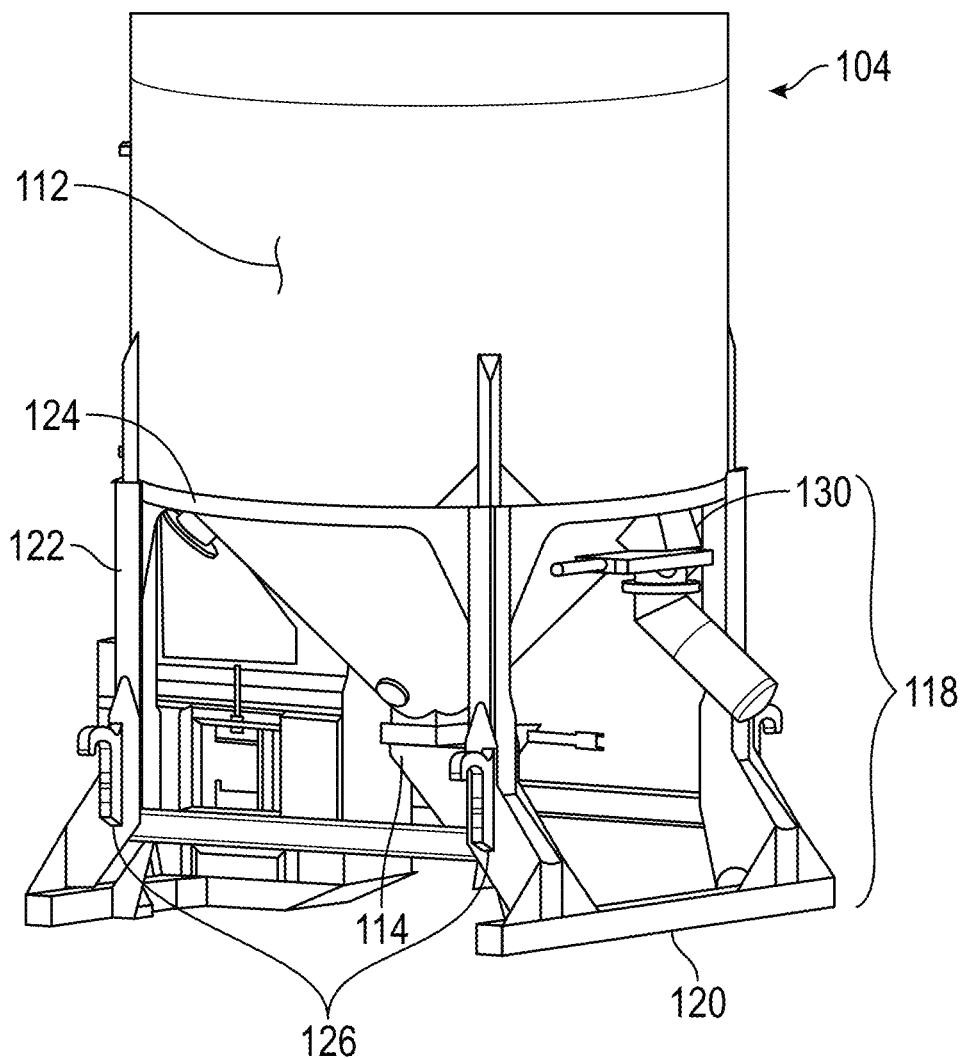
FIG. 5 is a close-up view of a bottom portion thereof.
Figure 6:
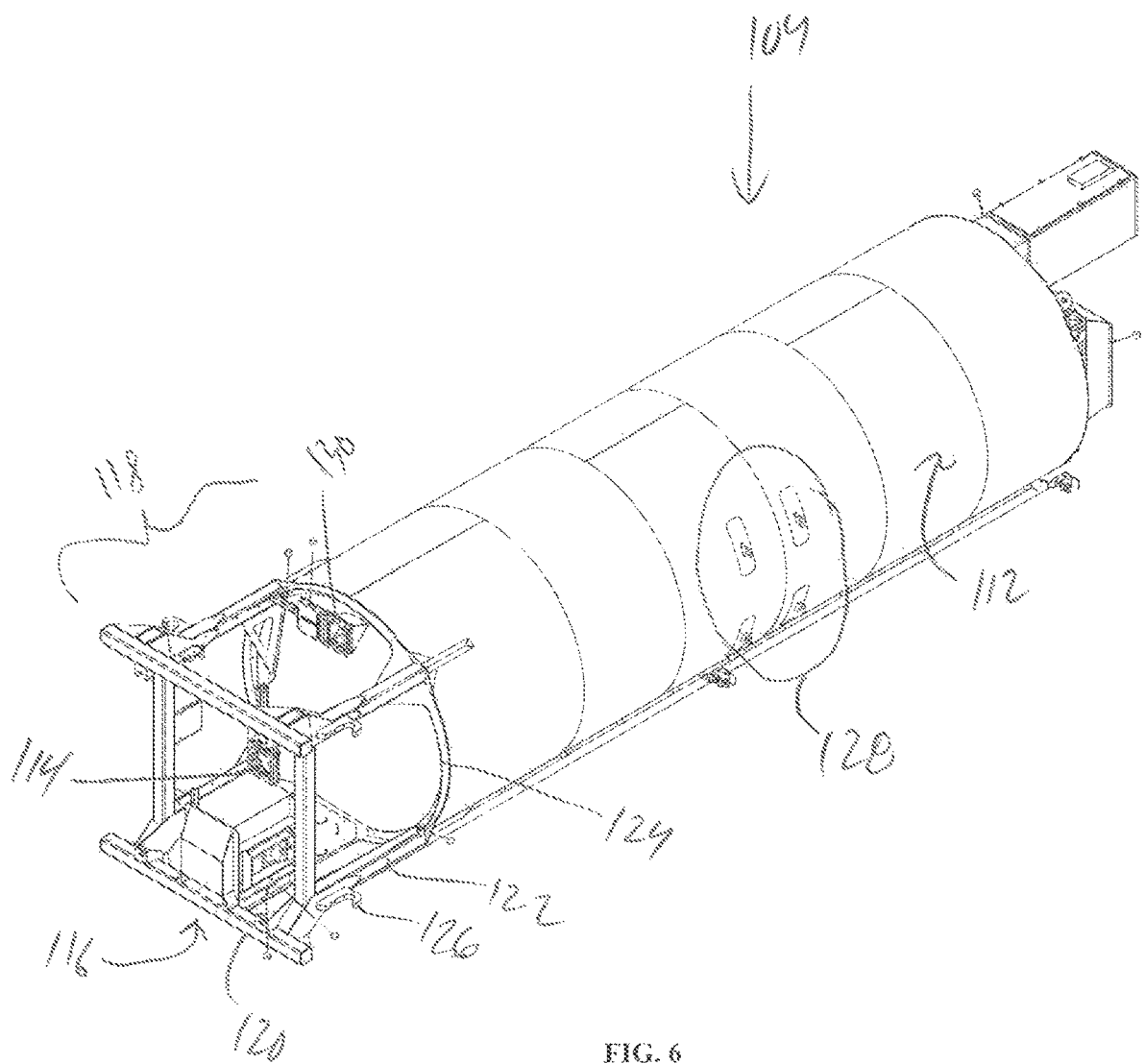
FIG. 6 is a perspective laying down view of a silo, according to one or more embodiments.
Figure 13:
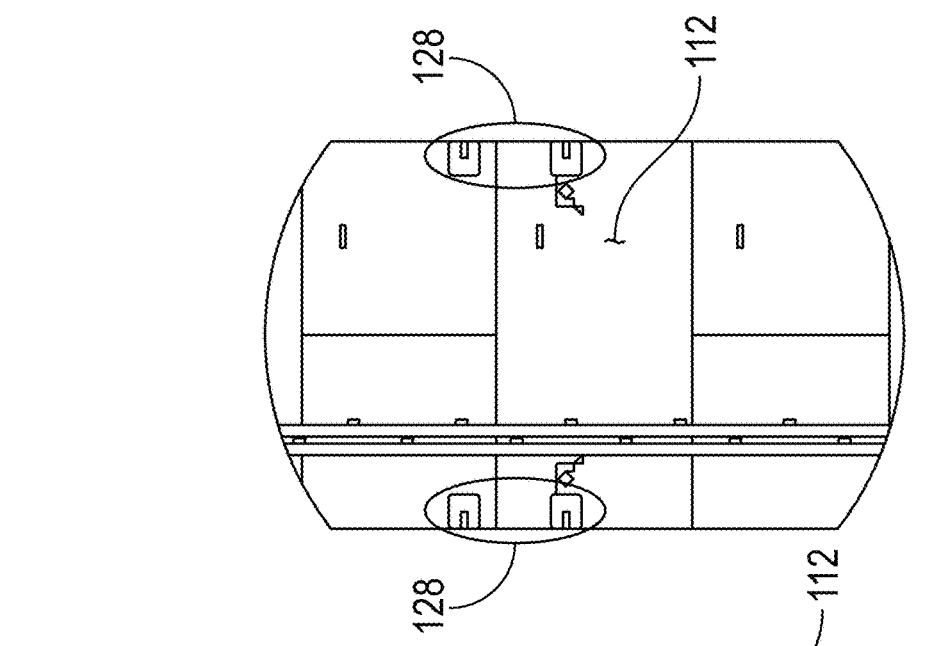
FIG. 13 is a close-up view of a center portion thereof.
Figure 12:
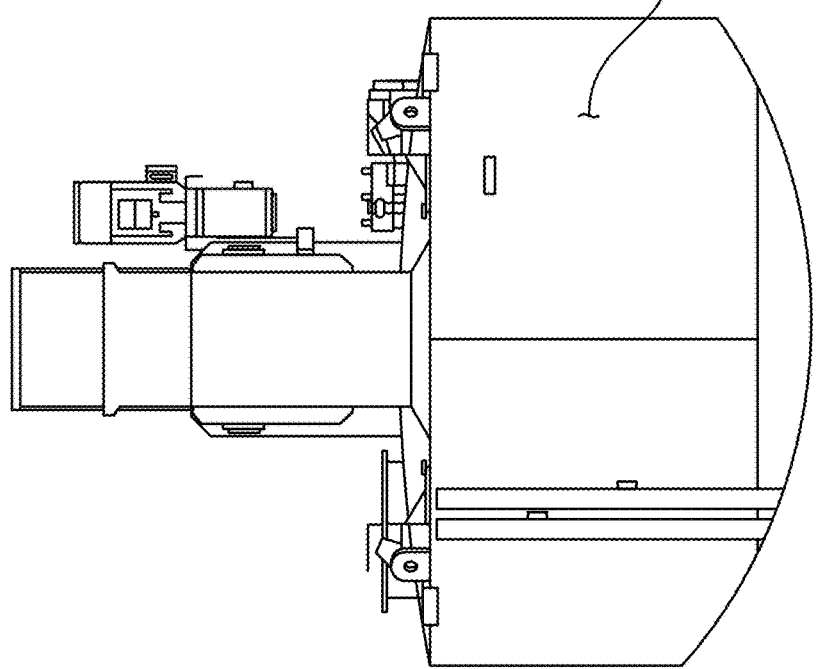
FIG. 12 is a close-up view of a top portion thereof.
Figure 11:
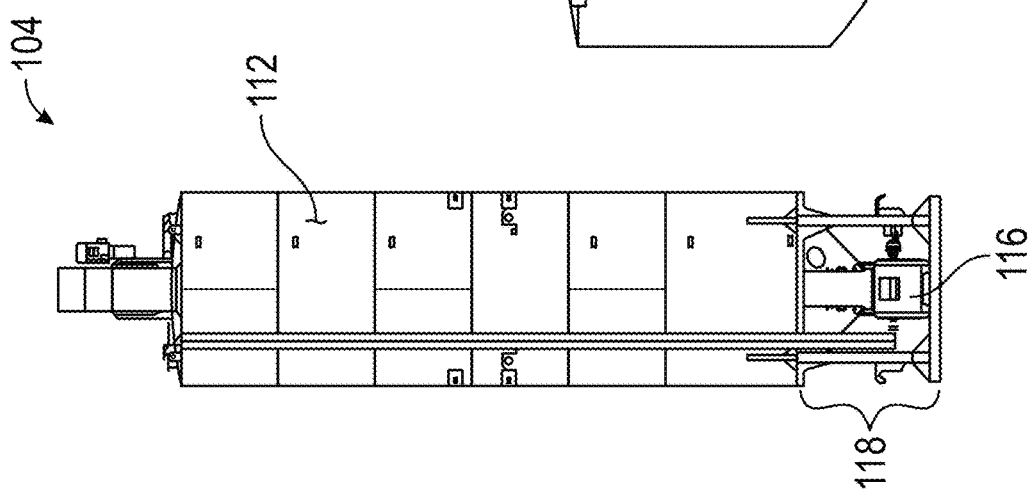
FIG. 11 is a side view of the silo of FIG. 6, according to one or more embodiments.
Figure 19:
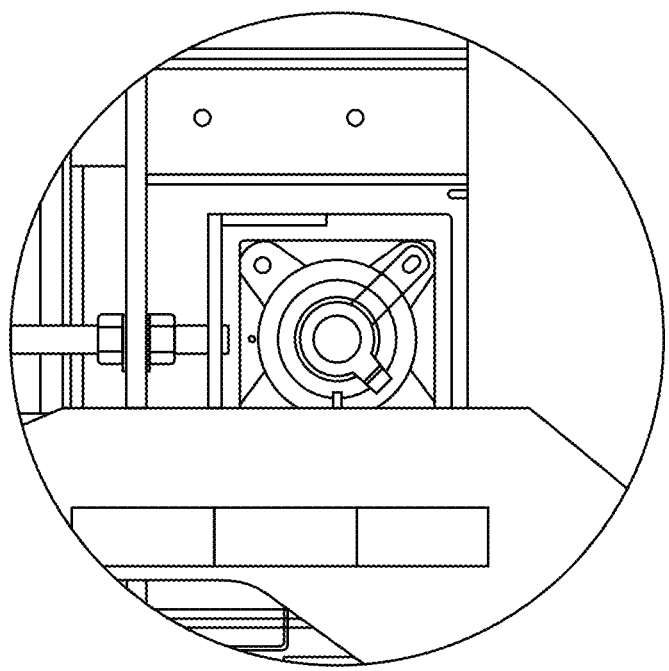
FIG. 19 is a close-up view of a bottom portion thereof.
Figure 18:
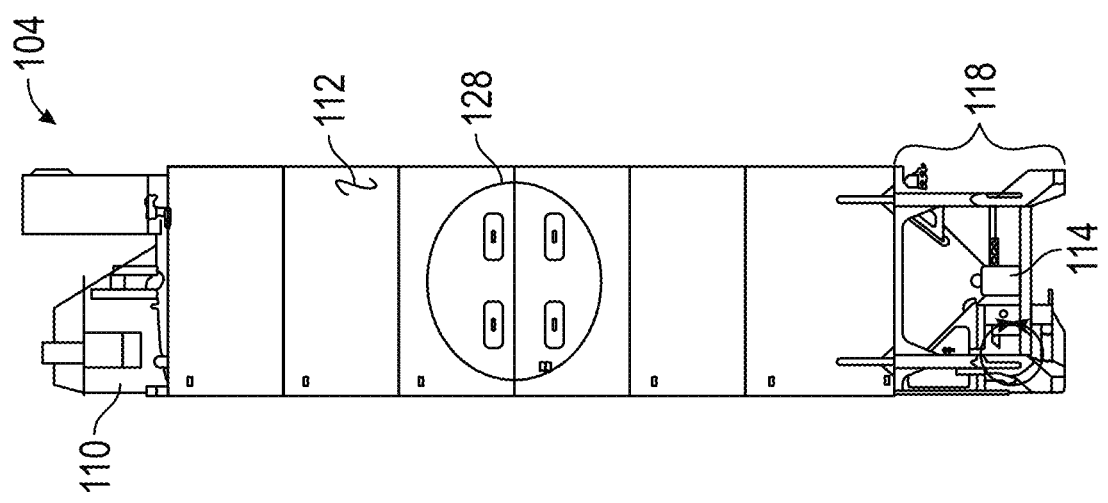
FIG. 18 is a side view of the silo of FIG. 6, according to one or more embodiments.

The silos may each include a supporting frame 118. The base may include an offsetting frame that supports the shell and integrated bucket elevator in an upright position relative to the ground and/or a supporting base 106. The frame 118 may hold the shell portion above the ground or base 106 allowing for clearance of the conical bottom portion of the shell to extend downward from the cylindrical portion of the shell. The frame may include a bottom support portion or rail system 120 configured for attaching to the supporting base 106. The frame may also include uprights 122 for extending from the bottom support portion up to and along the cylindrical portion of the shell. The frame may also include an upper hoop 124 for engaging the peripheral and bottom end of the cylindrical portion of the shell. The bottom support portion 120, uprights 122, and upper hoop 124 may define a working area below or around the bottom portion of the shell. For example, the bottom discharge and the backup discharge may extend from respective portions of the shell within the frame. The receiving area and the bottom of the bucket elevator may also be arranged within the frame. As described in more detail below, the frame may include one or more hook brackets 126 for controlling the delivery and offloading of the silo from a trailer, for example. As shown in FIGS. 5-6, the hook brackets 126 may be arranged on the uprights of the frame and may extend outward from the frame for a hook distance and then downward forming a, sort of, reverse hook for holding the silo up and/or defining a pivot axis about which the silo may be tipped upright and/or tipped downward to a laying position, for example.

Figure 4:
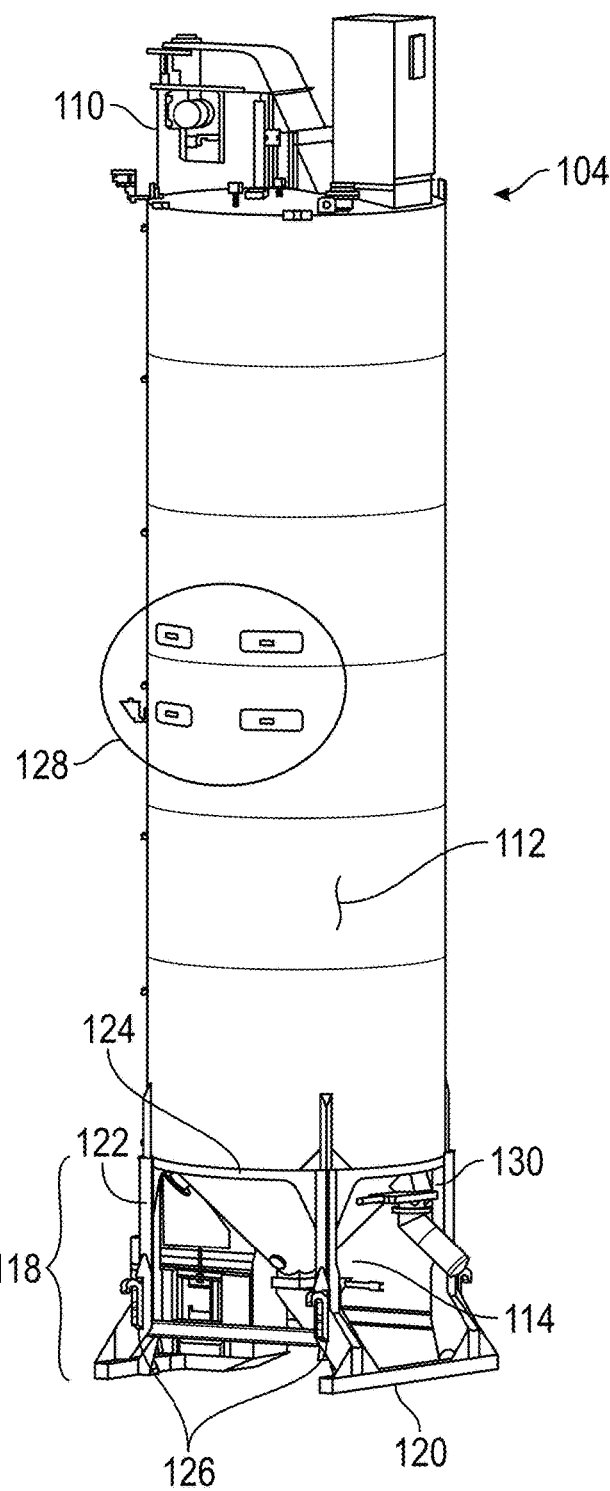
FIG. 4 is a perspective view of a backup discharge side of a silo of the proppant supply system, according to one or more embodiments.

As shown in FIGS. 3, 4, and 6, related securing structures 128 for interfacing with the trailer 108 may be provided. For example, a plurality of lugs may be provided on the side of the shell for securing the silo 104 to a trailer 108. As shown, the securing features 128 may include a reinforcing pad or plate welded or otherwise secured to the side of the shell 112 and a loop, lug, or other feature may be provided and welded or otherwise secured to the reinforcing pad for engaging with cylinders or other engaging features of the trailer 108, discussed in more detail below.

One or more silos 104 may be provided and they may be set up on a well pad on top of a base 106. The base 106, discussed in more detail below, may include a conveyor system arranged beneath the silo or group of silos and may be adapted to collect proppant from the silos and deliver it to a blender. The location of the conveyor below the silo (as opposed to adjacent the silo) may further contribute to a reduction in the footprint size of the system on the well pad. In one or more embodiments, two sets of silos each with their own base and conveyor may be arranged on the well pad and the system may be configured to use one or both of the conveyors to deliver proppant to the blender.

Figure 20:
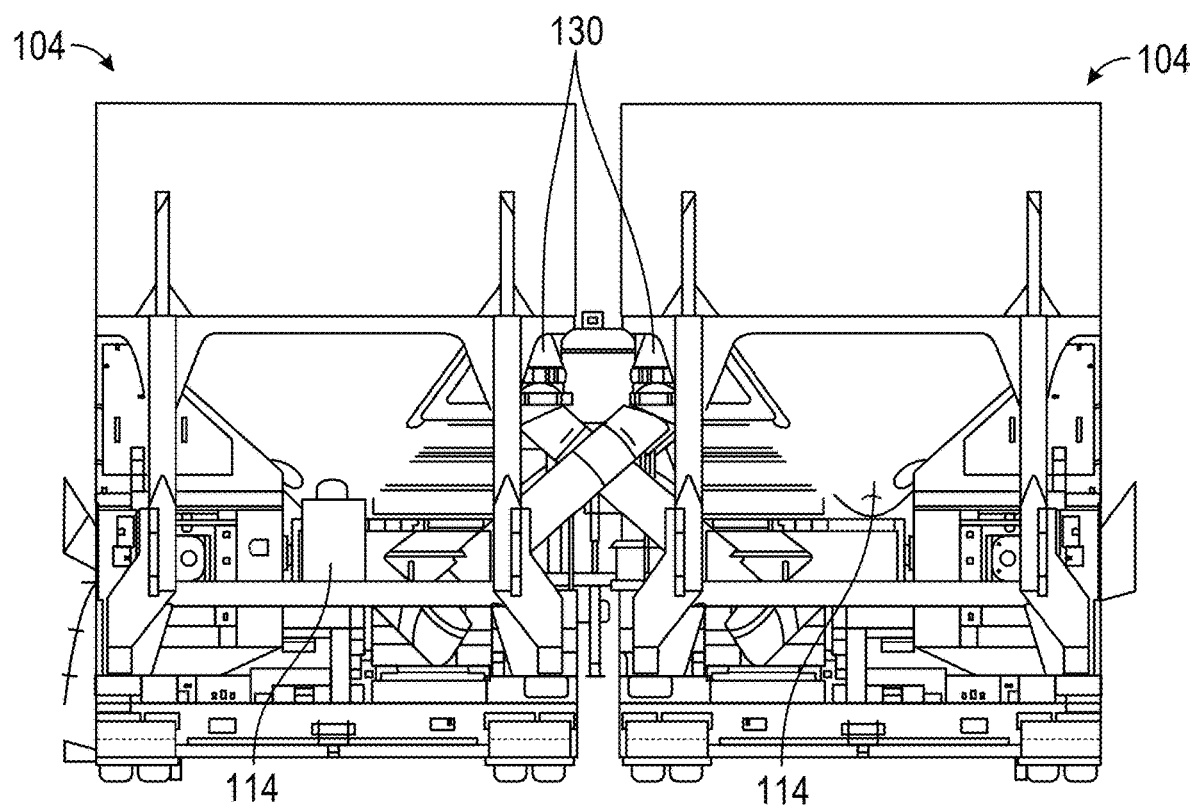
FIG. 20 is a side view of a bottom portion of a pair of silos arranged adjacent to each other on respective bases and having crossover discharges, according to one or more embodiments.
Figure 21:
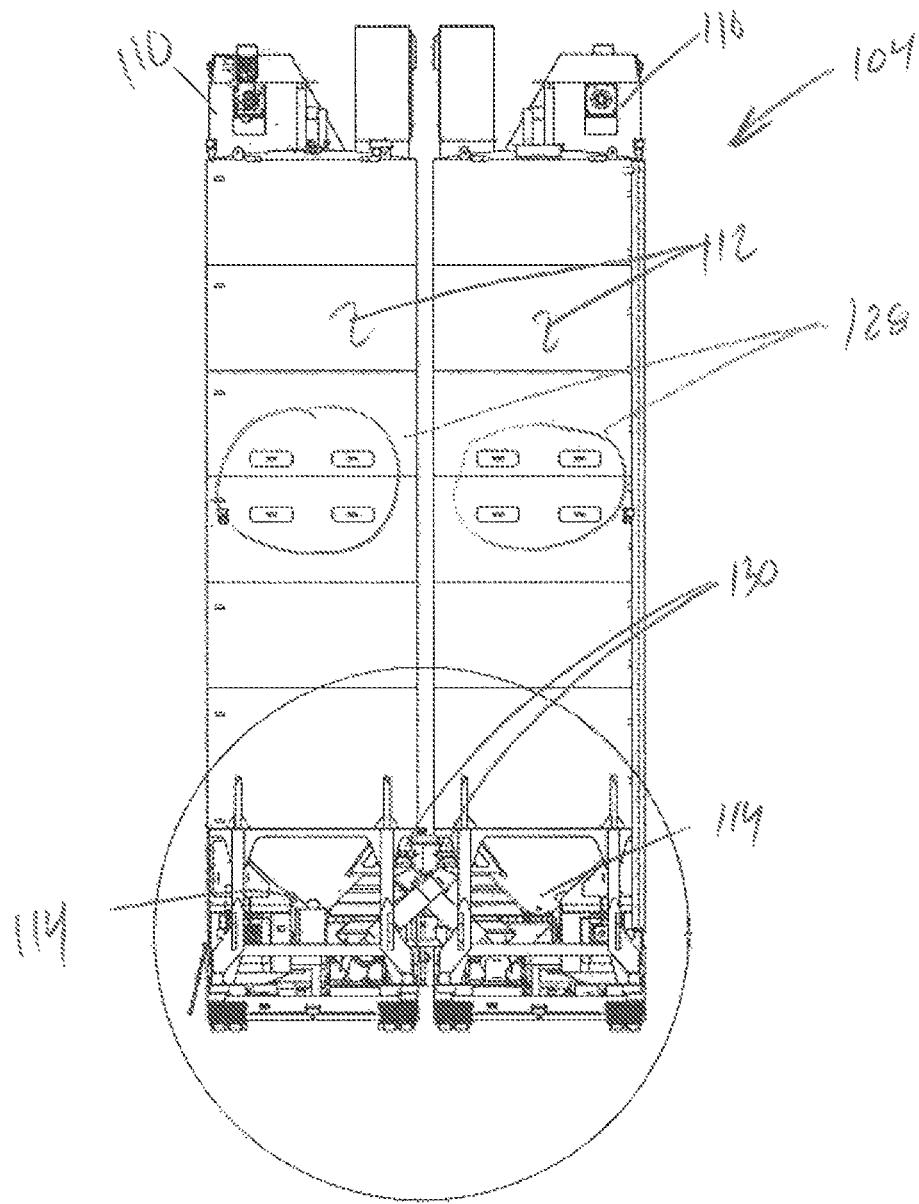
FIG. 21 is a side view of a pair of silos arranged adjacent to each other on respective bases and having crossover discharges, according to one or more embodiments.
Figure 22:
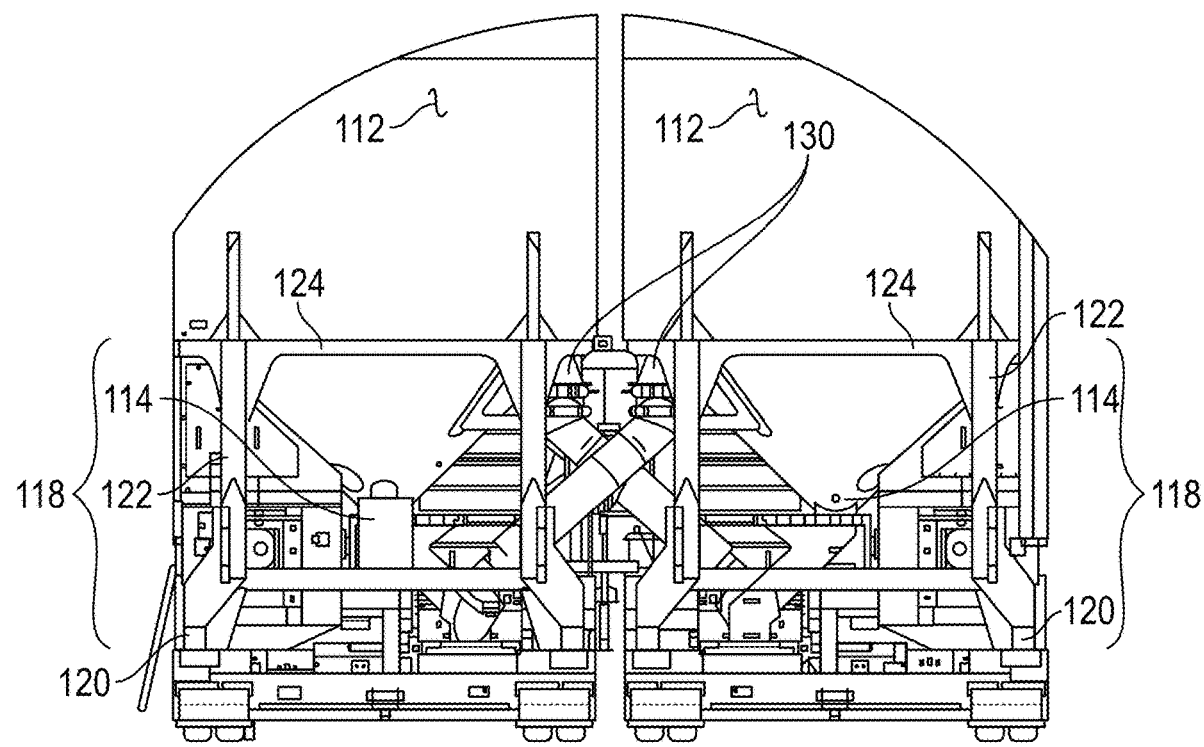
FIG. 22 is a close-up side view of a bottom portion thereof.

As shown in FIGS. 20-22, the silo may include dual distribution systems. That is, the silos may be designed to gravity feed out of a main discharge gate 114 onto the conveyor installed in the base 106 that the silo is installed on. The proppant may be gravity fed onto the conveyor and the conveyor speed may define the rate at which proppant is dispensed. The silo 104 may, more simply, be the storage vessel with fill level notification. In addition, each silo may be adapted to discharge through the backup distribution point 130. This is for redundancy purposes. If discharging through the backup distribution point 130, the proppant may be gravity fed to the opposite base conveyor where the speed of the opposite base conveyor may define the rate at which proppant is dispended. The intention is to be able to continue the use of the silo in the event there is a failure on the conveyor that the silo is installed on.

As shown in FIG. 5, main discharge chute 114 may be arranged at or near the center of the bottom conical portion of the shell 112 and may be adapted to guide proppant out of the silo and onto the conveyor belt generally directly below the silo. The discharge chute may extend at an angle from an outlet on the bottom conical portion of the shell so as to gently deliver proppant to the conveyor. Similarly, but separately, a secondary or backup discharge chute 130 may be provided. The backup chute 130 may be arranged on an inboard side of the silo so as to more readily access a neighboring conveyor not passing below the silo. In one or more embodiments, as shown, the backup discharge chute 130 may be arranged near a top portion of the conical bottom portion and may extend downward and away from the silo so as to gently deliver proppant to the neighboring conveyor.

The above-described silo system may be advantageous for 1) reducing the footprint of the proppant storage area by storing the proppant vertically, 2) further reducing the footprint by placing the conveyor below the silos, 3) establishing a redundant system that accommodates conveyor failures without interrupting operation of the system and avoiding down time, and 4) allowing for gravity discharge onto the conveyor.

FIGS. 23-31 show a trailer system 108 that may be used for transporting the silos 104 to and from a well pad. The trailer system 108 may be particularly adapted to carry the silo while maintaining the silo/trailer combination within shipping restrictions. The trailer may be further configured for safely erecting the silo on a base 106 at a well pad. Alternatively or additionally, the trailer may also be further configured for safely erecting the silo on the ground. This may be suitable for storage situations or for turning the silo around on the trailer, for example. In one or more embodiments, the several silos at a location may be substantially the same or even identical, so the facing direction on the trailer may define its facing direction on the base. As such, depending on how the silo was loaded on the trailer, it may need to be rotated prior to erecting it on a base. In one or more embodiments, the trailer 108 may be configured for connecting to 1 of 2 sides of a silo and the silos 104 may be adapted to connect to the trailer via 1 of 2 sides.

As shown, the trailer 108 may include a hitch portion 132 for engaging a tractor, a trailer bed 134, and a lift frame 136 for receiving the silo, and a set of axles/wheels 138 for rollably supporting the rear part of the trailer. The lift frame or cradle 136 may be arranged on the trailer bed 134 and may be configured for nestably receiving the silo and may include a pivot shaft 140 arranged at a rear end of the trailer bed. As discussed, the silo may include a hook or pair of hooks 126 that engage the pivot shaft 140 and causes the silo to pivot about the pivot shaft when a top/front portion of the silo is lifted via the lift frame from the trailer bed.

Figure 23:
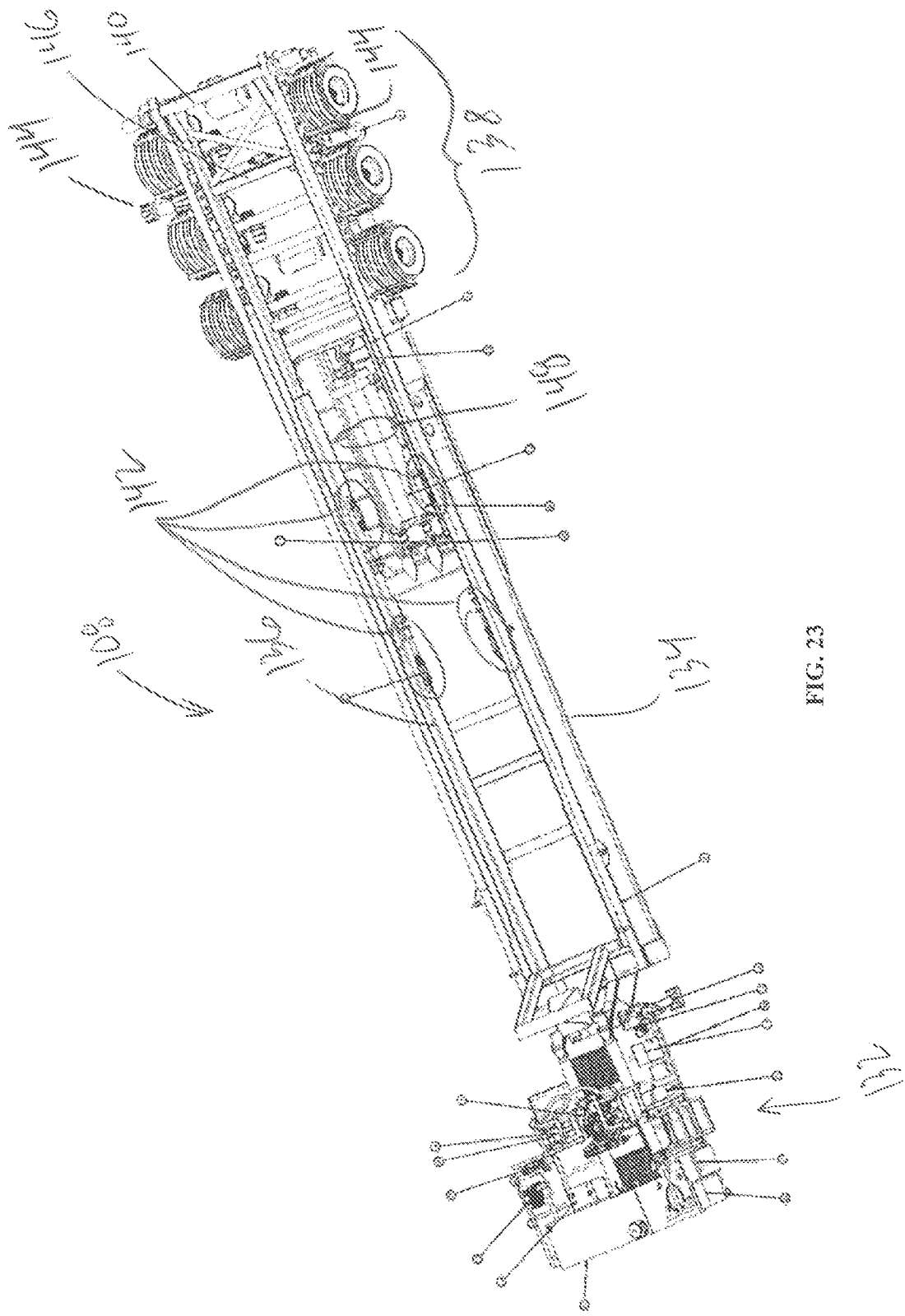
FIG. 23 is a top perspective view of a silo trailer, according to one or more embodiments.
Figure 24:
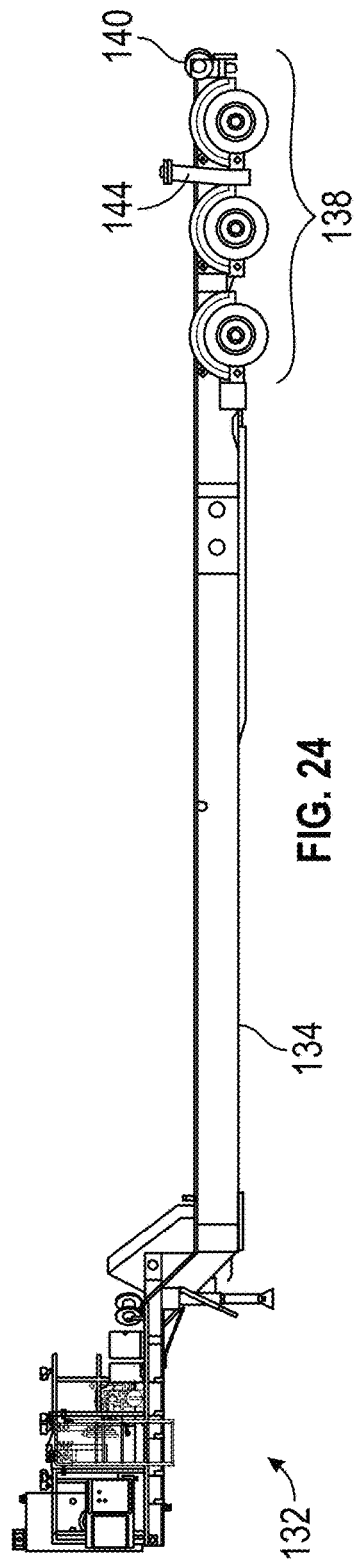
FIG. 24 is a side view thereof.
Figure 25:
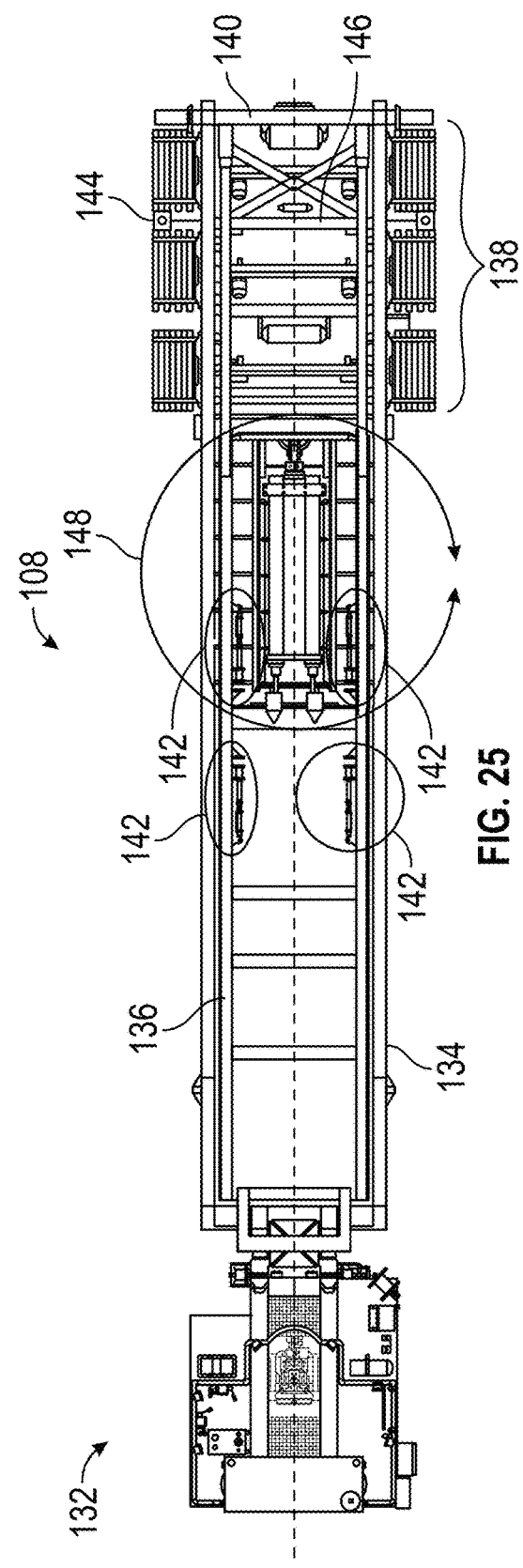
FIG. 25 is a top view thereof.
Figure 26:
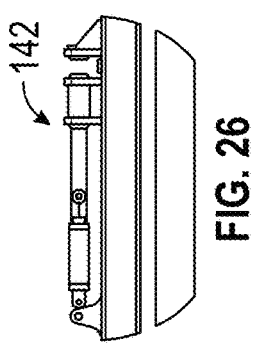
FIG. 26 is a close-up view showing a pinning cylinder, according to one or more embodiments.
Figure 32:
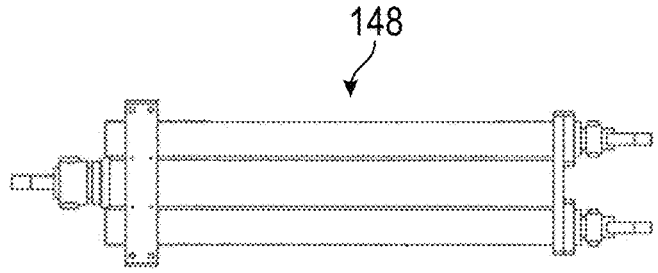
FIG. 32 is a top view of the lift frame cylinder system, according to one or more embodiments.
Figure 33:
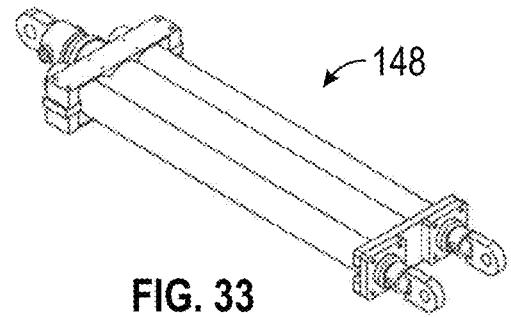
FIG. 33 is a perspective view thereof.
Figure 34:
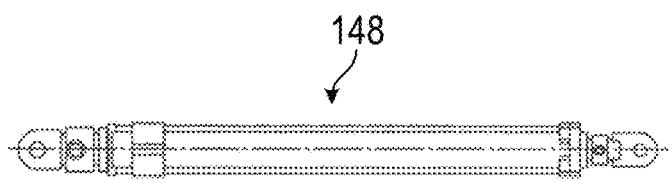
FIG. 34 is a side view thereof.
Figure 35:
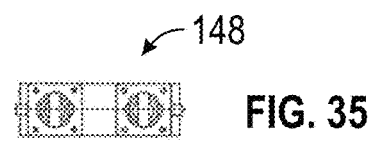
FIG. 35 is an end view thereof.

The lift frame 136 may be configured to engage a lifted silo via 4 pinning cylinders or other grasping or securing elements 142. For example, and as shown in FIGS. 23 and 25 and more closely in FIGS. 26 and 30, a plurality of grasping elements 142 may be provided. As shown, the grasping element 142 may include pinning cylinders adapted to engage the lugs 128 on the side of the silo 104. That is, as discussed above, the silos may include a plurality of lugs or loops 128 and the lift frame 136 may include a plurality of corresponding cylinders systems adapted to drive or extend a pin through the lugs to secure the silo to the lifting frame, and, thus, the trailer 108. In one or more embodiments, when loading the silo onto the trailer, the lift frame may be lifted and arranged adjacent to the silo causing the cylinder systems to receive the lugs. The cylinder systems may be actuated to drive or extend a pin through the lugs to engage the silo with the lift frame.

The trailer may also include a pair of ground or base engaging cylinders 144 arranged amidst the rear axles/wheels for securing and/or lifting the rear end of the trailer during loading and offloading of the silo 104. These cylinders 144 may be mounted on a hydraulic sliding mechanism 146 that allows the rear of the trailer to shift from side to side to allow alignment of the trailer with the silo and the silo with the base. For example, a housing tube may be arranged on the back end of the trailer with a sliding tube within the housing tube. The base or ground engaging cylinders 144 may be mounted to the sliding tube and, as such, the articulation of the sliding tube relative to the housing tube may allow for shifting of the cylinders relative to the trailer. The sliding tube may articulate via a rack and pinion, hydraulic, or other relative movement mechanism.

This side-shift feature may allow the transport trailer to be adjusted so that it is centered on the silo when it is backed up to engage an erected silo. The side-shift may allow the transport trailer to center the silo on the base when erecting the silo or center the trailer on the silo when taking the silo down. In one or more embodiments, a mechanism may be provided that may allow side shifting of the kingpin on the front of the transport trailer (where the trailer attaches to the tractor fifth-wheel plate) to allow the front of the transport trailer to shift to help place the transport trailer in alignment with the base and the silo.

As shown in more detail in FIGS. 32-35, a hydraulic ram 148 may be provided to lift and lower the lift frame 136. The ram 148 may include one or more telescoping hydraulic cylinders. In addition, the hydraulic ram 148 may include two additional single stroke or non-telescoping hydraulic cylinders extending from an end of the telescoping cylinders. These two additional single stroke or non-telescoping hydraulic cylinders may allow for careful adjustment of the tipping of the silo and, unlike many known telescoping cylinders, may avoid the need to fully extend and/or fully retract the cylinders during each use.

During offloading of the silo, the rear portion of the trailer may be lifted slightly by the ground engaging cylinders 144. The silo may be lifted from the trailer bed by pivoting the lift frame with a hydraulic ram. In one or more embodiments, a kicker cylinder may be provided at or near the front of the trailer to get the silo up to an angle (or down from an angle when laying down) to lessen the loads on the main lift cylinder, for example. The hydraulic ram may be particularly suited for controllably tipping the silo about the pivot shaft causing the feet of the silo pivot toward the ground and causing the main body of the silo to pivot upward away from the trailer. The feet 120 of the silo may be arranged at a distance away from the hooks 126 of the silo. The distance may be similar to the height of the pivot shaft 140 above the ground when the ground engaging cylinders 144 lift the rear end of the trailer 108. In one or more embodiments, when the feet of the silo reach the ground, the silo may be arranged in a substantially vertical position, but slightly tipped away from the trailer since the feet adjacent the trailer may still be slightly lifted off of the ground. In addition, once the silo is standing in this generally upright position and is secure, the ground engaging cylinders on the trailer may be retracted to lower the rear end of the trailer, lower the adjacent silo feet to the ground, and disengage the pivot shaft 140 from the hooks 126 on the silo allowing the trailer to be pulled away from the silo.

Turning now to FIGS. 36-60, a base 106 may be described. As shown, the base 106 may include a primary base 106A and a secondary base 106B. Alternatively, a single base or several bases may be provided. Each base 106 may include a platform configured for receiving and supporting one or more silos 104 and may include a conveyor system 150 arranged below the silos for receiving proppant from the discharge chute of one or more silos and delivering the proppant to a hopper for delivery to a blender. The bases 106 may be independent trailers (mobile units) that act as the stabilization and mounting point for the silos and function to house an integrated conveyor. The bases 106 may also house the power, hydraulic systems, and controls for the silos and bases. In one or more embodiments, the system can be utilized in a 3-pack or a 6-pack configuration. Other amounts of silos can be used including 9-pack or 12-pack configurations and numbers in other combinations other than multiples of 3 can also be used. For example, 1, 2, 4, 5, 7, 8, 10, or 11 or integer values exceeding 12 may also be used. Still other numbers or fractionally sized silos may be used. In one or more embodiments, the primary base 106A may be the driving unit and the secondary base 106B may rely on the primary base for controls, information, and signals. The primary base may contain the control cabin 152 which houses the user interface for starting and controlling both bases.

Each base 106 may be in the form of a trailerable mobile unit and may include a frame 154, a wheel and axle system 156 for rollably supporting a portion of the base, a hitch portion 158 configured for engaging a tractor or truck, a silo interface 160 for coupling to one or more silos, a conveyor 150, a control cabin 152, and a blender feeding hopper 162. As shown, the frame 154 may be akin to a low-to-ground type trailer where a portion of the frame is arranged above the supporting wheel and axle system and a large portion of the frame is arranged closer to the ground and more in line with the ground. That is, when the trailer is disconnected from a hauling tractor or truck, the hitch end of the trailer may be lowered to the ground and the frame may rest directly on the ground surface. The frame may include deployable truck access ramps 164 at the hitch end of the trailer such that when the trailer is disconnected from a tractor or truck, the surface of the trailer may be accessible by a vehicle and, in particular, by backing a separate trailer or silo trailer onto the deck of the base. The low portion of the trailer may remain low even at the hitch end, which may cause the base to tip when connected to a tractor or truck. This may be advantageous by lowering the elevation above the ground of the top of the conveyor, for example. The wheel and axle system 156 may include a dual axle system having 4 or 8 wheels. The wheel and axle system 156 may be arranged at an opposite end from the hitch and generally below a sloping portion of the conveyor system. The hitch portion 158 may be adapted for engaging a tractor or truck and may be particularly adapted to allow the frame to be pulled at an angle to the ground. As such, the hitch 158 may be angled relative to the frame 154 to accommodate a generally flat hitch portion on the tractor or truck.

Figure 36:
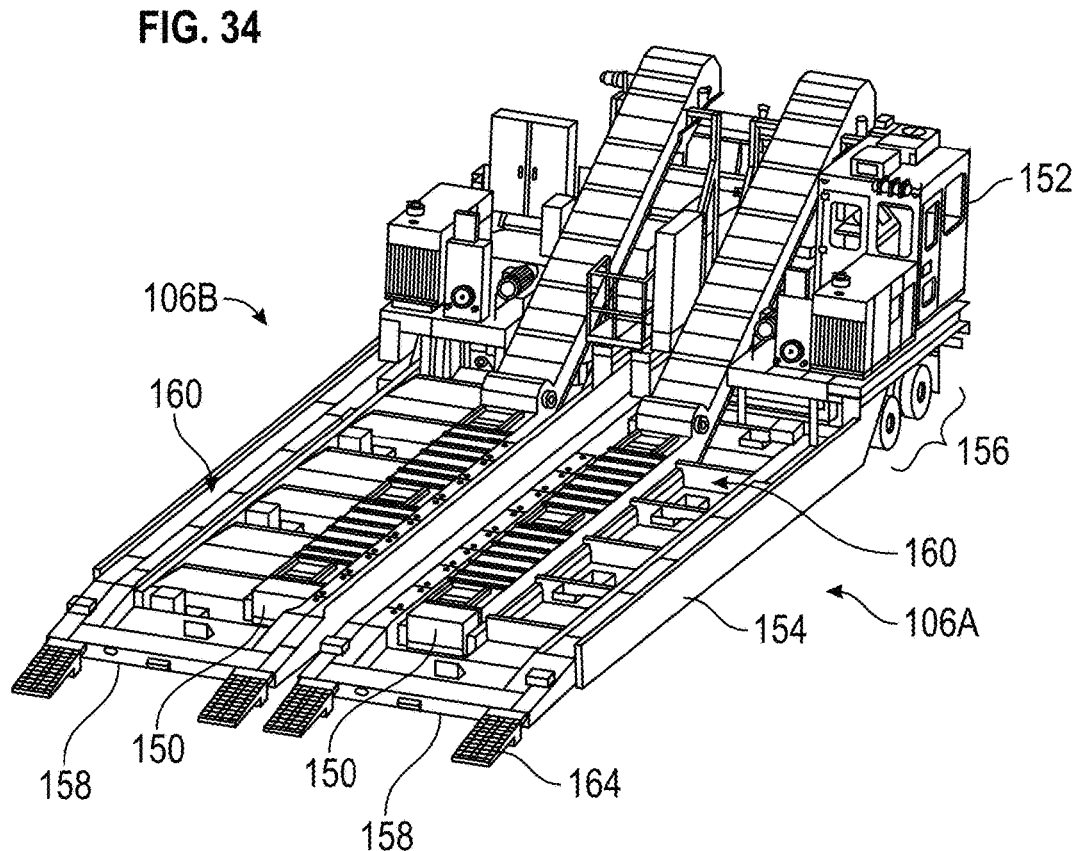
FIG. 36 is a perspective view of a pair of adjacent bases, according to one or more embodiments.

The silo interface 160 may include one or a plurality of stations on top of the low portion of the frame particularly adapted to receive and secure a silo. For example, as shown in FIG. 36, the top portion of the frame may include foot holds for receiving the feet or bottom rails 120 of the silos 104. The foot holds may include securing features such as clamps bolts, pins, or other mechanisms to secure the silos to the frame. The silo interface may rollably accommodate the rear end of a trailer 108 for purposes of delivering silos to the base. That is, the rear end of a trailer 108 may be backed upward along the deployable truck ramps 164 and may continue along tracks on the top surface of the frame until it reaches an appropriate offloading point for the silo.

As mentioned, each base may include a conveyor 150 for conveying proppant from the silo or silos to a blender. The conveyor 150 may be arranged between the tracks on the silo interface 160 and may be substantially, fully, or partially recessed into the frame. The conveyor 150 may include openings spaced to receive proppant from the discharge of the silo immediately above the conveyor and/or from an adjacent silo on an adjacent base. As shown in FIG. 36, the conveyor may be shifted toward an inboard surface such that when two bases are arranged adjacent to one another, the conveyors are shifted toward one another relative to a centerline of their respective trailers. The conveyor may include a substantially flat portion arranged along the silo interface so as to be arranged below the silos on the base. The conveyor may include an upward sloping portion at or near the wheel end of the base for carrying the proppant to a height suitable for placement into a blender feeding hopper. The sloping portion of the conveyor may extend to a height above the supporting wheel system to accommodate transportation requirements. For example, when the trailer is tipped to place the hitch end on a hitch of a tractor or truck, the top portion of the conveyor may tip slightly downward and the tipped height may be at or less than 14 feet, for example. Still other heights may be selected and designed to accommodate more stringent transportation requirements.

The conveyor system may be adapted to be choke fed from the discharge of the silos so as to reduce, minimize, or eliminate free falling proppant and, as such, reduce, minimize, or eliminate the formation of dust. The conveyor may also be substantially enclosed to prevent dust and to avoid contamination of the proppant with other materials. As shown and discussed, the conveyors may be arranged within the footprint of the one or more silos and, as such, may be arranged below the silos when the silos are present on the base. The base conveyors may take the proppant toward the blender hoppers and up the incline where it may be deposited into the rear distribution hopper or head.

The control cabin 152 may be arranged near the wheel end of the base and adjacent the sloping portion of the conveyor. The cabin 152 may include controls and system for controlling the conveyor on the base as well as controls for controlling the silos, the bucket elevators therein, and/or the loader. The base may include a generator for supplying power and to the several systems. The cabin may have a height at or less than the conveyor so as to accommodate shipping requirements.

Figure 37:
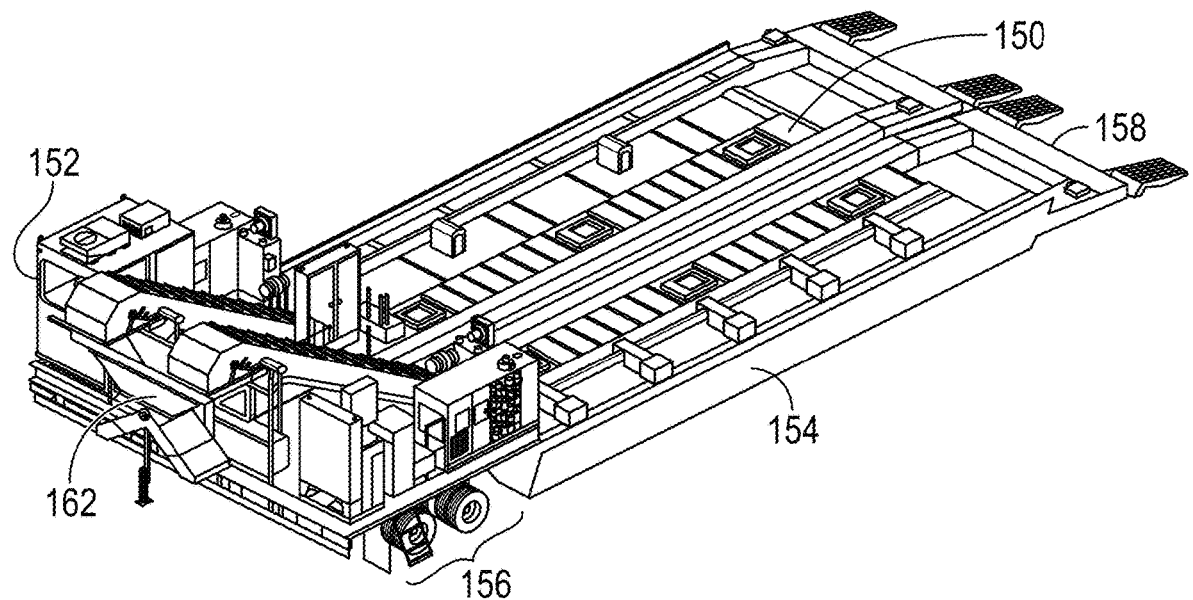
FIG. 37 is another perspective view of the pair of adjacent bases, according to one or more embodiments.
Figure 38:
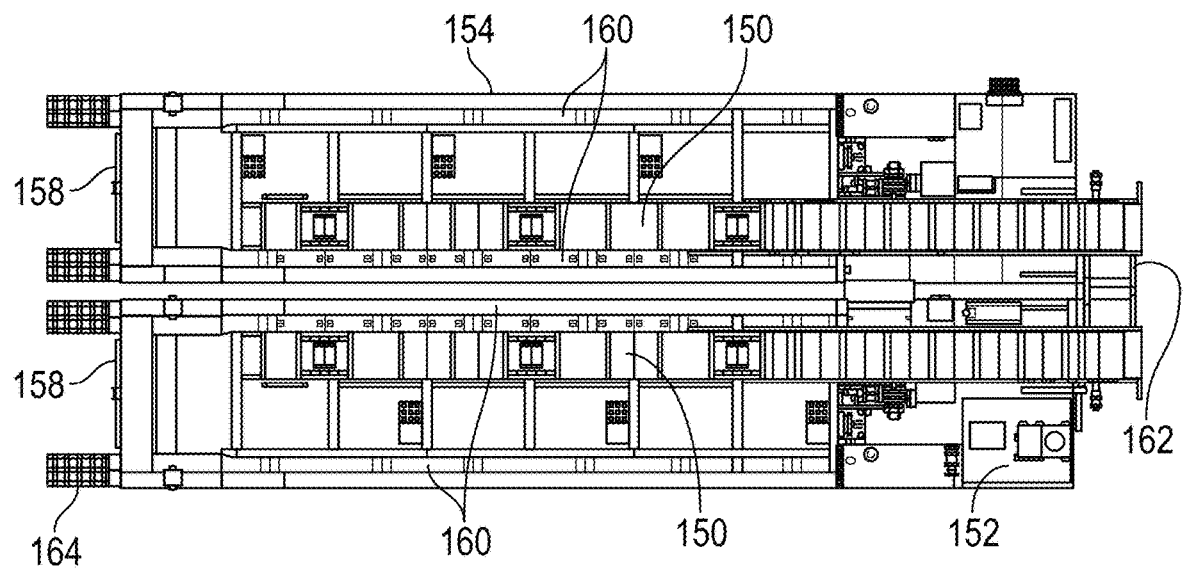
FIG. 38 is a top view thereof.

As shown in FIG. 37, the base may also include a blender feeding hopper or head 162. The hopper 162 may be arranged substantially between a pair of bases behind a wheel end of the bases so as to receive proppant material from the conveyors on the bases. The distribution head may include a receiving bin arranged below outlets on the conveyors and a pair of chutes extending laterally downward and sideways relative to longitudinal centerlines of the bases. The bin may include a control valve or shutter for controlling which chute the proppant passes through and, as such, which blender the proppant system supplies proppant to. The receiving bin or hopper may include a level sensor which is used to provide feedback to the control system. The base conveyors may be automated such that they are programmed to maintain a full distribution hopper. The proppant may be gravity choke fed into the blender hopper selected. The hopper on the base may have a slidable position and may include a dual discharge and, as such, may be able to selectively feed one or more blenders or may be able to accommodate different blender locations without needing to articulate or move from one location to another. A diagram of a hopper feeding a blender is shown, for example, in FIG. 39. Individual bases (i.e., primary and secondary isolation) are shown in FIGS. 40-60.

Figure 39:
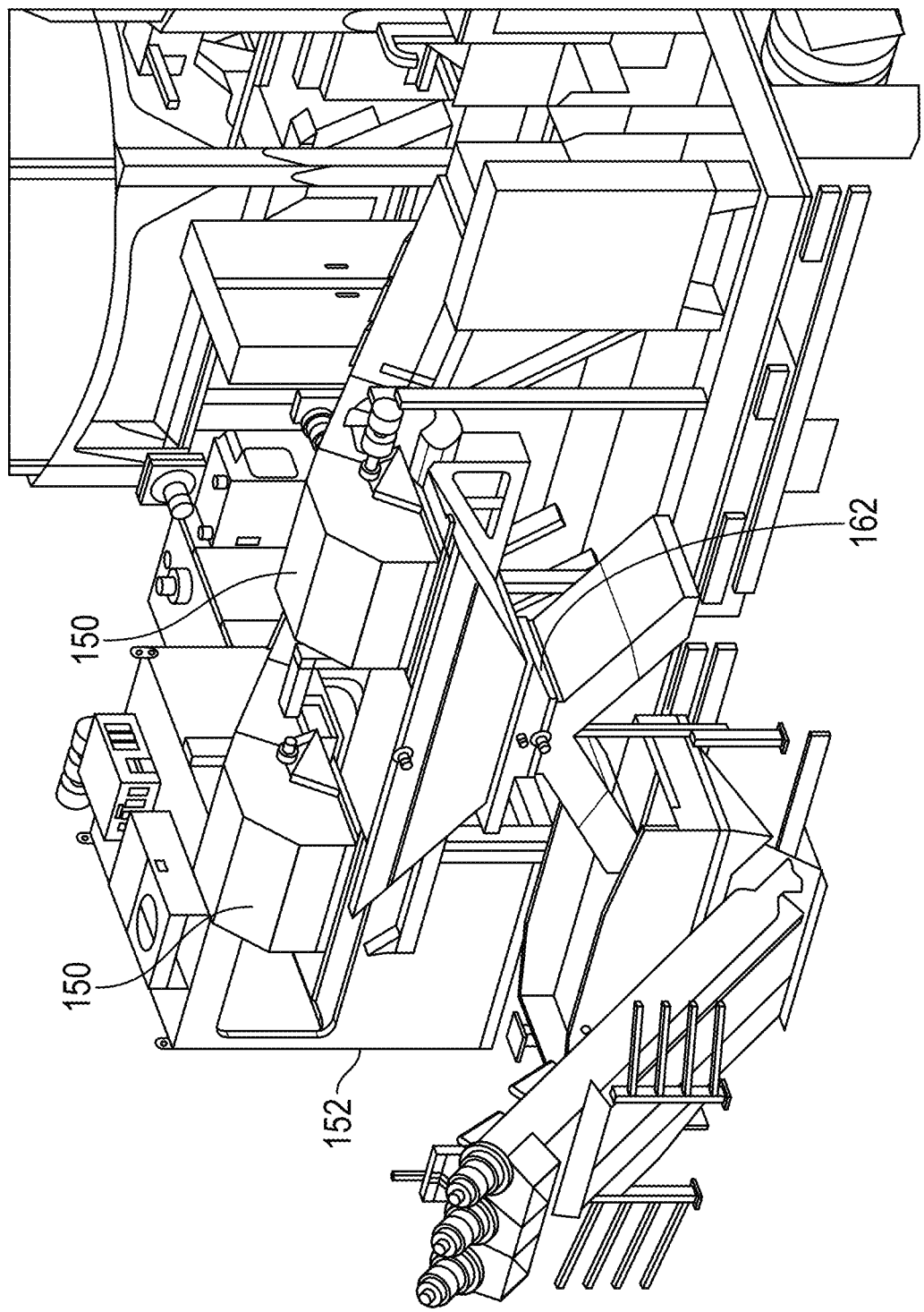
FIG. 39 is a perspective view of a delivery end of the pair of bases, according to one or more embodiments.
Figure 52:
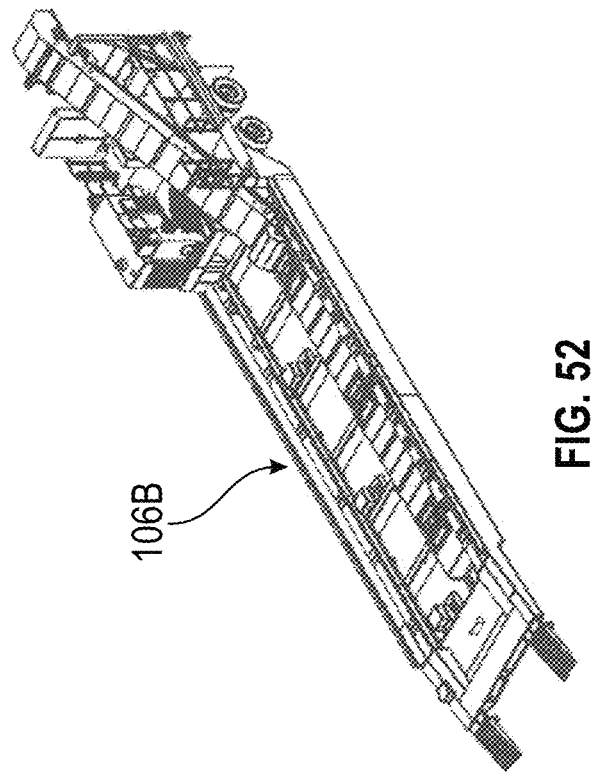
FIG. 52 is a front right perspective view thereof.
Figure 54:
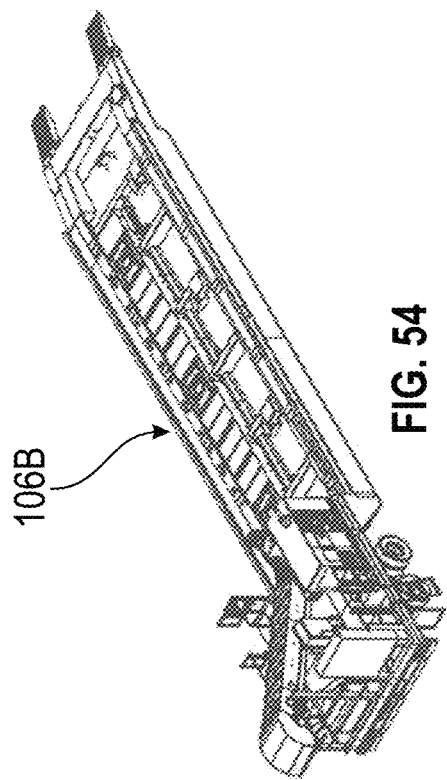
FIG. 54 is a rear left perspective view thereof.
Figure 51:
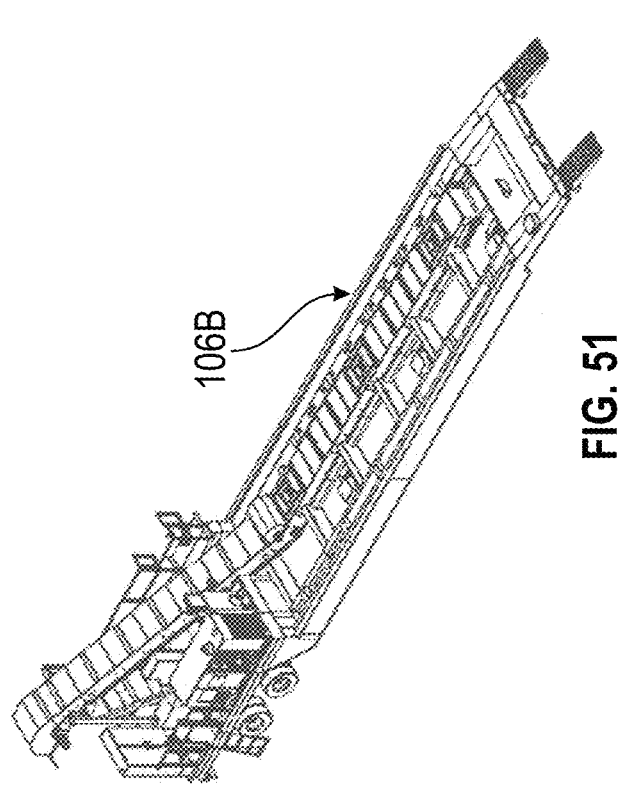
FIG. 51 is a front left perspective view of a secondary base, according to one or more embodiments.
Figure 53:
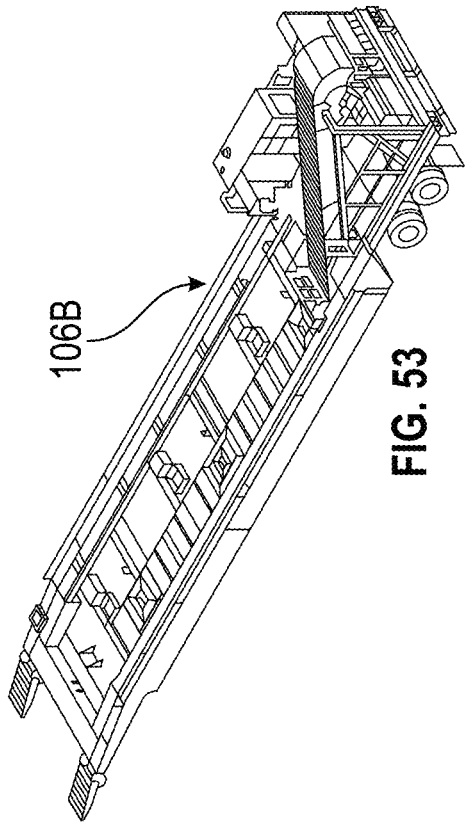
FIG. 53 is a rear right perspective view thereof.
Figure 61:
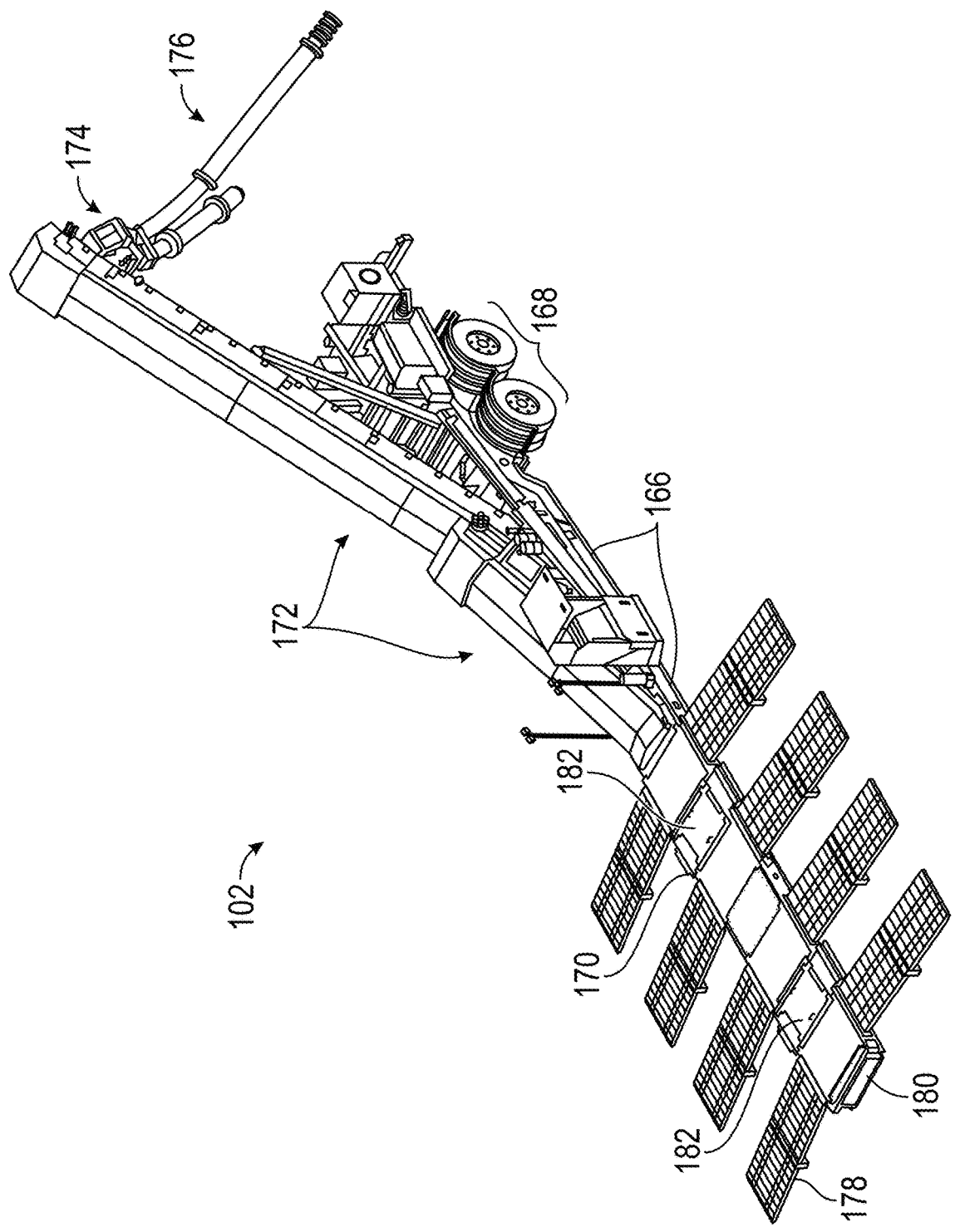
FIG. 61 is a perspective view of a loader, according to one or more embodiments.
Figure 62:
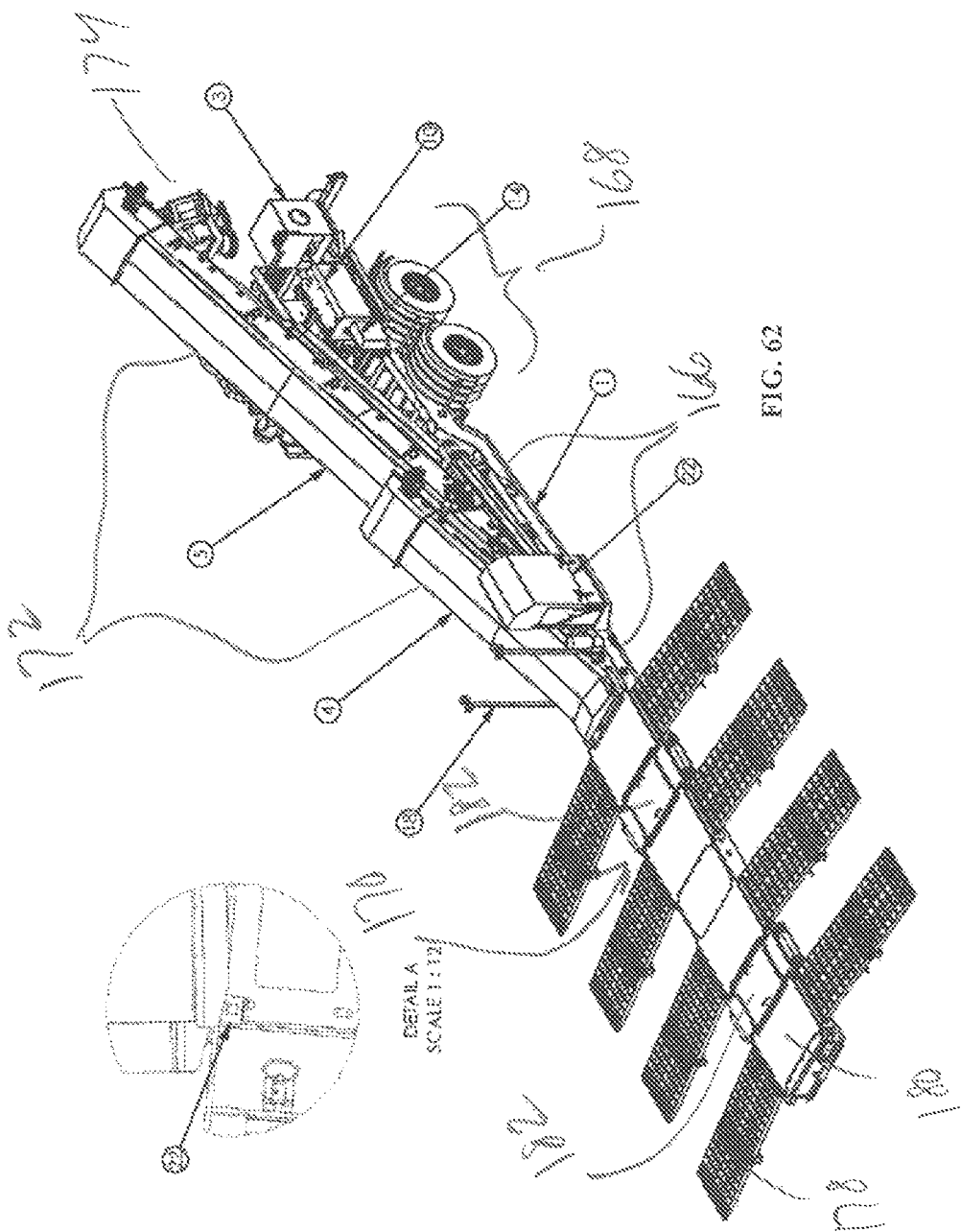
FIG. 62 is a perspective view of a loader, according to one or more embodiments.

Traditionally frac operations include a primary blender and a backup blender on location. The operator can select which blender to feed from the primary base hydraulic controls. The rear distribution hopper shown in FIG. 39 is mounted on a hydraulic slide mechanism that is stored for travel directly behind the primary base. When the system is utilized in a single base configuration, the hopper may stay in travel mode and can still feed 2 blenders. When a dual base configuration is utilized, the hopper may slide over to collect proppant from either base conveyor and feed 2 blenders.

Turning now to FIGS. 61-101 a series of drawings of one or more aspects of a loader 102 are shown. The loader may be configured as a trailer and for versatile arrangement with respect to the silos and may collect proppant from delivery trucks and deliver the proppant to the intake of the silos. In one or more embodiments, the loader 102 may be configured to direct the proppant to a single silo until the silo is full and then direct remaining proppant to a next silo. This transition from one silo to the next may be performed without relocating the loader.

In one or more embodiments, the loader 102 may be a drive-over silo loader ("drive-over") and it may be responsible for the first onsite step of the proppant handling operation—loading the silos. In one or more embodiments, one drive-over may feed 1 bank of 3 silos. For example, there may be one drive-over dedicated to the Primary side 3 pack of silos and one drive-over dedicated to the Secondary side 3 pack of silos. Each Drive-over may be a mobile trailerized unit.

The drive-over may include a trailer frame 166, a wheel and axle system 168, drive-over conveyor 170, a rear incline conveyor 172, a swiveling distribution head 174, and a piping system 176 for feeding the silo bucket elevators. In one or more embodiments, one drive-over may accommodate unloading two proppant transports simultaneously. In other embodiments, more or fewer transports may be accommodated such as 1, 3, 4, or more transports. The transports can be either pneumatic transports with gravity dump systems installed or grain style transport trailers with gravity dump systems. Proppant may be gravity fed from the transport trailers to the drive-over conveyor, dropped onto the rear incline conveyor and may then travel through the distribution head and corresponding pipe to feed the selected (via control system) silo bucket elevator. Each drive-over may be self-contained with an onboard engine, hydraulic system, and a controls system that communicates with the base and silo system controls.

Figure 63:
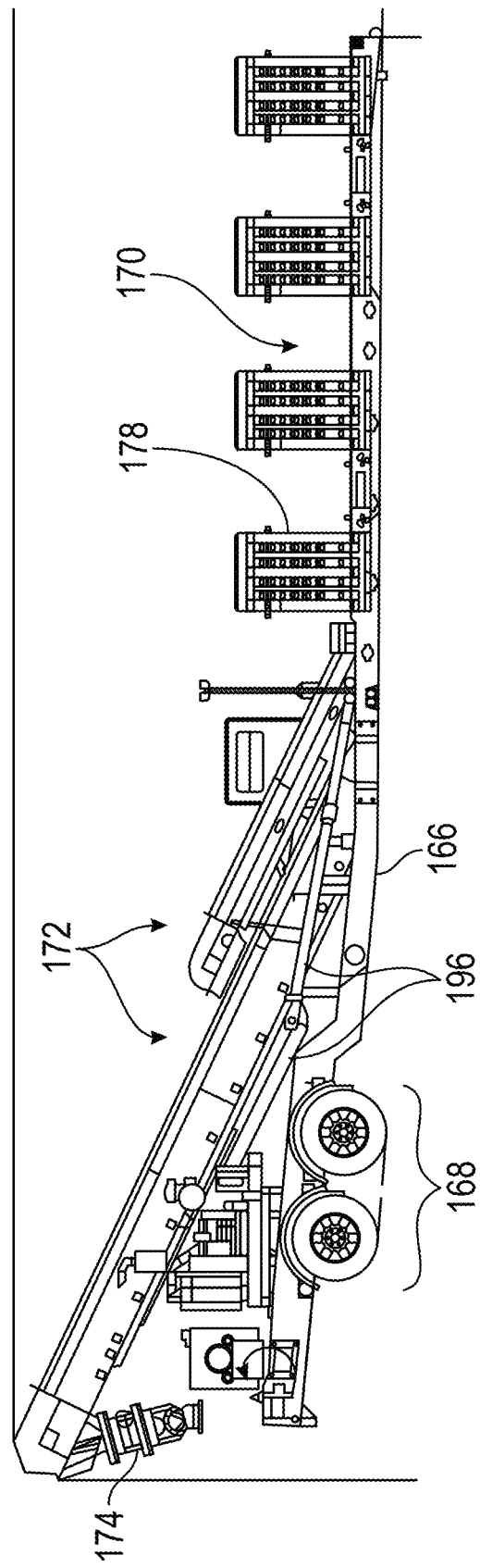
FIG. 63 is a side view thereof.
Figure 70:
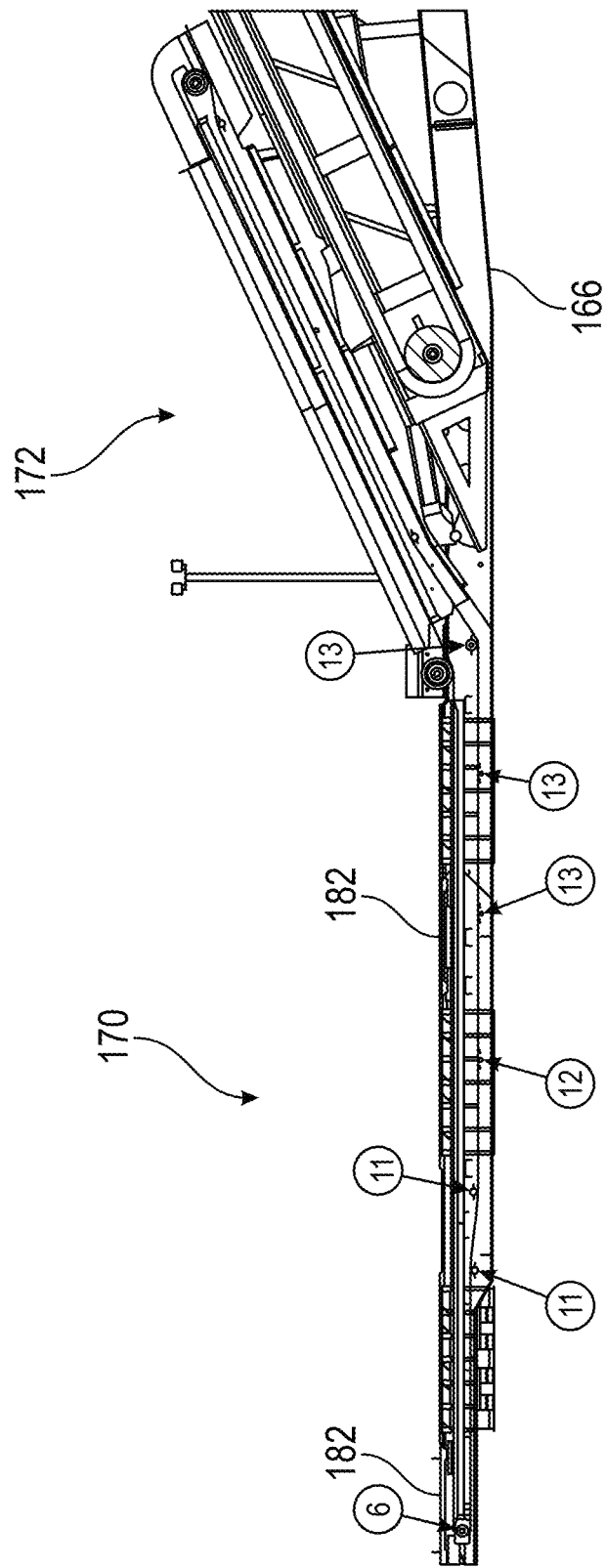
FIG. 70 is a section view of the loader, according to one or more embodiments.

The trailer system 166 may be configured as a low rise trailer with portions of the trailer being higher to accommodate the wheels and axles and the remaining portion of the trailer being very low to the ground and/or flush with the bottom of the wheels when the trailer is disconnected from a tractor or truck. That is, as shown in FIG. 63, for example, much of the trailer may be arranged on the ground surface when not being pulled by a truck or trailer.

The drive over conveyor 170 may include a relatively low rise conveyor being relatively flat to the ground. For example, the conveyor 170 may be arranged between the frame members 166 of the trailer so as to nest the conveyor within the frame thickness and reduce and/or minimize the height of the drive over conveyor. The drive over conveyor may include deployable ramps 178 arranged in alignment with drive over covers 180 on the conveyor. The ramps 178 and covers 180 may provide a pathway and support for a tractor trailer driving up the ramps 178 on one side of the conveyor 170, across the conveyor 170, and down the ramps 178 on the other side. The ramps and covers may be arranged and spaced to accommodate the wheel spacing on the tractor trailers. Between sets of covers, the drive over conveyor may include proppant entry ports 182 to the conveyors.

The proppant entry ports 182 may be adapted to accommodate one or several types of trucks and the particular discharge systems of those trucks. For example, the drive over conveyor may include a boot lift style mechanism to assist with containing proppant and mating up with various style proppant transports. For example, the boot lift style mechanism may be seen in more detail in FIGS. 91-101. The boot lift style mechanism may include a frame 184 configured for carrying and/or supporting a surrounding boot or sleeve. The frame 184 may include a grate 186 and a cover 188. The frame 184 may be supported by an articulating mechanism 190 such as a scissor system, a pivoting arm or series of pivoting arms, or a vertically arranged hydraulic lift system may be used. In one or more embodiments, a scissor type system may include a hydraulic actuator 192 arranged in a substantially horizontal position, where the actuation of the hydraulic cylinder causes vertical articulation of the scissor frame. As shown in FIG. 100, a first frame member may include a top end pinned to the frame 184 and a bottom arranged in a slot 194 allowing the bottom end of the frame member to slide across the supporting system. A second, and generally parallel frame member, may include a bottom portion pinned to the supporting system and may include a top end arranged in a slot 196 on the frame allowing the top end of the frame member to slide across the frame and remain, generally parallel to the first frame member during articulation. Additional struts may also be provided. The hydraulic cylinders 192 may be arranged and connected to articulate the sliding end or ends of the frame members to cause the articulating mechanism to move up and down relative to the upper surface of the conveyor system so as to engage and/or disengage various discharged systems on proppant trailers. The articulation of the frame and boot may be advantageous to avoid gaps and reduce and/or prevent dust from escaping when unloading a trailer. The arrangement with a horizontally or substantially horizontally arranged cylinder may be particularly advantageous for maintaining a relatively flat and low height system while still providing for vertical articulation to accommodate different trailer discharge systems.

Figure 75:
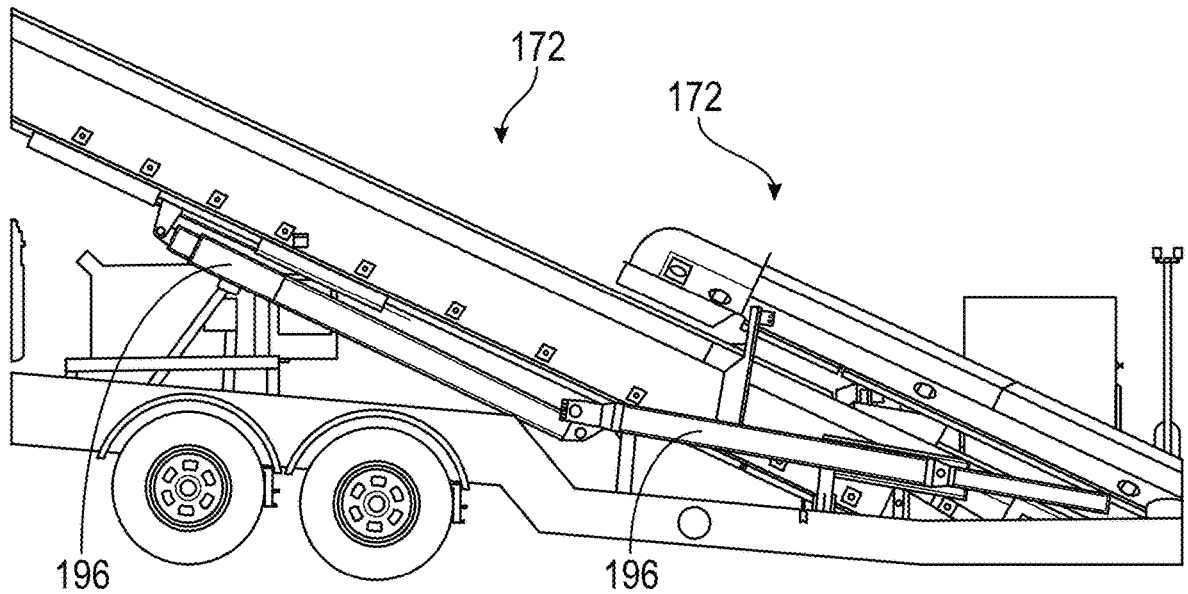
FIG. 75 is a partial close-up side view of the rear incline conveyor in a travel position.
Figure 76:
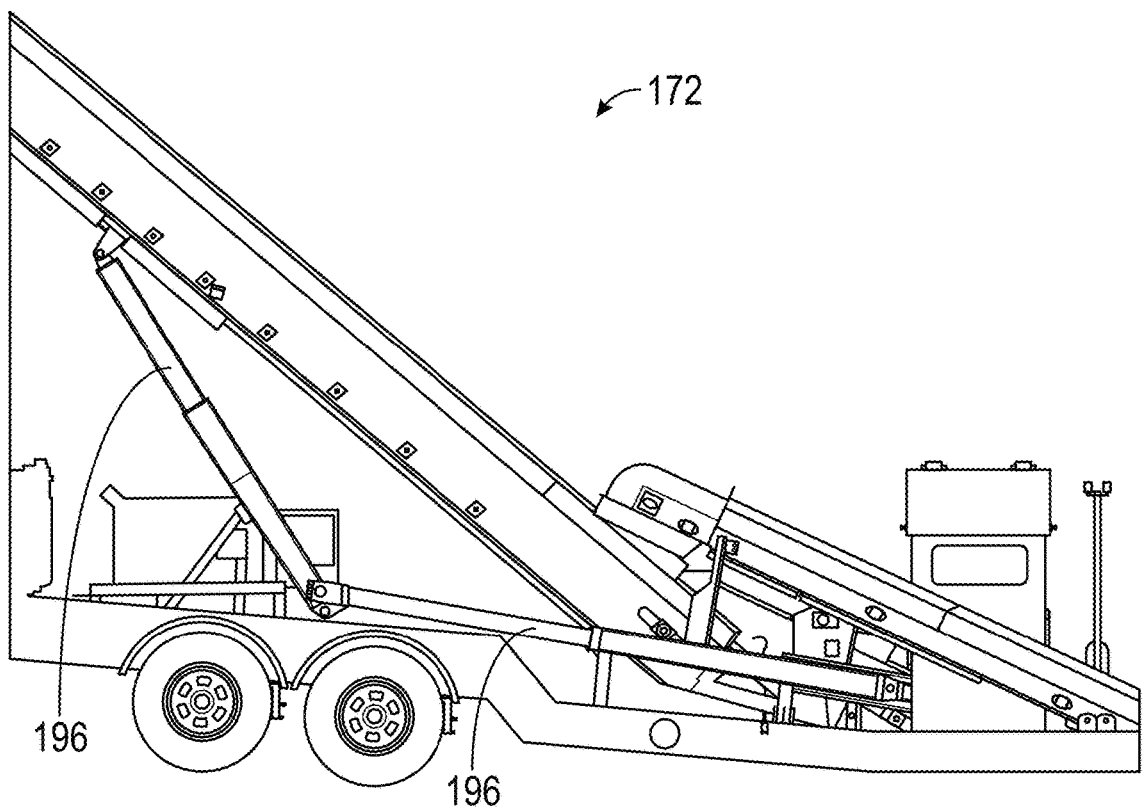
FIG. 76 is a partial close-up side view of the rear incline conveyor in an operation position.

The rear incline conveyor 172 may be adapted for carrying the proppant from the drive over conveyor 170 upward to a distribution head 174, which may distribute the proppant to the silo system. Accordingly, the rear incline conveyor 172 may include an upwardly sloping conveyor arranged on a back end of the loader trailer. In one or more embodiments, the rear incline conveyor 172 may include a two-part conveyor particularly adapted to reach suitable heights for delivering proppant to silos while maintaining an ability for over-the-road transport. For example, as shown in FIG. 63, the rear incline may be in travel mode. However, in FIG. 61, the rear incline may be in operational mode. FIGS. 75 and 76 also depict this transitional feature.

To this end, the rear incline conveyor 172 may include a lifting mechanism 196 that allows the rear incline conveyor to be positioned for travel mode and operational mode. As shown in FIG. 75 a first or lower portion of the rear incline conveyor 172 may extend upward at an angle from the drive over conveyor. The first or lower portion of the rear incline conveyor may be a substantially or generally stationary conveyor or slight movement to accommodate the second portion may be provided. The second or upper portion of the rear incline conveyor may be articulable between an operational position and a travel mode. As shown, the lifting mechanism 196 may include a hydraulic ram arranged below the lower portion of the rear conveyor. The hydraulic ram may be connected to a lifting arm extending upward to a mid-portion of the upper conveyor and secured to the upper conveyor along a sliding connection. As the hydraulic ram is extended, the bottom portion of the upper portion of the conveyor may slide rearwardly along the loader trailer to position an inlet of the upper conveyor in communication with an outlet of the lower portion of the conveyor. Moreover, the rearward motion of the upper portion may cause the upper portion to increase in slope causing the rear most end of the upper conveyor to increase its height above the ground. This articulation of the upper conveyor may allow for transportation limitations (e.g., height and length of the loader trailer) to be met while still allowing for a suitable height of the upper conveyor during loading operations.

The drive-over system may perform the function of a permanent conveyor at, for example, a grain elevator. However, the drive-over system may have a very low height (i.e., approximately 12-18 inches) and still provide for high volumes of proppant to be delivered to the conveyor and transported quickly to the silos. The drive-over system may be transportable without particular permitting and may be configurable to meet shipping restrictions and avoid permitting. In one or more embodiments, the drive-over system may be particularly adapted for meeting these restrictions and avoiding permitting in selected operational states within the United States. The drive-over may be configured for very quick movement of proppant and may be capable of delivering proppant less than, the same as, or exceeding a rate at which a respective bucket elevator may be capable of lifting the material into a silo. This may allow for changing out of the bucket elevator and installing a faster bucket elevator and/or may allow both the loader and bucket elevator to be adjustable to a suitable loading rate. Operationally, the drive-over speed may be controlled to avoid running faster than the bucket elevator to avoid overloading the boot portion of the bucket elevator that may result in plugging.

Referring more particularly to FIGS. 77-90, a distribution head 174 may be mounted on the outlet of the rear incline conveyor and may be integrated with a swiveling mount. That is, the distribution head may be in the form of a manifold 198, for example, allowing for proppant to be received from the rear incline conveyor and for distribution of the proppant to one or more delivery lines or pipes of a piping system. The manifold 198 may be arranged in a supporting frame 200 that is pivotally secured to a funneling portion 202 on the rear incline conveyor. The funneling portion, as shown in FIGS. 83-90, may include a reinforced funnel system adapted to receive proppant from the rear incline conveyor and deliver it through a central opening. The manifold may be in material communication with the central opening of the funneling portion and the frame supporting the manifold may be pivotally secured to the funneling portion. The manifold system may include an internal gating system for controlling which outlet of the manifold the proppant is fed to including one of the outlets or multiple outlets.

This feature may allow the distribution head to swivel providing a large advantage to the design by allowing the same unit to be utilized for filling the primary or secondary side silos and by providing the users high levels of flexibility in pad set up for proppant transport traffic flow optimization and pad site footprint minimization. For example, the angle of attack of the loader relative to the silos may be flexible due to the swiveling distribution head, which may provide for higher levels of flexibility with respect to the loader position.

Figure 77:
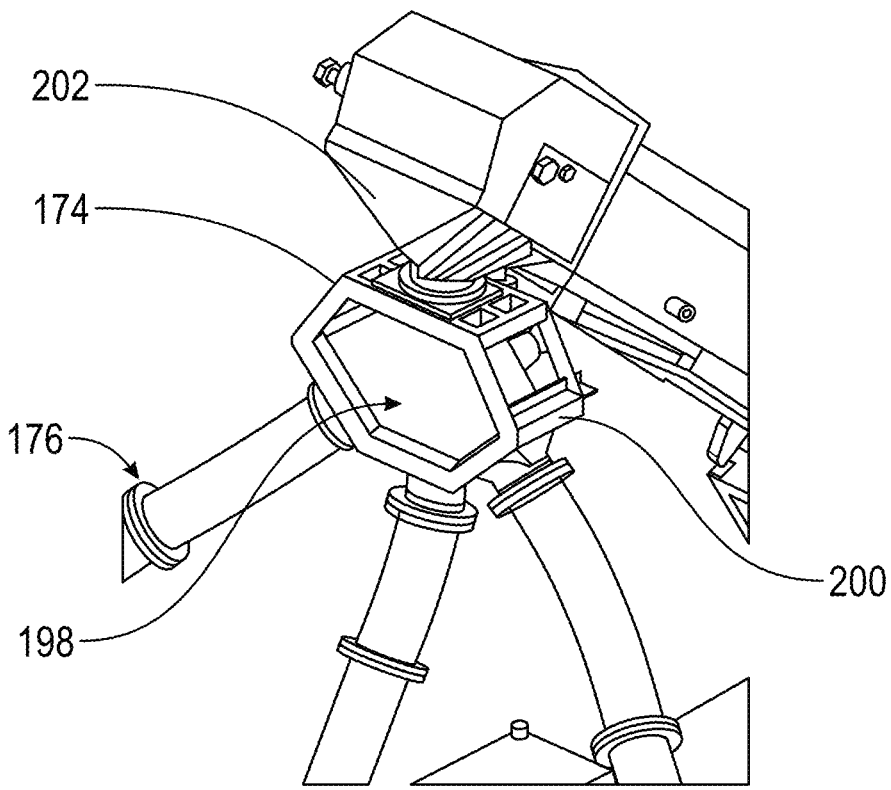
FIG. 77 is a close up perspective view of a distribution head, according to one or more embodiments.
Figure 78:
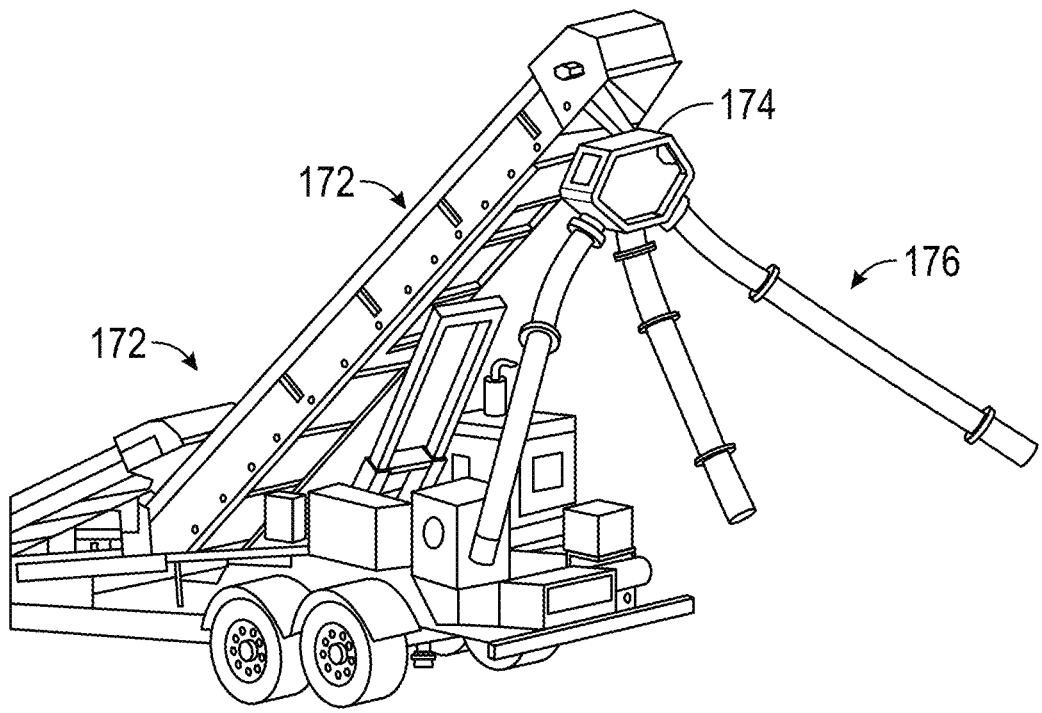
FIG. 78 is a partial perspective view of the loader, according to one or more embodiments.
Figure 80:
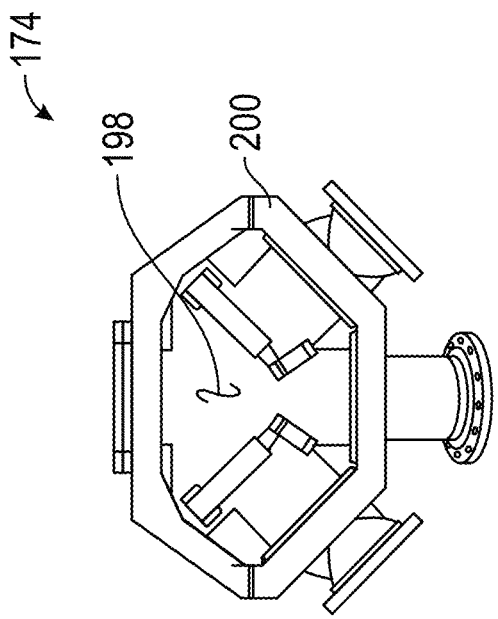
FIG. 80 is a front view thereof.
Figure 82:
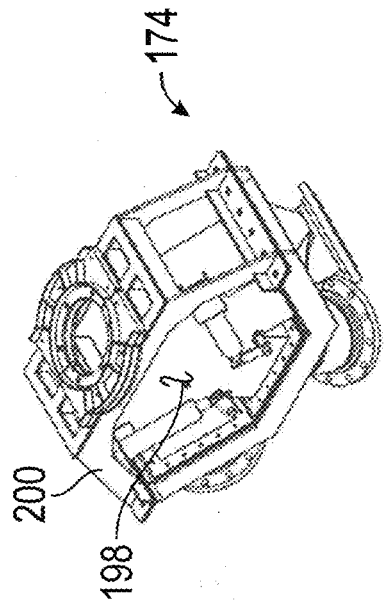
FIG. 82 is a perspective view thereof.
Figure 79:
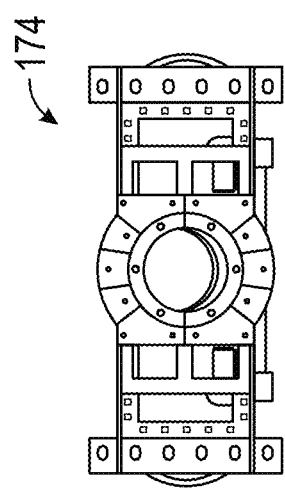
FIG. 79 is a top view of the distribution head of FIG. 77.
Figure 81:
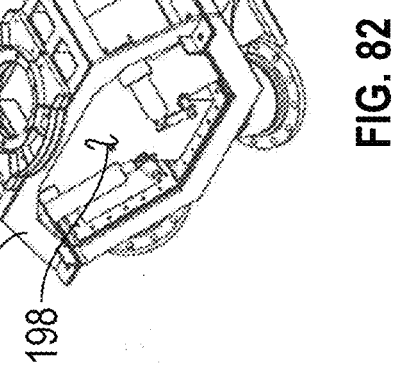
FIG. 81 is a side view thereof.
Figure 89:
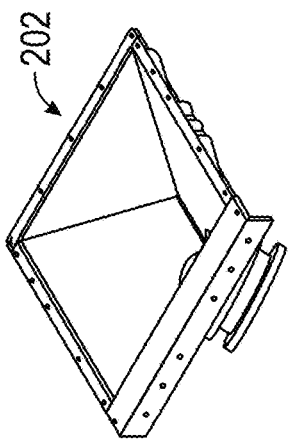
FIG. 89 is a perspective top view thereof.
Figure 90:
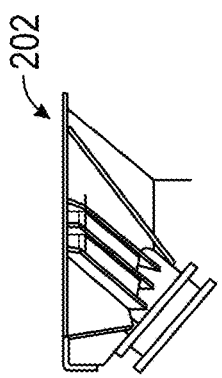
FIG. 90 is a side view thereof.
Figure 86:
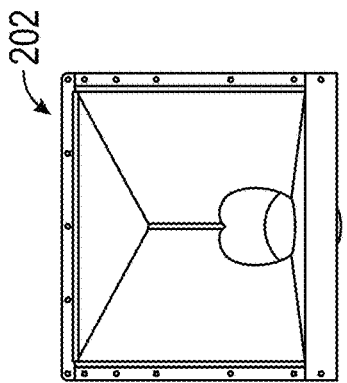
FIG. 86 is a top view thereof.
Figure 87:
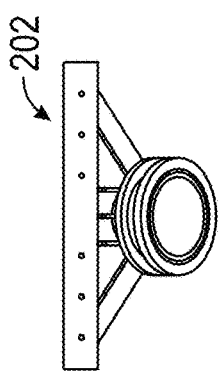
FIG. 87 is a side view thereof.
Figure 88:
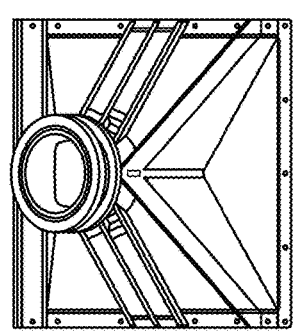
FIG. 88 is another perspective view thereof.
Figure 83:
FIG. 83 is a detail view of a distribution funnel, according to one or more embodiments.
Figure 84:
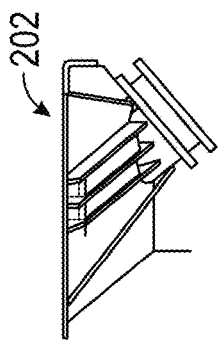
FIG. 84 is a side view thereof.
Figure 85:
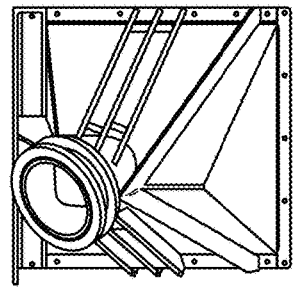
FIG. 85 is a perspective view thereof.
Figure 91:
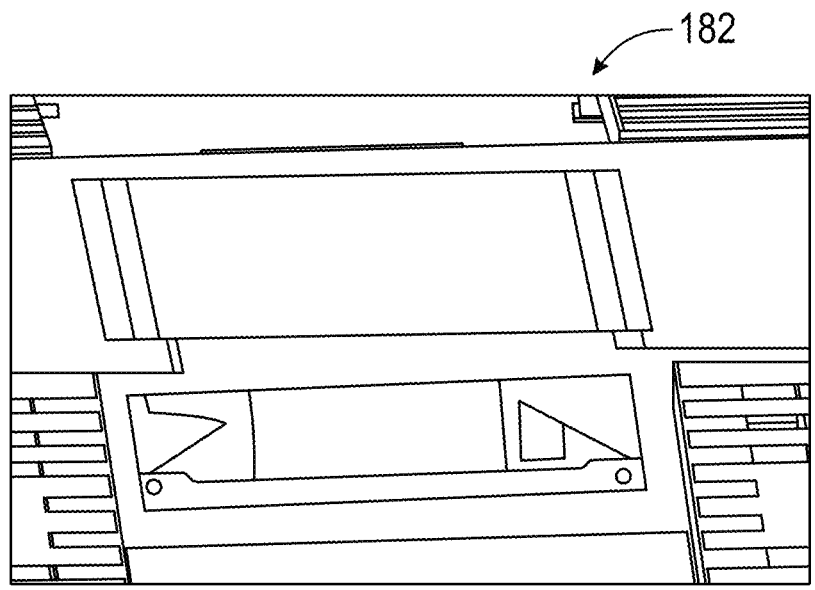
FIG. 91 is a perspective view of a proppant entry port in a retracted position, according to one or more embodiments.
Figure 92:
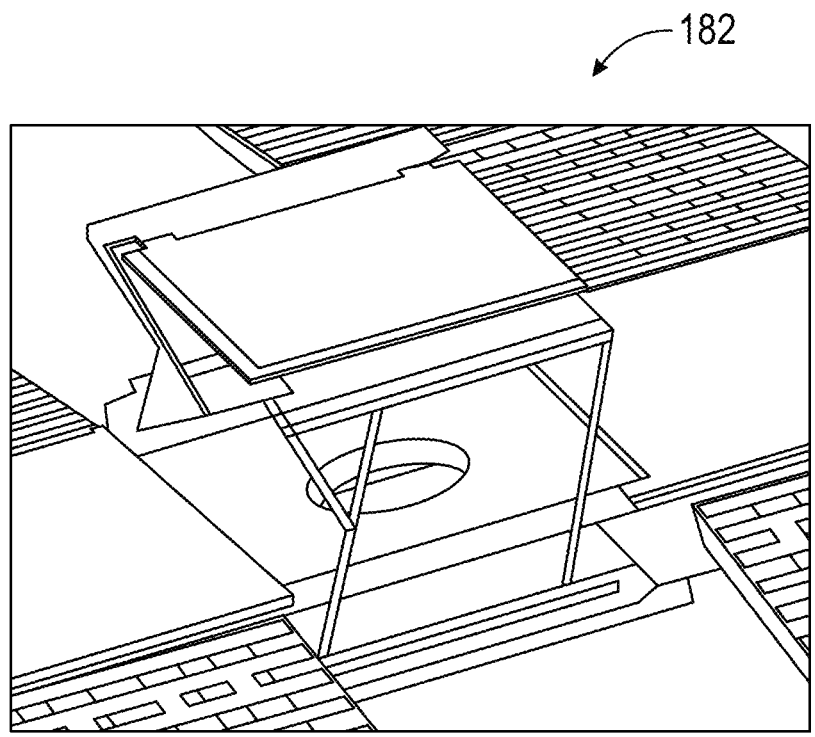
FIG. 92 is a perspective view of the proppant entry port in an extended position, according to one or more embodiments.
Figure 94:
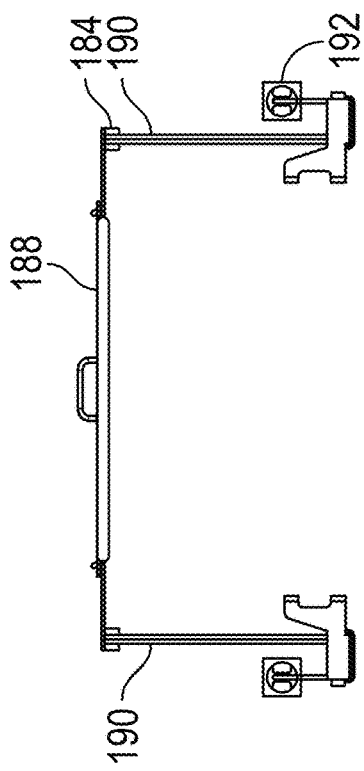
FIG. 94 is a side view thereof.
Figure 96:
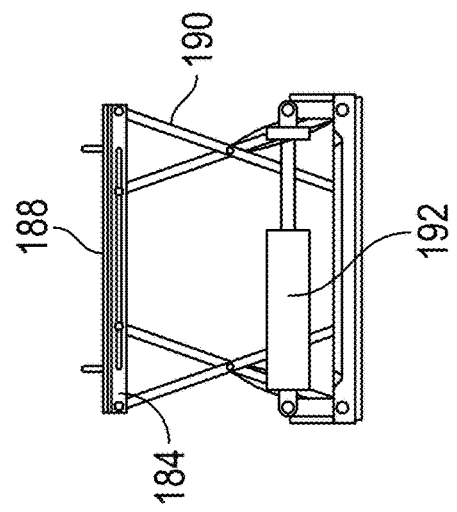
FIG. 96 is an end view thereof.
Figure 93:
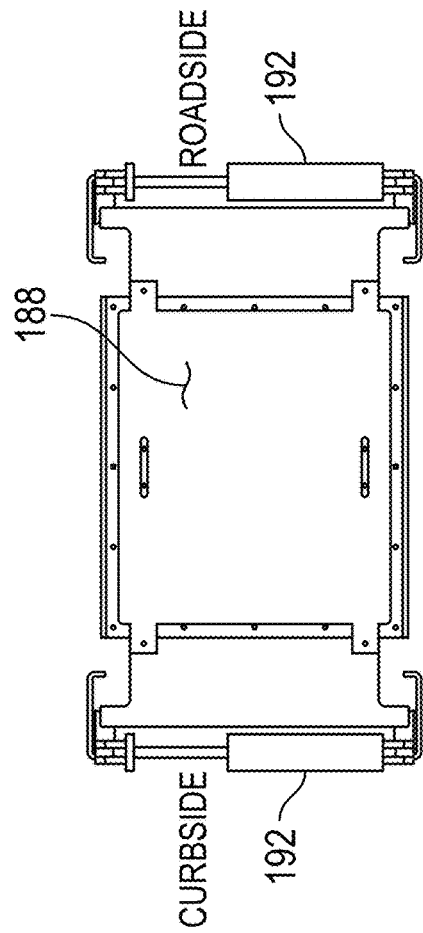
FIG. 93 is a top view of a frame of a proppant entry port, according to one or more embodiments.
Figure 95:
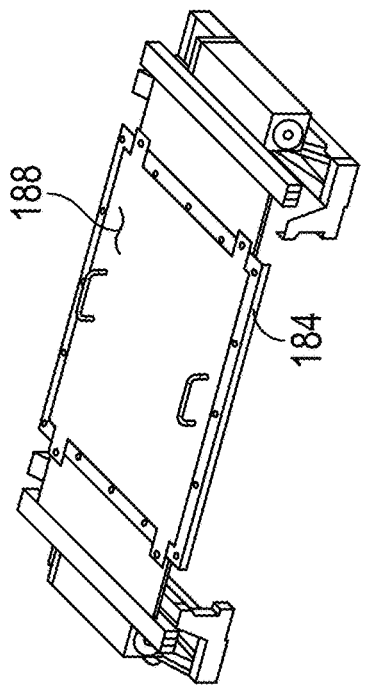
FIG. 95 is a perspective view thereof.
Figure 102B:
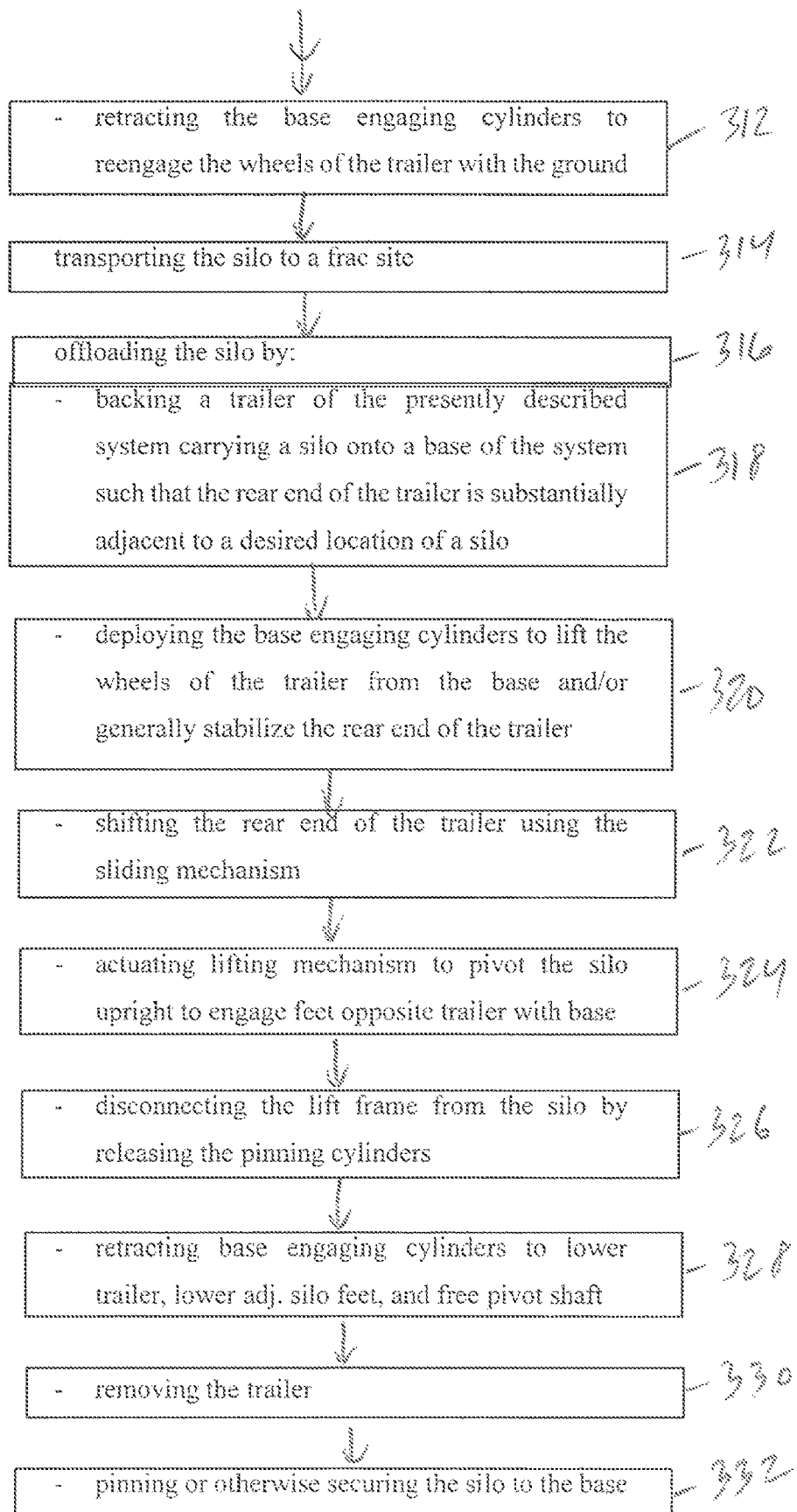
FIG. 102B is a partial diagram of a method of manipulating a silo, according to one or more embodiments.
Figure 103A:
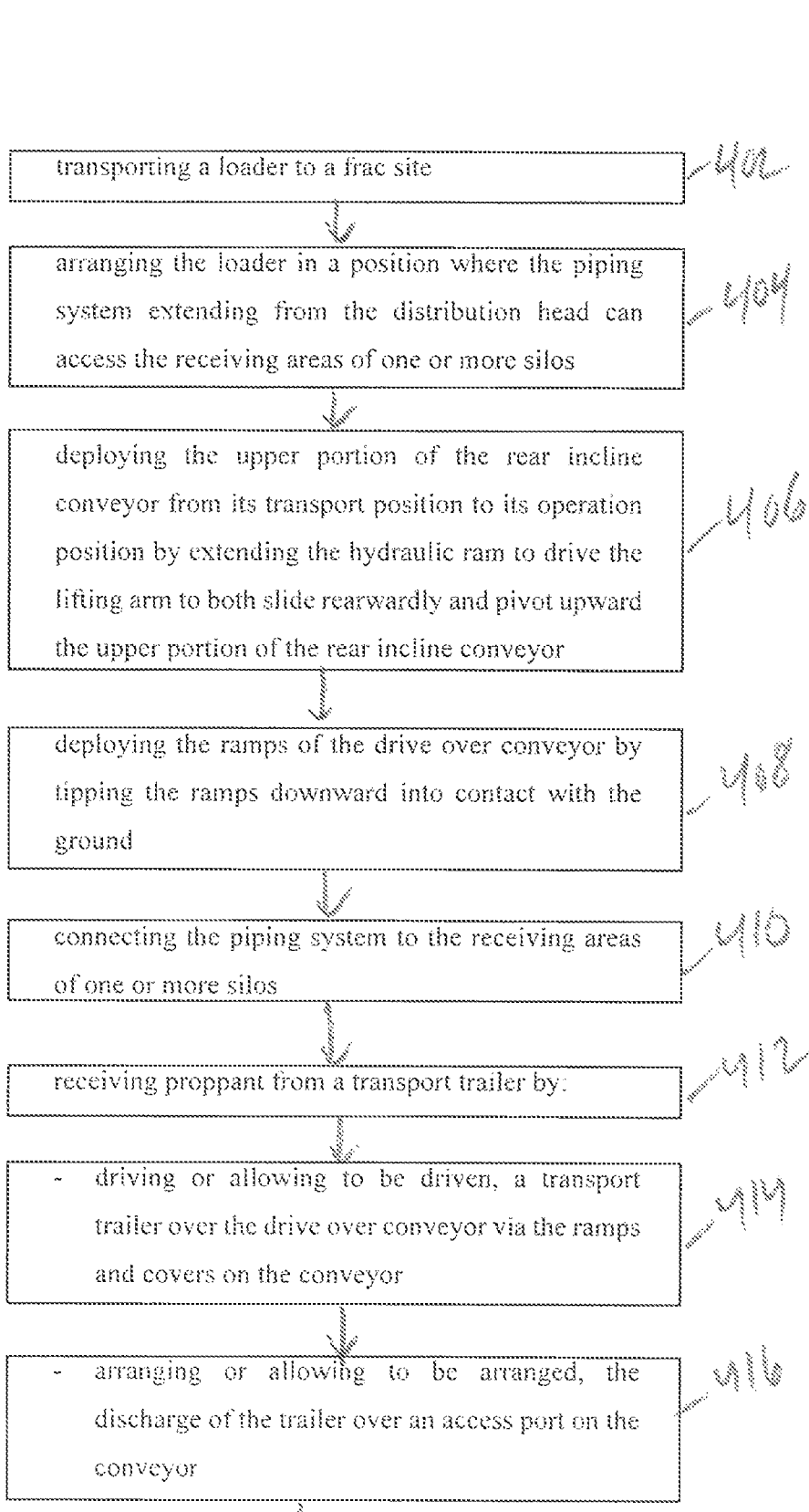
FIG. 103A is a partial diagram of a method of loading a silo, according to one or more embodiments.
Figure 103B:
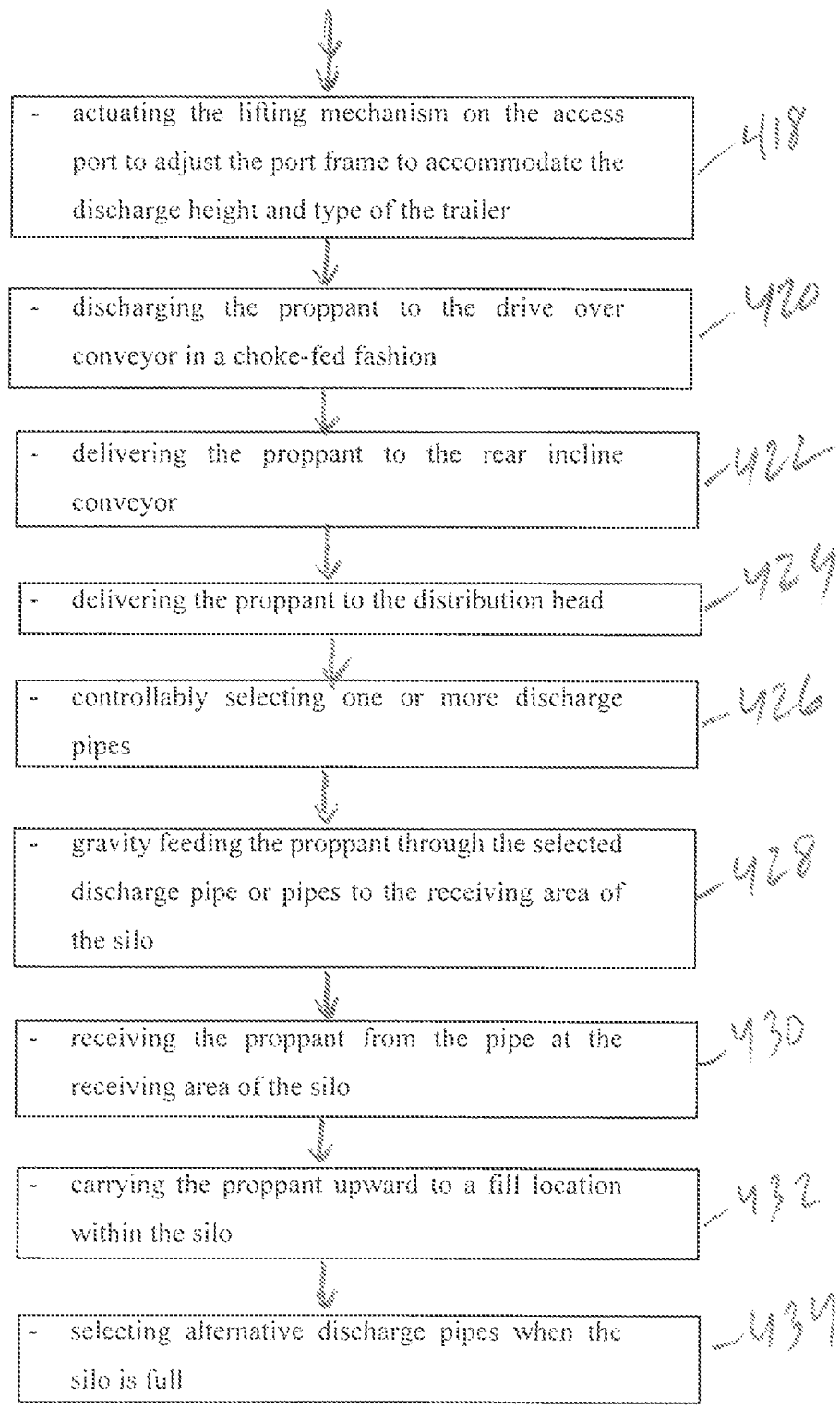
FIG. 103B is a partial diagram of a method of loading a silo, according to one or more embodiments.
Figure 104:
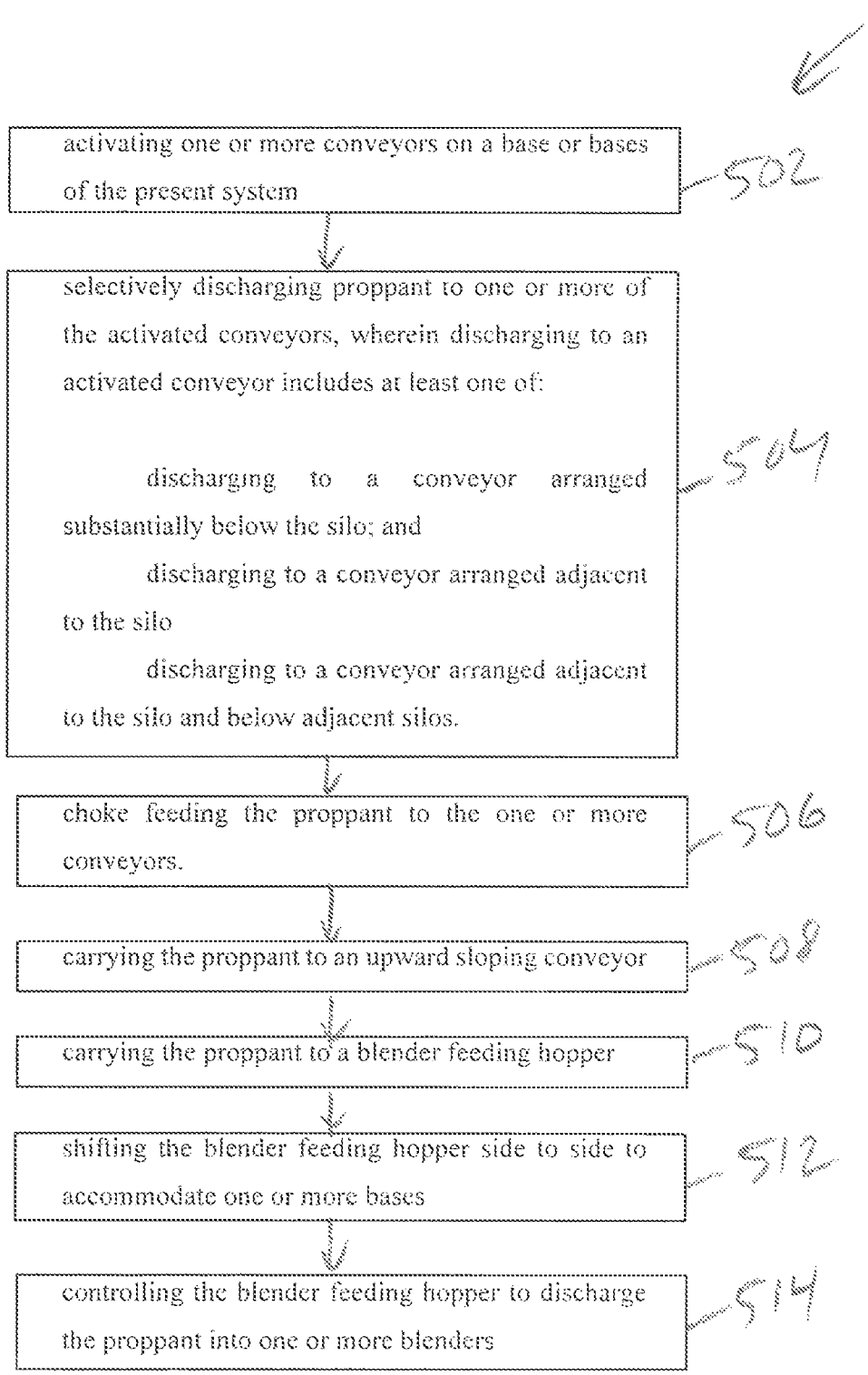
FIG. 104 is a diagram of a method of delivering proppant to a blender.

The piping system 176 may extend from the distribution head and may include delivery pipes having flexible connections to the distribution head at one end and flexible connections to the receiving area of the silo at the other end. For example, as shown in FIGS. 77 and 78, the distribution head 174 may include flanged connections to a rubber or other flexible pipe system. A rigid pipe may be secured to an opposite end of the flexible pipe system and a flexible pipe system may be secured to the opposite end of the rigid pipe system. As such, a rigid pipe system may be provided with flexible connections on each end allowing for user manipulation and connection while also providing for positional flexibility of the loader.

The above-described system may provide several advantages over systems currently being used. For example, when compared to FracSander systems, the present described system greatly reduces the system footprint due to the storage Silos being vertical, being placed in very close proximity to one another, and being placed over the top of the conveyor as opposed to adjacent the conveyor. In one or more embodiments, three silos may be positioned over a single conveyor, further reducing the footprint requirement. The silos may be designed to gravity discharge directly onto the conveyor and may choke-feed onto the conveyor using a fully enclosed discharge chute to reduce or more fully eliminate dust compared to the drop-discharge of the FracSanders. The conveyor speed below the silos may be automatically modulated to precisely control the proppant delivery rate into the blender compared to manually controlling the gate opening of the FracSander. An added benefit to this is that the conveyor belt below the silos of the present system may move at a speed that is based on demand of the system rather than continuously running at a high rate like a FracSander system. The blender may be choke-fed for dust control compared to the drop-discharge into the blender of the FracSander System. Still further, the silos of the present system may be filled using bottom-discharge transport trailers that discharge into the loader. The drive over conveyor may be choke-fed from the transport trailer to minimize dust. Each drive over conveyor may incorporate dual inlets or more, allowing two or more transport trailers to unload. The drive over conveyor may allow a transport trailer to unload in less than ⅓ the time it takes with a FracSander system. The drive over conveyor may discharge proppant, through a fully enclosed chute, into the integrated bucket elevator of the silo to rapidly fill the silo. In summary, in comparison to the FracSander System, the present system may provide a smaller footprint, may produce much less dust, may provide for faster silo loading, and may provide for automatic control of the proppant feed rate into the blender.

Similarly, and in comparison to the Containerized System, the present system may establish a much smaller overall footprint, may have a larger quantity of "staged" proppant ready to go into the fracturing blender, and may not require a large and potentially dangerous forklift that must quickly remove and replace containers to keep up with the demand of sand being consumed in the fracturing process.

Likewise, and in contrast to known silo systems, the present system may include two conveyors mounted directly beneath each bank of silos and each set of three silos can discharge to the opposite conveyor in the event of conveyor failure. The sandbank system may also include a choke-filled modulated speed belt as described above. In summary, in contrast to other silo systems, the present system may have a much smaller overall footprint, emit less dust, take less time to load, utilize two conveyors with silo crossover for redundancy/backup, and automatically control the proppant feed rate into the blender.

In operation and use, several methods may be performed with the current system. For example, a method of manipulating a silo 300 may be provided. In another example, a method of loading a silo 400 may be provided. In still another example, a method of delivering proppant from a silo to a blender 500 may be provided.

The method of manipulating a silo 300 may include loading a silo onto a transporting trailer 302, transporting the silo to a frac site 314, and offloading the silo 316. Loading the silo onto a transporting trailer may include arranging a rear end of a silo trailer, as described herein, adjacent a loading side of a silo 304. Arranging the rear end of the silo trailer may include backing the trailer up to the silo. Arranging the rear end of the silo trailer may also include deploying the base engaging cylinders on the trailer to lift the rear wheels from the ground and engage the hooks on the silo with the pivot shaft on the rear end of the trailer, which may lift the portion of the silo adjacent the trailer off of the ground slightly. Arranging the rear end of the silo trailer may also include manipulating the rear end of the trailer side to side to center or substantially center the trailer on the silo. The manipulating may include articulating the trailer relative to the ground engaging cylinders via the hydraulic sliding mechanism. The lift frame of the trailer may be lifted to engage the side of the silo 306. For example, the hydraulic ram may be extended to pivot the lift frame from a generally horizontal position on the trailer to a generally vertical position adjacent the silo. The lift frame may be engaged with the silo by actuating the pinning cylinders on the lift frame to engage the lugs or loops on the side of the silo 308. The lift frame may be lowered to tip the silo downward from a generally vertical position to a substantially horizontal position on the trailer 310. That is, the hydraulic ram may be retracted to pivot the lift frame and silo onto the trailer. The base engaging cylinders may be retracted to reengage the wheels of the trailer with the ground 312, and the trailer may be transported to another location such as a frac site 314.

Offloading the silo may include the substantially opposite steps of loading the silo. However, where the silo is being offloaded onto a base of the above-described system, additional steps may be performed to arranged the silo and secure the silo to the base. For example, for offloading onto a base 316, a trailer of the presently described system carrying a silo may be backed onto a base of the system such that the rear end of the trailer is substantially adjacent to a desired location of a silo 318. The base engaging cylinders may be deployed to lift the wheels of the trailer from the base and/or generally stabilize the rear end of the trailer 320. The rear end of the trailer may be shifted using the sliding mechanism 322. The lifting mechanism on the trailer may be actuated to pivot the silo upright or slightly beyond upright to engage the feet on an opposite side of the silo with the base 324. The lift frame may be disconnected from the silo by releasing the pinning cylinders 326 and the base engaging cylinders may be retracted to lower the trailer back onto the base 328, lower the feet adjacent the rear end of the trailer onto the base, and free the pivot shaft from the hooks on the silo. The trailer may be removed 330 and the silo may be pinned, bolted, or otherwise secured to the base 332. It is to be appreciated that where the silo is being loaded onto a trailer from a base, the silo may be disconnected from the base and a trailer may be backed onto the base to retrieve the silo and the steps for loading the silo discussed above may be performed.

A method of loading a silo 400 may include transporting a loader to a frac site 402 and arranging the loader in a position where the piping system extending from the distribution head can access the receiving areas of one or more silos 404. It is to be appreciated that much flexibility may be provided by the swiveling distribution head and the angular orientation of the loader may be more freely selected based on other site layout factors. The upper portion of the rear incline conveyor may be deployed from its transport position to its operation position 406. This may include extending the hydraulic ram to drive the lifting arm to slide rearwardly and pivot upward the upper portion of the rear incline conveyor. The ramps of the drive over conveyor may be deployed by tipping the ramps downward into contact with the ground 408. The piping system may be connected to the receiving areas of one or more silos 410.

The method may also include receiving proppant from a transport trailer 412. For example, a transport trailer may be driven over the drive over conveyor via the ramps and covers on the conveyor 414. The discharge of the trailer may be arranged over a proppant entry port on the conveyor 416. The lifting mechanism on the proppant entry port may be actuated to adjust the port frame to accommodate the discharge height and type of the trailer 418. The transport trailer may discharge the proppant to the drive over conveyor in a choke-fed fashion 420. The drive over conveyor may deliver the proppant to the rear incline conveyor 422, which may deliver the proppant to the distribution head 424. The distribution head may be controlled select one or more discharge pipes 426 and proppant may be gravity fed through the selected discharge pipe or pipes to the receiving area of the silo 428. The integrated bucket elevator may receive the proppant from the pipe at the receiving area 430 and carry the proppant upward to a fill location within the silo 432. When a particular silo is full, alternative discharge pipes may be selected to fill alternative silos 434.

The method of delivering proppant to a blender 500 may include activating one or more conveyors on a base or bases of the present system 502. Depending on the activated conveyor, proppant may be discharged 504 out of a discharge port of a silo onto a conveyor arranged substantially below the silo. Additionally or alternatively, proppant may be discharged 504 out of a backup discharge onto a conveyor arranged adjacent to the silo. In one or more embodiments, the conveyor arranged adjacent to the silo may be arranged below adjacent silos arranged on an adjacent base. In both cases, the proppant may choke fed onto the conveyor 506 and carried by the conveyor to an upward sloping conveyor portion 508 and to a blender feeding hopper 510. Depending on the number of bases being used, the blender feeding hopper may be shifted side to side to accommodate one or more bases 512. The blender feeding hopper may be controlled to discharge the proppant into one or more blenders 514.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A proppant supply system, comprising:
   a base;
   a plurality of silos each having an integrated bucket elevator and being arranged on the base;
   a drive-over loader configured for gravity feeding of proppant by transports and for conveying the proppant to the plurality of silos, the drive-over loader being pivotable while maintaining feed lines in simultaneous communication with each of the plurality of silos, wherein:
   the base comprises a proppant conveying system arranged below the silo; and
   the proppant conveying system on the base is configured for gravity choke feeding from the silo, and for carrying the proppant laterally out from under the silo and upward to a blender-feeding hopper.

2. The proppant supply system of claim 1, wherein the drive-over loader comprises a gravity feed point from which the drive-over loader gravity feeds the plurality of silos.

3. The proppant supply system of claim 1, wherein the drive-over loader is configured for gravity choke feeding the proppant from the transport.

4. A storage system for proppant, the system comprising:
   two bases arranged adjacent one another each comprising a conveying system arranged on a respective base;
   a plurality of silos configured for storing the proppant, arranged on the base, having integrated bucket elevators and configured for selective delivery of the proppant to a respective conveyor below the silo and the conveyor on the adjacent base; and
   a conveying system arranged on the base and below the silos for delivering the proppant to a blender.

5. A method of supplying proppant to a frac spread, the method comprising:
   receiving proppant with a loader from a transport via a gravity feed;
   conveying the proppant with the loader along an incline conveyor to a swiveling distribution head arranged at a top of the incline conveyor, the swiveling distribution head configured to swivel relative to the incline conveyor;
   selectively delivering the proppant to a selected silo;
   receiving the proppant from the loader and bucket conveying the proppant into the silo;
   feeding the proppant from the silo to a conveyor; and
   conveying the proppant laterally out from under the silo and upward to a hopper.

6. The method of claim 5, wherein feeding the proppant from the silo to a conveyor comprises feeding a conveyor arranged below the silo.

7. The method of claim 5, wherein feeding the proppant from the silo to a conveyor comprises feeding a conveyor arranged below an adjacent silo.

8. The method of claim 5, wherein feeding the proppant from the silo to a conveyor comprise gravity choke feeding the proppant from the silo to a conveyor.

9. The method of claim 8, wherein gravity choke feeding the proppant from the silo to a conveyor comprises gravity choke feeding a conveyor arranged below the silo.

10. The method of claim 8, wherein gravity choke feeding the proppant from the silo to a conveyor comprises gravity choke feeding a conveyor arranged below an adjacent silo.

* * * * *